United States Patent
Kanda

(10) Patent No.: US 9,701,866 B2
(45) Date of Patent: Jul. 11, 2017

(54) AQUEOUS PAINT COMPOSITION AND METHOD FOR FORMING COATING

(71) Applicant: KANSAI PAINT CO., LTD., Hyogo (JP)

(72) Inventor: Takashi Kanda, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 59 days.

(21) Appl. No.: 14/390,147

(22) PCT Filed: Apr. 2, 2013

(86) PCT No.: PCT/JP2013/060097
§ 371 (c)(1),
(2) Date: Oct. 2, 2014

(87) PCT Pub. No.: WO2013/151050
PCT Pub. Date: Oct. 10, 2013

(65) Prior Publication Data
US 2015/0064476 A1 Mar. 5, 2015

(30) Foreign Application Priority Data

Apr. 3, 2012 (JP) ................................. 2012-084598
Sep. 28, 2012 (JP) ................................. 2012-216346

(51) Int. Cl.
| | | |
|---|---|---|
| C09D 167/02 | (2006.01) | |
| C25D 7/00 | (2006.01) | |
| B05D 5/06 | (2006.01) | |
| C08K 3/00 | (2006.01) | |
| B05D 7/00 | (2006.01) | |
| C09D 5/00 | (2006.01) | |
| C09D 5/02 | (2006.01) | |
| C09D 7/12 | (2006.01) | |
| C09D 151/08 | (2006.01) | |
| C09D 167/00 | (2006.01) | |

(Continued)

(52) U.S. Cl.
CPC ............ *C09D 167/02* (2013.01); *B05D 5/06* (2013.01); *C08F 283/02* (2013.01); *C08F 290/067* (2013.01); *C08G 18/0819* (2013.01); *C08G 18/4063* (2013.01); *C08G 18/423* (2013.01); *C08G 18/4238* (2013.01); *C08G 18/4263* (2013.01); *C08G 18/44* (2013.01); *C08G 18/4854* (2013.01); *C08G 18/6266* (2013.01); *C08G 18/755* (2013.01); *C08G 18/758* (2013.01); *C08G 18/8064* (2013.01); *C08G 18/8093* (2013.01); *C08K 3/0033* (2013.01); *C08L 51/08* (2013.01); *C09D 5/00* (2013.01); *C09D 5/02* (2013.01); *C09D 5/024* (2013.01); *C09D 7/12* (2013.01); *C09D 151/08* (2013.01); *C09D 167/00* (2013.01); *C09D 175/04* (2013.01); *C09D 201/00* (2013.01);

(Continued)

(58) Field of Classification Search
CPC .. C08F 290/067; C08F 220/06; C08F 220/14; C08F 220/20; C08F 220/40; C08F 2220/1825; C08F 2220/1858; C08F 2220/1891; C08F 212/08; C08F 230/02; C08F 283/02; B05D 2401/20; B05D 2401/40; B05D 2451/00; B05D 5/06; B05D 7/572; C08L 75/04; C08L 33/066; C08L 59/00; C08L 83/04; C08L 51/08; C09D 167/00; C09D 175/04; C09D 151/08; C09D 167/02; C09D 201/00; C09D 5/00; C09D 5/02; C09D 5/024; C09D 7/12; C08G 18/0819; C08G 18/4063; C08G 18/423; C08G 18/4238; C08G 18/4263; C08G 18/44; C08G 18/4854; C08G 18/6266; C08G 18/755; C08G 18/758; C08G 18/8064; C08G 18/8093; C08K 2003/3045; C08K 3/0033; C25D 7/00; Y10T 428/31551
USPC .................... 428/423.1; 524/247; 427/385.5; 205/198
See application file for complete search history.

(56) References Cited

U.S. PATENT DOCUMENTS

| | | |
|---|---|---|
| 6,696,539 B2 | 2/2004 | Kobata et al. |
| 2001/0024693 A1 | 9/2001 | Morimoto et al. |

(Continued)

FOREIGN PATENT DOCUMENTS

| | | |
|---|---|---|
| JP | 5-148313 | 6/1993 |
| JP | 8-290102 | 11/1996 |

(Continued)

OTHER PUBLICATIONS

International Search Report issued Jul. 16, 2013 in International (PCT) Application No. PCT/JP2013/060097.

(Continued)

*Primary Examiner* — Thao T Tran
(74) *Attorney, Agent, or Firm* — Wenderoth, Lind & Ponack, L.L.P.

(57) ABSTRACT

The present invention provides an aqueous coating composition for use as an aqueous first colored coating composition in a multilayer coating-forming method, the coating composition containing an aqueous film-forming resin (A), a crosslinking agent (B), and acrylic urethane resin composite particles (C). The acrylic resin of the acrylic urethane resin composite particles (C) is obtained by using, as constituent monomers, 30 to 80 mass % of a polymerizable unsaturated monomer (c-1-1) having one polymerizable unsaturated group per molecule and having a $C_{4-22}$ alkyl group, 1 to 20 mass % of a polymerizable unsaturated monomer (c-2) having two or more polymerizable unsaturated groups per molecule, and 0 to 69 mass % of a polymerizable unsaturated monomer (c-1-2) having one polymerizable unsaturated group per molecule and being other than the polymerizable unsaturated monomer (c-1-1).

31 Claims, No Drawings

(51) Int. Cl.
| | |
|---|---|
| *C09D 201/00* | (2006.01) |
| *C08G 18/08* | (2006.01) |
| *C08G 18/48* | (2006.01) |
| *C08G 18/62* | (2006.01) |
| *C08G 18/75* | (2006.01) |
| *C08G 18/80* | (2006.01) |
| *C09D 175/04* | (2006.01) |
| *C08G 18/40* | (2006.01) |
| *C08G 18/42* | (2006.01) |
| *C08G 18/44* | (2006.01) |
| *C08F 290/06* | (2006.01) |
| *C08L 51/08* | (2006.01) |
| *C08F 283/02* | (2006.01) |
| *C08K 3/30* | (2006.01) |

(52) U.S. Cl.
CPC ............... *C25D 7/00* (2013.01); *B05D 7/572* (2013.01); *B05D 2451/00* (2013.01); *C08K 2003/3045* (2013.01); *Y10T 428/31551* (2015.04)

(56) References Cited

U.S. PATENT DOCUMENTS

| | | | | |
|---|---|---|---|---|
| 2003/0220446 | A1* | 11/2003 | Faler | C08G 18/0823 524/590 |
| 2004/0134791 | A1 | 7/2004 | Toi et al. | |
| 2006/0135678 | A1 | 6/2006 | Kato et al. | |
| 2008/0131714 | A1 | 6/2008 | Toi et al. | |
| 2010/0255328 | A1* | 10/2010 | Tomizaki et al. | 428/483 |
| 2014/0030528 | A1* | 1/2014 | Kitagawa | C08G 18/6225 428/407 |
| 2014/0031484 | A1* | 1/2014 | Kobata et al. | 524/507 |

FOREIGN PATENT DOCUMENTS

| | | |
|---|---|---|
| JP | 2001-205175 | 7/2001 |
| JP | 2002-153806 | 5/2002 |
| JP | 2002-322238 | 11/2002 |
| JP | 2003-105258 | 4/2003 |
| JP | 2004-26958 | 1/2004 |
| JP | 2004-358462 | 12/2004 |
| JP | 2006-56973 | 3/2006 |
| JP | 2009-155409 | 7/2009 |
| JP | 2011-16957 | 1/2011 |
| JP | 2011-506620 | 3/2011 |
| WO | 2004/061025 | 7/2004 |
| WO | 2009/075389 | 6/2009 |
| WO | 2012/137881 | 10/2012 |
| WO | 2012/137884 | 10/2012 |

OTHER PUBLICATIONS

Extended European Search Report issued Nov. 16, 2015 in corresponding European Patent Application No. 13773085.9.

* cited by examiner

AQUEOUS PAINT COMPOSITION AND METHOD FOR FORMING COATING

TECHNICAL FIELD

The present invention relates to an aqueous coating composition, and a method for forming a coating film using the aqueous coating composition.

BACKGROUND ART

As methods for forming coating films on automobile bodies, a 3-coat 2-bake process and a 2-coat 2-bake process have been widely used. The 3-coat 2-bake process comprises the following steps in order: after subjecting a substrate to electrodeposition coating and curing by heating, (1) application of an intermediate coating composition→(2) curing by heating→(3) application of a base coating composition→ (4) preheating (preliminary heating)→(5) application of a clear coating composition→(6) curing by heating. The 2-coat 2-bake process comprises the following steps in order: after subjecting a substrate to electrodeposition coating and curing by heating, (1) application of an intermediate coating composition→(2) curing by heating→(3) application of a top coating composition→(4) curing by heating.

Generally, the 3-coat 2-bake process is used for forming a coating film of a so-called metallic color by using a base coating composition comprising an effect pigment, whereas the 2-coat 2-bake process is used for forming a coating film of a so-called solid color, such as white or black, by using a top coating composition comprising a color pigment.

However, in recent years, for the purpose of saving energy, consideration has been given to omission of the heat-curing step that is performed after applying the intermediate coating composition, and research has been conducted on a 3-coat 1-bake process comprising the following steps in order: (1) application of an intermediate coating composition→(2) preheating (preliminary heating)→(3) application of a base coating composition→(4) preheating (preliminary heating)→(5) application of a clear coating composition→(6) curing by heating, and on a 2-coat 1-bake process comprising the following steps in order: (1) application of an intermediate coating composition→(2) preheating (preliminary heating)→(3) application of a top coating composition→(4) curing by heating.

From the viewpoint of minimizing environmental pollution caused by volatilization of organic solvents, particular demand exists for a 3-coat 1-bake process or a 2-coat 1-bake process using aqueous coating compositions as the intermediate coating composition, base coating composition, and top coating composition.

However, in the 3-coat 1-bake process using an aqueous intermediate coating composition and an aqueous base coating composition, and in the 2-coat 1-bake process using an aqueous intermediate coating composition and an aqueous top coating composition, the resulting coating film may have insufficient water resistance due to the use of a water-soluble or water-dispersible resin, as well as insufficient smoothness and distinctness of image due to the formation of a mixed layer between the aqueous intermediate coating composition and the aqueous base coating composition, or between the aqueous intermediate coating composition and the aqueous top coating composition. These have been problems that require solutions.

For example, Patent Literature (PTL) 1 discloses that in a coating method using a thermosetting aqueous intermediate coating composition (A), a thermosetting aqueous base coating composition (B), and a thermosetting clear coating composition (C), the method comprising applying the thermosetting aqueous intermediate coating composition (A) and the thermosetting aqueous base coating composition (B) by a wet-on-wet process, when the base resin of the aqueous intermediate coating composition (A) has a neutralization value of 10 to 40 mg KOH/g and the base resin of the aqueous base coating composition (B) has a neutralization value that is greater than that of the aqueous coating composition (A) by 10 to 20, finish appearance such as gloss or distinctness of image is not impaired. The multilayer coating film obtained by this coating method, however, may have insufficient smoothness and water resistance.

Patent Literature (PTL) 2 discloses that in a coating film-forming method comprising successively forming, on an electrocoated substrate, an intermediate coating film, a metallic base coating film, and a clear coating film by using an aqueous intermediate coating composition, an aqueous metallic base coating composition, and a clear coating composition, respectively, when the aqueous intermediate coating composition comprises an aqueous dispersion of amide group containing acrylic resin particles having a particle size of 0.01 to 1.0 μm, which is obtained by emulsion-polymerizing an amide group-containing ethylenically unsaturated monomer and another ethylenically unsaturated monomer, bleeding or inversion at the interfaces of each of the coating film layers can be controlled, and a multilayered coating film with excellent appearance can be formed. However, the multilayer coating film obtained by this coating film-forming method may be insufficient in terms of smoothness, adhesion, and chipping resistance (resistance to coating damage (scratches, peeling, etc.) due to flying stone that hit vehicles during driving, or other factors).

Patent Literature (PTL) 3 discloses that in a multilayer coating film-forming method comprising: (1) a step of providing an electrocoated substrate; (2) a step of applying an aqueous intermediate coating composition to the electrocoated substrate to form an intermediate coating film; (3) a step of successively applying an aqueous base coating composition and a clear coating composition to the uncured intermediate coating film by a wet-on-wet process to form a base coating film and a clear coating film thereon, and (4) simultaneously bake-curing the intermediate coating film, base coating film, and clear coating film, when the aqueous intermediate coating composition comprises a specific acrylic resin emulsion and a specific urethane resin emulsion, and the intermediate coating film formed of the intermediate coating composition has a specific water absorption rate and a specific water elution rate, the formation of a mixed layer between the intermediate and base coating layers can be effectively prevented, and a multilayer coating film having excelling surface smoothness can be formed. However, the multilayer coating film obtained by this method may also be insufficient in terms of smoothness, distinctness of image, and adhesion.

Patent Literature (PTL) 4 discloses that when the intermediate coating material used in a 3-coat 1-bake process is an aqueous intermediate coating composition comprising both a copolymer resin emulsion and a curing agent, the copolymer resin emulsion being one prepared by emulsion-polymerizing (a) a monomer component containing at least one monomer selected from alkyl (meth)acrylates and, if necessary, at least one monomer selected from the group consisting of styrenic monomers, (meth)acrylonitrile, and (meth)acrylamide, (b) a polymerizable unsaturated monomer having an acid group, (c) a polymerizable unsaturated monomer having a hydroxy group, and (d) a crosslinking monomer, the resin having a glass transition temperature of −50 to 20° C., an acid value of 2 to 60 mg KOH/g, and a hydroxy value of 10 to 120 mg KOH/g, curing reactability of the copolymer resin emulsion with the curing agent is enhanced to provide a multilayer coating films with excellent chipping resistance and water resistance, as well as excellent finish appearance. However, the multilayer coating film obtained by this multilayer coating film-forming process may also be insufficient in terms of smoothness and distinctness of image.

Further, Patent Literature 5 discloses that in a coating film-forming method comprising successively forming on a substrate an intermediate coating film, a base coating film, and a clear coating film by a wet-on-wet process, when an intermediate coating composition for forming the intermediate coating film and a base coating composition for forming the base coating film comprise an amide group-containing acrylic resin and a curing agent, and the curing agent contained in the intermediate coating composition comprises an aliphatic isocyanate active methylene blocked isocyanate, and the aliphatic isocyanate active methylene blocked isocyanate has an average functionality of more than 3, the amide group-containing acrylic resin exerts a viscosity-controlling effect and bleeding or inversion at the interfaces between each of the coating layers can be controlled. Further, the use of an aliphatic isocyanate active methylene blocked isocyanate that has excellent low-temperature curability as the curing agent initiates curing of the intermediate coating film earlier than curing of the base coating film and the clear coating film, and also secures sufficient flowability, thus providing excellent substrate hiding power for hiding the surface roughness of an electrodeposition coating film and thus providing a multilayer coating film with excellent finish appearance and excellent coating film properties, particularly excellent chipping resistance.

However, in the multilayer coating film-forming method disclosed in Patent Literature (PTL) 5, the use of aqueous coating compositions as the intermediate coating composition and base coating composition may result in reduced smoothness and distinctness of image of the resulting multilayer coating film due to the formation of a mixed layer between the layers of the intermediate and base coating compositions, or the resulting multilayer coating film may have insufficient chipping resistance.

CITATION LIST

Patent Literature

PTL 1: JPH08-290102A
PTL 2: JP2001-205175A
PTL 3: JP2004-358462A
PTL 4: WO2004/061025
PTL 5: JP2002-153806A

SUMMARY OF INVENTION

Solution to Problem

An object of the present invention is to provide an aqueous coating composition capable of forming a coating film that have excelling smoothness, distinctness of image, water resistance, adhesion, and chipping resistance, and a coating film-forming method using the aqueous coating composition. Another object of the present invention is to provide an aqueous coating composition that has excellent wash off properties, and a coating film-forming method using the aqueous coating composition.

Another object of the present invention is to provide an aqueous coating composition and a coating film-forming method for forming a multilayer coating film that has excellent smoothness, distinctness of image, water resistance, adhesion, and chipping resistance, by inhibiting the formation of a mixed layer between the layers of aqueous coating compositions that are successively applied to form the multilayer coating film.

Means for Solution

The present inventors conducted extensive research to achieve the above objects, and as a result, found that when an aqueous composition comprising acrylic urethane resin composite particles comprising an acrylic resin component of a specific monomer composition, a film-forming resin, and a crosslinking agent is used as a first colored coating composition in a coating process for forming a multilayer coating film by a 3-coat 1-hake process, the above objects can be achieved. The inventors further found that the above objects can be achieved by using an aqueous coating composition comprising an aqueous film-forming resin (A), a specific blocked polyisocyanate compound (B1) characterized by the blocked structure, and specific acrylic urethane resin composite particles (C) in which an acrylic resin has a crosslinked structure. The present invention has been accomplished based on these findings.

Specifically, the present invention includes the following:
Item 1. A coating composition for use as an aqueous first colored coating composition (X) in a multilayer coating film-forming method comprising the steps in order of:
(1) applying the aqueous first colored coating composition (X) to a substrate to form a first colored coating film;
(2) applying an aqueous second colored coating composition (Y) to the first colored coating film formed in step (1) to form a second colored coating film thereon;
(3) applying a clear coating composition (Z) to the second colored coating film formed in step (2) to form a clear coating film thereon; and
(4) heating to simultaneously cure the first colored coating film, second colored coating film, and clear coating film, the coating composition comprising an aqueous film-forming resin (A), a crosslinking agent (B), and acrylic urethane resin composite particles (C), the acrylic resin of the acrylic urethane resin composite particles (C) being obtained by using, as constituent monomers, 30 to 80 mass % of a polymerizable unsaturated monomer (c-1-1) having one polymerizable unsaturated group per molecule and having a $C_{4-22}$ alkyl group, 1 to 20 mass % of a polymerizable unsaturated monomer (c-2) having two or more polymerizable unsaturated groups per molecule, and 0 to 69 mass % of a polymerizable unsaturated monomer (c-1-2) having one polymerizable unsaturated group per molecule and being other than the polymerizable unsaturated monomer (c-1-1).
Item 2. The aqueous composition according to Item 1, wherein the aqueous film-forming resin (A) is a hydroxy-containing polyester resin (A1) and/or a hydroxy-containing acrylic resin (A2).
Item 3. The aqueous coating composition according to Item 1 or 2, wherein the polymerizable unsaturated monomer (c-1-1) is at least one polymerizable unsaturated monomer selected from the group consisting of 2-ethylhexyl (meth)acrylate, dodecyl (meth)acrylate, and tridecyl (meth)acrylate.

Item 4. The aqueous coating composition according to any one of Items 1 to 3, wherein the constituent monomers of the acrylic resin component of the acrylic urethane resin composite particles (C) include a hydroxy-1-containing polymerizable unsaturated monomer as the polymerizable unsaturated monomer (c-1-2) in an amount of 1 to 30 mass %, based on the total amount of the polymerizable unsaturated monomer (c-1-1), polymerizable unsaturated monomer (c-2), and polymerizable unsaturated monomer (c-1-2).

Item 5. The aqueous coating composition according to any one of Items 1 to 3, wherein the constituent monomers of the acrylic resin component of the acrylic urethane resin composite particles (C) include a $C_1$ or $C_2$ alkyl 1-containing polymerizable unsaturated monomer as the polymerizable unsaturated monomer (c-1-2) in an amount of 10 to 50 mass %, based on the total amount of the polymerizable unsaturated monomer (c-1-1), polymerizable unsaturated monomer (c-2), and polymerizable unsaturated monomer (c-1-2).

Item 6. The aqueous coating composition according to any one of Items 1 to 5, wherein the urethane resin of the acrylic urethane resin composite particles (C) is obtained from a polyol component having a polyester polyol and/or a polyether polyol, and a polyisocyanate component.

Item 7. The aqueous coating composition according to any one of Items 1 to 6, wherein the acrylic urethane resin composite particles (C) have a core/shell type multilayer structure.

Item 8. The aqueous coating composition according to any one of Items 1 to 7, wherein the acrylic urethane resin composite particles (C) have an average particle size of 10 to 5,000 nm.

Item 9. The aqueous coating composition according to any one of Items 1 to 8, wherein the crosslinking agent (B) is a blocked polyisocyanate compound (B1) having at least one blocked isocyanate group selected from the group consisting of:

a blocked isocyanate group represented by formula (I)

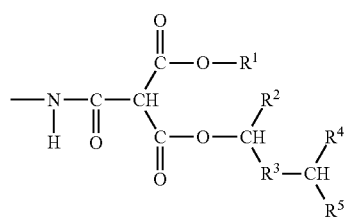

(I)

(wherein $R^1$, $R^2$, $R^4$, and $R^5$ independently represent a $C_{1-12}$ hydrocarbon group, and $R^3$ represents a $C_{1-12}$ linear or branched alkylene group);

a blocked isocyanate group represented by formula (IX)

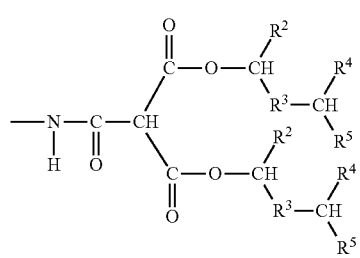

(II)

(wherein $R^2$, $R^3$, $R^4$, and $R^5$ are the same as above); and a blocked isocyanate group represented by formula (III)

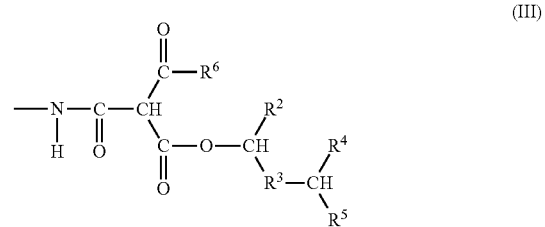

(III)

(wherein $R^2$, $R^3$, $R^4$, and $R^5$ are the same as above, and $R^6$ represents a $C_{1-12}$ hydrocarbon group).

Item 10. The aqueous coating composition according to Item 9, wherein the $R^1$ is an isopropyl group.

Item 11. The aqueous coating composition according to Item 9 or 10, wherein $R^6$ in formula (III) is an isopropyl group.

Item 12. The aqueous coating composition according to Item 9 or 10, wherein the blocked polyisocyanate compound (B1) is obtained by reacting a blocked polyisocyanate compound (b3-1) having a blocked isocyanate group represented by formula (IV)

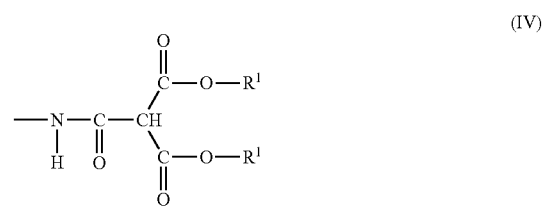

(IV)

(wherein $R^1$ is as defined above, and each $R^1$ may be the same or different) with a secondary alcohol (b4) represented by formula (VI)

(VI)

(wherein $R^2$, $R^3$, $R^4$, and $R^5$ are the same as above).

Item 13. The aqueous coating composition according to Item 9 or 11, wherein the blocked polyisocyanate compound (B1) is obtained by reacting a blocked polyisocyanate compound (b3-2) having a blocked isocyanate group represented by formula (V)

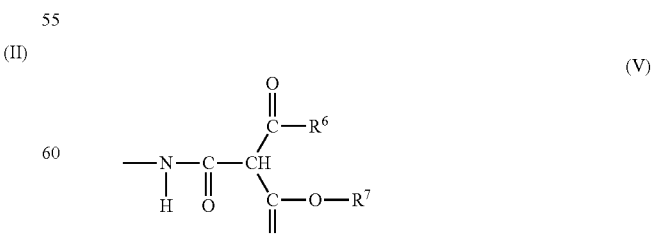

(V)

(wherein $R^6$ is the same as the above, $R^7$ is a $C_{1-12}$ hydrocarbon group) with the secondary alcohol (b4).

Item 14. The aqueous coating composition according to any one of Items 9 to 13, wherein the blocked polyisocyanate compound (B1) is a blocked polyisocyanate compound (B1') having a hydrophilic group.

Item 15. The aqueous coating composition according to any one of Items 1 to 14, wherein the proportions of the aqueous film-forming resin (A), crosslinking agent (B), and acrylic urethane resin composite particles (C) are 30 to 95 parts by mass of the aqueous film-forming resin (A), 5 to 70 parts by mass of the crosslinking agent (B), and 1 to 50 parts by mass of the acrylic urethane resin composite particles (C), based on 100 parts by mass of the total amount of the aqueous film-forming resin (A) and crosslinking agent (B).

Item 16. The aqueous coating composition according to any one of Items 1 to 15, further comprising a hydrophobic solvent (E).

Item 17. An aqueous coating composition comprising an aqueous film-forming resin (A), a blocked polyisocyanate compound (B1), and acrylic urethane resin composite particles (C), wherein the blocked polyisocyanate compound (B1) is a blocked polyisocyanate compound having at least one blocked isocyanate group selected from the group consisting of:
a blocked isocyanate group represented by formula (I)

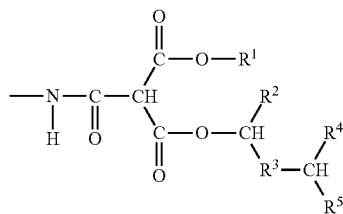

(wherein $R^1$, $R^2$, $R^4$, and $R^5$ independently represent a $C_{1-12}$ hydrocarbon group, and $R^3$ represents a $C_{1-12}$ linear or branched alkylene group);
a blocked isocyanate group represented by formula (II)

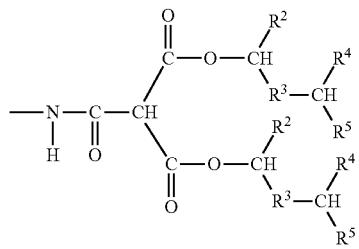

(wherein $R^2$, $R^3$, $R^4$, and $R^5$ are the same as above), and a blocked isocyanate group represented by formula (III)

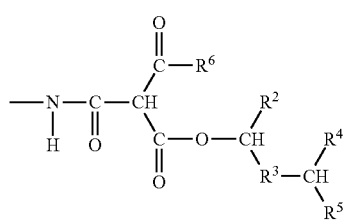

(wherein $R^2$, $R^3$, $R^4$, and $R^5$ are the same as the above, and $R^6$ is a $C_{1-12}$ hydrocarbon group), and the acrylic resin of the acrylic urethane resin composite particles (C) is an acrylic resin obtainable by using, as constituent monomers, a polymerizable unsaturated monomer (c-1) having one polymerizable unsaturated group per molecule, and a polymerizable unsaturated monomer (c-2) having two or more polymerizable unsaturated groups per molecule.

Item 18. The aqueous coating composition according to Item 17, wherein the aqueous film-forming resin (A) is a hydroxy-containing polyester resin (A1) and/or a hydroxy-containing acrylic resin (A2).

Item 19. The aqueous coating composition according to Item 17 or 18, wherein $R^1$ in formula (I) is isopropyl.

Item 20. The aqueous coating composition according to any one of items 17 to 19, wherein $R^6$ is isopropyl.

Item 21. The aqueous coating composition according to any one of Items 17 to 19, wherein the blocked polyisocyanate compound (B1) is obtained by reacting a blocked polyisocyanate compound (b3-3) having a blocked isocyanate group represented by formula (IV)

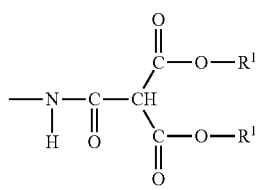

(wherein $R^1$ is as defined above, and each $R^1$ may be the same or different) with a secondary alcohol (b4) represented by formula (VI)

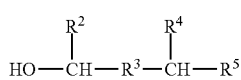

(wherein $R^2$, $R^3$, $R^4$, and $R^5$ are the same as above).

Item 22. The aqueous coating composition according to any one of Items 17, 18, and 20, wherein the blocked polyisocyanate compound (B1) is obtained by reacting the secondary alcohol (b4) and a blocked polyisocyanate compound (b3-2) having a blocked isocyanate group represented by formula (V)

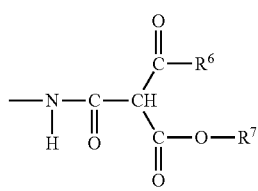

(wherein $R^6$ is the same as above, and $R^7$ is a $C_{1-12}$ hydrocarbon group).

Item 23. The aqueous coating composition according to any one of Items 17 to 22, wherein the blocked polyisocyanate compound (B1) is a blocked polyisocyanate compound (B1') having a hydrophilic group.

Item 24. The aqueous coating composition according to any one of Items 17 to 23, wherein the constituent monomers of the acrylic resin component of the acrylic urethane resin composite particles (C) comprise at least one alkyl or cycloalkyl (meth)acrylate having a $C_{4-22}$ alkyl group as the polymerizable unsaturated monomer (c-1).

Item 25. The aqueous coating composition according to any one of Items 17 to 24, wherein the constituent monomers of the acrylic resin component of the acrylic urethane resin composite particles (C) comprise a hydroxy-containing polymerizable unsaturated monomer as the polymerizable unsaturated monomer (c-1) in an amount of 1 to 30 mass %, based on the total amount of the polymerizable unsaturated monomer (c-1) and polymerizable unsaturated monomer (c-2).

Item 26. The aqueous coating composition according to any one of Items 17 to 25, wherein the urethane resin of the acrylic urethane resin composite particles (C) is obtained from a polyol component having a polyester polyol and/or a polyether polyol, and a polyisocyanate component.

Item 27. The aqueous coating composition according to any one of Items 17 to 26, wherein the acrylic urethane resin composite particles (C) have a core/shell type multilayer structure.

Item 28. The aqueous coating composition according to any one of Items 17 to 27, wherein the acrylic urethane resin composite particles (C) have an average particle size of 10 to 5,000 nm.

Item 29. A method for forming a multilayer coating film comprising the steps of:
(1) applying the aqueous coating composition according to any one of Items 1 to 28 as an aqueous first colored coating composition (X) to a substrate to form a first colored coating film thereon;
(2) applying an aqueous second colored coating composition (Y) to the uncured first colored coating film to form a second colored coating film thereon; and
(3) applying a clear coating composition (Z) to the uncured second colored coating film to form a clear coating film thereon; and
(4) heating to simultaneously cure the uncured first colored coating film, uncured second colored coating film, and uncured clear coating film.

Item 30. The method according to Item 29, wherein the substrate is a vehicle body having an undercoating film formed thereon by using an electrodeposition coating composition.

Item 31. An article coated by the method according to Item 29 or 30.

Effect of the Invention

The coating composition of the present invention can form a coating film with excellent smoothness, distinctness of image, water resistance, adhesion, and chipping resistance, particularly by a coating film-forming method according to a 3-coat 1-bake process. Further, the coating composition of the present invention is excellent in terms of wash-off of the coating composition adhered to a coating device or the like during coating.

Because the acrylic urethane resin composite particles of the coating composition of the present invention comprise a urethane resin component that enhances coating film properties (flexibility), the resulting coating film has high chipping resistance. It is also considered that because the urethane resin component is in the form of composite particles of an acrylic resin component and a urethane resin component, compatibility of the two components is enhanced, and a multilayer coating film with excellent finish appearance in terms of smoothness and distinctness of image can therefore be provided by a 3-coat 1-bake process or the like.

It is also considered that because the aqueous coating composition of the present invention comprises acrylic urethane resin composite particles as resin particles, reduction of wash-off properties of a coating composition, which is considered to be predominantly due to urethane resin particles, is suppressed, compared to an aqueous coating composition comprising both acrylic resin particles and urethane resin particles; therefore, a coating composition with excellent wash-off properties can be provided.

It is further considered that also due to the synergistic effects of the above components (B) and (C), when a multilayer coating film is formed by layering aqueous coating compositions, a multilayer coating film excellent in terms of smoothness, distinctness of image, adhesion, and chipping resistance can be formed by using the aqueous coating composition of the invention.

Further, according to the multilayer coating film-forming method of the present invention, when the aqueous first colored coating composition, aqueous second colored coating composition, and clear coating composition are successively applied to form a multilayer coating film, a coating film with excellent smoothness, distinctness of image, adhesion, and chipping resistance can be provided.

When the crosslinking agent (B) in the aqueous coating composition of the present invention is a blocked polyisocyanate compound (B1), a multilayer coating film with particularly high chipping resistance can be obtained due to particularly high resistance to impact on the resulting coating film, which is attributable to a particularly high flexibility of the crosslinking structure formed by isocyanate crosslinking, compared to that of melamine crosslinking, and to a hydrogen bond formed by the generated urethane group. It is further considered that because the blocked isocyanate group, which has a hydrocarbon group having a branched structure, inhibits the formation of a mixed layer between two coating layers formed by layering coating composition, a multilayer coating film with particularly excellent finish appearance such as smoothness and distinctness of image can be obtained.

Further, it is believed that because the blocked isocyanate group of low polarity having such a branched hydrocarbon group is less susceptible to hydrolysis, a multilayer coating film with excellent adhesion can be obtained even when the coating composition after storage is applied.

DESCRIPTION OF EMBODIMENTS

The aqueous coating composition and the method for forming a coating film of the present invention are explained below in more detail.

The aqueous coating composition (hereinafter sometimes simply referred to as "the coating composition of the invention") is characterized by comprising an aqueous film-forming resin (A), a crosslinking agent (B), and acrylic urethane resin composite particles (C). The acrylic resin of the acrylic urethane resin composite particles (C) is characterized by comprising, as constituent monomers, a polymerizable unsaturated monomer (c-1) having one polymerizable unsaturated group per molecule, and a polymerizable unsaturated monomer (c-2) having two or more polymerizable unsaturated groups per molecule.

In one embodiment of the present invention, the coating composition of the invention is characterized in that the composition is for use as an aqueous first colored coating composition (X) in a multilayer coating film-forming method (hereinafter sometimes referred to as a "3-coat 1-bake process") comprising the steps in order of:

(1) applying the aqueous first colored coating composition (X) to a substrate to form a first colored coating film;

(2) applying an aqueous second colored coating composition (Y) to the first colored coating film formed in step (1) to form a second colored coating film thereon;

(3) applying a clear coating composition (Z) to form a clear coating film thereon; and (4) heating to simultaneously cure the first colored coating film, second colored coating film, and clear coating film, and that the acrylic resin of the acrylic urethane resin composite particles (C) is obtained by using, as constituent monomers, 30 to 80 mass % of a polymerizable unsaturated monomer (c-1-1) having one polymerizable unsaturated group per molecule and having a $C_{4-22}$ alkyl group, 1 to 20 mass % of a polymerizable unsaturated monomer (c-2) having two or more polymerizable unsaturated groups per molecule, and 0 to 69 mass % of a polymerizable unsaturated monomer (c-1-2) having one polymerizable unsaturated group per molecule and being other than the polymerizable unsaturated monomer (c-1-1).

In another embodiment of the present invention, the coating composition of the invention is characterized in that the crosslinking agent (B) is a blocked polyisocyanate compound (B1) having at least one blocked isocyanate group selected from the group consisting of a blocked isocyanate group represented by formula (I)

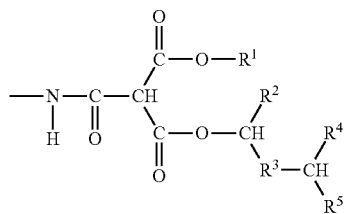

(I)

(wherein $R^1$, $R^2$, $R^4$, and $R^5$ independently represent a $C_{1-12}$ hydrocarbon group, and $R^3$ represents a $C_{1-12}$ linear or branched alkylene group), a blocked isocyanate group represented by formula (II)

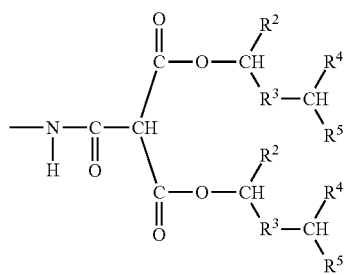

(II)

(wherein $R^2$, $R^3$, $R^4$, and $R^5$ are the same as above), and a blocked isocyanate group represented by formula (III)

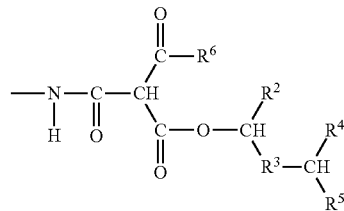

(III)

(wherein $R^2$, $R^3$, $R^4$, and $R^5$ are the same as above, and $R^6$ represents a $C_{1-12}$ hydrocarbon group), and that the acrylic resin of the acrylic urethane resin composite particles (C) comprises, as constituent monomers, a polymerizable unsaturated monomer (c-1) having one polymerizable unsaturated group per molecule, and a polymerizable unsaturated monomer (c-2) having two or more polymerizable unsaturated groups per molecule.

Aqueous Film-Forming Resin (A)

As the aqueous film-forming resin (A), any known water-soluble or water-dispersible film-forming resin that has been used for aqueous coating compositions can be used. Examples of the type of resin include acrylic resins, polyester resins, alkyd resins, polyurethane resins, and the like. The aqueous film-forming resin (A) preferably contains a crosslinkable functional group, such as hydroxy, carboxy, or epoxy.

As the aqueous film-forming resin (A), a hydroxy-containing polyester resin (A1) and/or a hydroxy-containing acrylic resins (A2) can be preferably used. A hydroxy group-containing polyester resin (A1) is particularly preferable.

The use of a combination of a hydroxy-1-containing polyester resin (A1) and a hydroxy-containing acrylic resin (A2) is more preferable in view of enhancing smoothness and distinctness of image of the resulting coating film. When these resins are used in combination, the proportion of the hydroxy-containing acrylic resin (A1) is preferably about 10 to 90 mass %, particularly preferably about 20 to 80 mass %, and the proportion of the hydroxy-containing acrylic resin (A2) is about 10 to 90 mass %, preferably about 20 to 80 mass %, based on the total amount of the hydroxy-containing polyester resin (A1) and hydroxy-containing acrylic resin (A2).

In one embodiment of the present invention, when the aqueous film-forming resin (A) contains a hydroxy group, the aqueous film-forming resin (A) preferably has a hydroxy value of 1 to 300 mg KOH/g, more preferably 2 to 250 mg KOH/g, and even more preferably 5 to 180 mg KOH/g. When the resin (A) contains an acid group such as carboxy, the resin (A) preferably has an acid value of 1 to 200 mg KOH/g, more preferably 2 to 150 mg KOH/g, and even more preferably 5 to 80 mg KOH/g. For example, when the aqueous coating composition of the present invention is used as an aqueous first colored coating composition in a 3-coat 1-bake process, the resin (A) preferably has a hydroxy value within the above range.

In another embodiment of the present invention, when the aqueous film-forming resin (A) contains a hydroxy group, the resin (A) preferably has a hydroxy value of 1 to 200 mg KOH/g, more preferably 2 to 180 mg KOH/g, and even more preferably 5 to 170 mg KOH/g. When the resin (A) contains an acid group, such as carboxy, the resin (A) preferably has an acid value of 1 to 200 mg KOH/g, more preferably 2 to 150 mg KOH/g, and even more preferably 5 to 80 mg KOH/g. For example, when a blocked polyisocyanate compound (B1) is used as the crosslinking agent (B), the resin (A) preferably has a hydroxy value within the above range.

Hydroxy-Containing Polyester Resin (A1)

The aqueous coating composition of the present invention contains a hydroxy-containing polyester resin (A1) as the aqueous film-forming resin (A), which enhances smoothness of the resulting coating film.

The hydroxy-containing polyester resin (A1) can usually be produced by an esterification or transesterification reaction of an acid component with an alcohol component.

The acid component may be a compound that is generally used as an acid component for producing a polyester resin. Examples of such acid components include aliphatic polybasic acids, alicyclic polybasic acids, and aromatic polybasic acids.

Generally, aliphatic polybasic acids include aliphatic compounds having at least two carboxy groups per molecule; anhydrides of such aliphatic compounds; and esters of such aliphatic compounds. Examples of aliphatic polybasic acids include succinic acid, glutaric acid, adipic acid, pimelic acid, suberic acid, azelaic acid, sebacic acid, undecanedioic acid, dodecanedioic acid, brassylic acid, octadecanedioic acid, citric acid, and like aliphatic polycarboxylic acids; anhydrides of such aliphatic polycarboxylic acids; and esters of such aliphatic polycarboxylic acids with lower alkyls having about 1 to 4 carbon atoms. Such aliphatic polybasic acids can be used singly, or in a combination of two or more.

In view of smoothness of the resulting coating film, it is particularly preferable to use adipic acid and/or adipic anhydride as the aliphatic polybasic acid.

Generally, alicyclic polybasic acids include compounds having at least one alicyclic structure and at least two carboxy groups per molecule; acid anhydrides of such compounds; and esters of such compounds. The alicyclic structure is typically a 4-6 membered ring structure. Examples of alicyclic polybasic acids include 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, 1,3,5-cyclohexanetricarboxylic acid, and like alicyclic polycarboxylic acids; anhydrides of such alicyclic polycarboxylic acids; and esters of such alicyclic polycarboxylic acids with lower alkyls having about 1 to 4 carbon atoms. Such alicyclic polybasic acids can be used singly, or in a combination of two or more.

In view of smoothness of the resulting coating film, preferable alicyclic polybasic acids include 1,2-cyclohexanedicarboxylic acid, 1,2-cyclohexanedicarboxylic acid anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic acid anhydride. It is particularly preferable to use 1,2-cyclohexanedicarboxylic acid and/or 1,2-cyclohexanedicarboxylic acid anhydride.

Generally, aromatic polybasic acids include aromatic compounds having at least two carboxy groups per molecule; acid anhydride; of such aromatic compounds; and esters of such aromatic compounds. Examples of aromatic polybasic acids include phthalic acid, isophthalic acid, terephthalic acid, naphthalenedicarboxylic acid, 4,4'-biphenyldicarboxylic acid, trimellitic acid, pyromellitic acid, and like aromatic polycarboxylic acids; anhydrides of such aromatic polycarboxylic acids; and esters of such aromatic polycarboxylic acids with lower alkyls having about 1 to 4 carbon atoms. Such aromatic polybasic acids can be used singly, or in a combination of two or more.

Preferable aromatic polybasic acids include phthalic acid, phthalic acid anhydride, isophthalic acid, trimellitic acid, and trimellitic acid anhydride.

Acid components other than aliphatic polybasic acids, alicyclic polybasic acids, and aromatic polybasic acids can also be used. Such other acid components are not particularly limited, and include, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, and like fatty acids; lauric acid, myristic acid, palmitic acid, stearic acid, oleic acid, linoleic acid, linolenic acid, benzoic acid, p-tert-butyl benzoic acid, cyclohexanoic acid, 10-phenyloctadecanoic acid, and like monocarboxylic acids; and lactic acid, 3-hydroxybutanoic acid, 3-hydroxy-4-ethoxybenzoic acid, and like hydroxycarboxylic acids. Such acid components can be used singly, or in a combination of two or more.

Polyhydric alcohols having at least two hydroxy groups per molecule can be preferably used as the alcohol component. Examples of such polyhydric alcohols include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydrogenated bisphenol A, hydrogenated bisphenol F, and dimethylolpropionic acid; polylactone diols obtained by adding lactone compounds, such as ε-caprolactone, to such dihydric alcohols; ester diol compounds such as bis(hydroxyethyl) terephthalate; polyether diol compounds such as alkylene oxide adducts of bisphenol A, polyethylene glycols, polypropylene glycols, and polybutylene glycols; trihydric or higher polyhydric alcohols such as glycerol, trimethylolethane, trimethylolpropane, diglycerol, triglycerol, 1,2,6-hexanetriol, pentaerythritol, dipentaerythritol, tris(2-hydroxyethyl) isocyanuric acid, sorbitol, and mannitol; and polylactone polyols obtained by adding lactone compounds, such as ε-caprolactone, to such trihydric or higher polyhydric alcohols.

Alcohol components other than polyhydric alcohols can also be used. Such other alcohol components are not particularly limited and include, for example, monohydric alcohols such as methanol, ethanol, propyl alcohol, butyl alcohol, stearyl alcohol, and 2-phenoxyethanol; and alcohol compounds obtained by reacting monoepoxy compounds with acids, such as propylene oxide, butylene oxide, and "Cardura E10" (product name, produced by HEXION Specialty Chemicals; glycidyl ester of a synthetic highly branched saturated fatty acid).

The method for producing the hydroxy-containing polyester resin (A1) is not limited, and may be performed by any usual method. For example, the acid component and the alcohol component can be heated in a nitrogen stream at about 150 to 250° C. for about 5 to 10 hours to carry out an esterification reaction or transesterification reaction of the acid component with the alcohol component, thus providing a hydroxy-containing polyester resin.

For the esterification reaction or transesterification reaction, the acid component and the alcohol component may be added to a reactor at one time, or one or both of the components may be added in several portions. Alternatively, a hydroxy-containing polyester resin may be first synthesized and then reacted with an acid anhydride for half-esterification to obtain a carboxy- and hydroxy-containing polyester resin. Further alternatively, a carboxy-containing polyester resin may first be synthesized, and an alcohol component as mentioned above may be added to obtain a hydroxy-containing polyester resin.

As a catalyst for promoting the esterification or transesterification reaction, known catalysts are usable. Examples thereof include dibutyltin oxide, antimony trioxide, zinc acetate, manganese acetate, cobalt acetate, calcium acetate, lead acetate, tetrabutyl titanate, and tetraisopropyl titanate.

The hydroxy-containing polyester resin (A1) can be modified with a fatty acid, a monoepoxy compound, a polyisocyanate compound, or the like, during or after the preparation of the resin.

Examples of the fatty acid include coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid. Preferable examples of the monoepoxy compound include "Cardura E10" (trade name, produced by HEXION Specialty Chemicals; glycidyl ester of a synthetic highly branched saturated fatty acid).

Examples of the polyisocyanate compound include aliphatic diisocyanate compounds such as lysine diisocyanate, hexamethylene diisocyanate, and trimethylhexane diisocyanate; alicyclic diisocyanate compounds such as hydrogenated xylylene diisocyanate, isophorone diisocyanate, methylcyclohexane-2,4-diisocyanate, methylcyclohexane-2,6-diisocyanate, 4,4'-methylene bis(cyclohexylisocyanate), and 1,3-(isocyanatomethyl)cyclohexane; aromatic diisocyanate compounds such as tolylene diisocyanate, xylylene diisocyanate, and diphenylmethane diisocyanate; organic polyisocyanates such as lysine triisocyanate and like tri- or higher polyisocyanates; adducts of such organic polyisocyanates with polyhydric alcohols, low-molecular-weight polyester resins, water, etc.; and cyclopolymers (e.g., isocyanurate), biuret adducts, etc., of such organic polyisocyanates. Such polyisocyanate compounds can be used singly, or in a combination of two or more.

In view of excellent chipping resistance of the resulting coating film, the hydroxy-containing polyester resin (A1) is preferably such that the combined content of the aliphatic polybasic acid and alicyclic polybasic acid in the starting acid components is preferably within the range of 30 to 100 mol %, more preferably 40 to 97 mol %, and even more preferably 50 to 80 mol %, based on the total amount of the acid components. Particularly in view of excellent chipping resistance of the resulting coating film, it is preferable that the aliphatic polybasic acid is adipic acid and/or adipic anhydride, and that the alicyclic polybasic acid is 1,2-cyclohexanedicarboxylic acid and/or 1,2-cyclohexanedicarboxylic acid anhydride.

In one embodiment of the present invention, the hydroxy-containing polyester resin (A1) preferably has a hydroxy value of 10 to 300 mg KOH/g, more preferably 50 to 250 mg KOH/g, and even more preferably 50 to 180 mg KOH/g. When the hydroxy-containing polyester resin (A1) further has a carboxy group, the resin (A1) preferably has an acid value of 1 to 200 mg KOH/g, more preferably 10 to 100 mg KOH/g, and even more preferably 10 to 60 mg KOH/g. For example, when the aqueous coating composition of the present invention is used as an aqueous first colored coating composition in a 3-coat 1-bake process, the composition preferably has a hydroxy value and/or an acid value within the above-mentioned ranges.

In another embodiment of the present invention, the hydroxy-containing polyester resin (A1) preferably has a hydroxy value of about 10 to 200 mg KOH/g, more preferably about 50 to 180 mg KOH/g, and even more preferably about 70 to 170 mg KOH/g. When the hydroxy-containing polyester resin (A1) further has a carboxy group, the resin (A1) preferably has an acid value of 5 to 100 mg KOH/g, more preferably 10 to 80 mg KOH/g, and even more preferably 10 to 60 mg KOH/g. For example, when a blocked polyisocyanate compound (B1) is used as a crosslinking agent (B), the aqueous coating composition preferably has a hydroxy value and/or an acid value within the above-mentioned ranges.

The hydroxy group-containing polyester resin (A1) preferably has a number average molecular weight of 500 to 50,000, more preferably 1,000 to 30,000, and still more preferably 1,200 to 10,000.

In this specification, the number average molecular weight and weight average molecular weight are values calculated from chromatograms obtained using a gel permeation chromatograph (GPC), based on the molecular weight of standard polystyrene. "HLC8120GPC" (trade name, produced by Tosoh Corporation) was used as the gel permeation chromatograph. The measurements were conducted using the four columns "TSKgel G-4000Hxl," "TSKygel G-3000Hxl," "TSKgel G-2500Hxl," and "TSKgel G-2000Hxl" (all produced by Tosoh Corporation, trade names) under the following conditions: mobile phase: tetrahydrofuran; measurement temperature: 40° C.; flow rate: 1 cc/mm; and detector: RI.

Hydroxy-Containing Acrylic Resin (A2)

The hydroxy-containing acrylic resin (A2) can be produced by copolymerizing a hydroxy-containing polymerizable unsaturated monomer and one or more other polymerizable unsaturated monomers copolymerizable with the hydroxy-containing polymerizable unsaturated monomer by a known method, such as a solution polymerization method in an organic solvent, or an emulsion polymerization method in water.

The hydroxy-containing polymerizable unsaturated monomer is a compound having at least one hydroxy group and at least one polymerizable unsaturated bond per molecule. Examples thereof include monoesterified products of (meth)acrylic acid with a dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone-modified compounds of the monoesterified products of (meth) acrylic acid with dihydric alcohols having 2 to 8 carbon atoms; N-hydroxymethyl(meth)acrylamide; allyl alcohol; and (meth)acrylates having hydroxy-terminated polyoxyethylene chains.

In this specification, the term "(meth)acrylate" means "acrylate or methacrylate." The term "(meth)acrylic acid" means "acrylic acid or methacrylic acid." The term "(meth) acryloyl" means "acryloyl or methacryloyl." The term "(meth)acrylamide" means "acrylamide or methacrylamide."

These other polymerizable unsaturated monomers that are copolymerizable with the hydroxy-containing polymerizable unsaturated monomer can be suitably selected according to the properties required of the hydroxy-containing acrylic resin (A2). Specific examples of the monomer are shown below in (i) to (iv). These monomers can be used singly, or in a combination of two or more.

(i) Alkyl or cycloalkyl (meth)acrylates, such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, and tricyclodecanyl (meth)acrylate;

(ii) isobornyl-containing polymerizable unsaturated monomers, such as isobornyl (meth)acrylate;

(iii) adamantyl-containing polymerizable unsaturated monomers, such as adamantyl (meth)acrylate;

(iv) tricyclodecenyl-containing polymerizable unsaturated monomers, such as tricyclodecenyl (meth)acrylate;

(v) aromatic ring-containing polymerizable unsaturated monomers, such as benzyl (meth)acrylate, styrene, α-methylstyrene, and vinyltoluene;

(vi) alkoxysilyl-containing polymerizable unsaturated monomers, such as vinyltrimethoxysilane, vinyltriethoxysilane, vinyltris(2-methoxyeyethoxy) silane, γ-(meth)acryloyloxypropyltrimethoxysilane, and γ-(meth)acryloyloxypropyltriethoxysilane;

(vii) fluorinated alkyl-containing polymerizable unsaturated monomers, such as perfluorobutylethyl (meth)acrylate, perfluorooctylethyl (meth)acrylate, and like perfluoroalkyl (meth)acrylates; and fluoroolefin and the like;

(viii) polymerizable unsaturated monomers having a photo-polymerizable functional group, such as maleimide;

(ix) vinyl compounds, such as N-vinylpyrrolidone, ethylene, butadiene, chloroprene, vinyl propionate, and vinyl acetate;

(x) phosphoric acid group-containing polymerizable unsaturated monomers, such as 2-acryloyloxyethyl acid phosphate, 2-methacryloyloxyethyl acid phosphate, 2-acryloyloxypropyl acid phosphate, and 2-methacryloyloxypropyl acid phosphate;

(xi) carboxy-containing polymerizable unsaturated monomers, such as (meth)acrylic acid, maleic acid, crotonic acid, and β-carboxyethyl acrylate;

(xii) nitrogen-containing polymerizable unsaturated monomers, such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis(meth)acrylamide, ethylenebis(meth)acrylamide, 2-(methacryloyloxy)ethyltrimethyl ammonium chloride, and addition products of glycidyl (meth)acrylate with amines;

(xiii) polymerizable unsaturated monomers having at least two polymerizable unsaturated groups per molecule, such as allyl (meth)acrylate and 1,6-hexanediol di(meth)acrylate;

(xiv) epoxy-containing polymerizable unsaturated monomers, such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allyl glycidyl ether;

(xv) (meth)acrylates having alkoxy-terminated polyoxyethylene chains;

(xvi) sulfonic acid group-containing polymerizable unsaturated monomers, such as 2-acrylamido-2-methylpropane-sulfonic acid, 2-sulfoethyl (meth)acrylate, allylsulfonic acid, and 4-styrenesulfonic acid, and sodium salts or ammonium salts of these sulfonic acids;

(xvii) UV-absorbing functional group-containing polymerizable unsaturated monomers, such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole;

(xviii) photostable polymerizable unsaturated monomers, such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine;

(xix) carbonyl-containing polymerizable unsaturated monomers, such as acrolein, diacetonacrylamide, diacetonmethacrylamide, acetoacetoxyethyl methacrylate, formylstyrol, and $C_{4-7}$ vinyl alkyl ketones (e.g., vinyl methyl ketone, vinyl ethyl ketone, and vinyl butyl ketone).

In one embodiment of the present invention, the hydroxy-containing acrylic resin (A2) preferably has a hydroxy value of 1 to 200 mg KOH/g, preferably 2 to 100 mg KOH/g, and more preferably 5 to 60 mg KOH/g, in view of storage stability and water resistance of the resulting coating film. For example, when the aqueous coating composition of the present invention is used as an aqueous first colored coating composition in a 3-coat 1-bake process, the hydroxy-containing acrylic resin (A2) preferably has a hydroxy value within the above-mentioned range.

In another embodiment of the present invention, the hydroxy-containing acrylic resin (A2) preferably has a hydroxy value of 1 to 200 mg KOH/g, preferably 2 to 150 mg KOH/g, and more preferably 5 to 100 mg KOH/g, in view of storage stability and water resistance of the resulting coating film. For example, when a blocked polyisocyanate compound (B1) is used as the crosslinking agent (B), the hydroxy-containing acrylic resin (A2) preferably has a hydroxy value within the above range.

In view of water resistance, etc. of the resulting coating film, the hydroxy containing acrylic resin (A2) preferably has an acid value of 1 to 200 mg KOH/g, more preferably 2 to 150 mg KOH/g, and even more preferably 5 to 80 mg KOH/g.

When a polymerizable unsaturated monomer having at least two polymerizable unsaturated groups per molecule is not contained as a constituent monomer, the hydroxy-containing acrylic resin (A2) preferably has a weight average molecular weight of 2,000 to 5,000,000, and more preferably 20,000 to 2,000,000, in view of appearance, water resistance, etc., of the resulting coating film.

Examples of the polyurethane resin include a resin prepared as follows: a urethane prepolymer is produced by reacting an aliphatic and/or alicyclic polyisocyanate, at least one diol selected from the group consisting of polyetherdiols, polyesterdiols, and polycarbonate diols, a low-molecular-weight polyhydroxy compound, and dimethanol alkanoic acid; the urethane prepolymer is neutralized with a tertiary amine, and emulsified and dispersed in water; and, if necessary, the resulting emulsion is mixed with an aqueous medium containing a chain extender, such as a polyamine, a crosslinking agent, and/or a terminator, to perform a reaction until substantially no isocyanate groups remain. The above method usually yields a self-emulsifiable urethane emulsion with an average particle size of about 0.001 to 3 μm. Examples of commercially available products of the urethane resin include "U-Coat UX-5000" and "U-Coat UX-8100" (trade names, produced by Sanyo Chemical Industries, Ltd.).

Crosslinking Agent (B)

The crosslinking agent (B) is a compound chat can react with a crosslinkable functional group, such as hydroxy, carboxy, or epoxy, in the aqueous film-forming resin (A) to thereby cure the coating composition of the present invention. Examples of the crosslinking agent (B) include amino resins, polyisocyanate compounds, blocked polyisocyanate compounds, epoxy-containing compounds, carboxy-containing compounds, and carbodiimide-containing compounds. Among these, amino resins and blocked polyisocyanate compounds, which can react with hydroxy, and carbodiimide-containing compounds, which can react with carboxy, are preferable in view of water resistance of the resulting coating film. Amino resins are particularly preferable. Such crosslinking agents (B) may be used singly, or in a combination of two or more.

Examples of usable amino resins include partially or fully methylolated amino resins obtained by reacting amino components with aldehyde components. Examples of the amino components include melamine, urea, benzoguanamine, acetoguanamine, steroguanamine, spiroguanamine, and dicyandiamide. Examples of the aldehyde components include formaldehyde, paraformaldehyde, acetaldehyde, and benzaldehyde.

The methylolated amino resins in which some or all of the methylol groups have been etherified with suitable alcohols are also usable. Examples of alcohols that can be used for the etherification include methyl alcohol, ethyl alcohol, n-propyl alcohol, isopropyl alcohol, n-butyl alcohol, isobutyl alcohol, 2-ethylbutanol, and 2-ethylhexanol.

The amino resin is preferably a melamine resin. In particular, a methyl-etherified melamine resin obtained by etherifying some or all of the methylol groups of a partially or fully methylolated melamine resin with methyl alcohol; a butyl-etherified melamine resin obtained by etherifying some or all of the methylol groups of a partially or fully methylolated melamine resin with butyl alcohol; and a methyl-butyl-etherified melamine resin obtained by etherifying some or all of the methylol groups of a partially or fully methylolated melamine resin with methyl alcohol and butyl alcohol are preferable. A methyl-butyl mixed etherified melamine resin is more preferable.

The melamine resin preferably has a weight average molecular weight of 400 to 6,000, more preferably 500 to 4,000, and even more preferably 600 to 3,000.

Commercially available melamine resins can be used as the melamine resin. Examples of such commercially available products include "Cymel 202," "Cymel 203," "Cymel 204," "Cymel 211," "Cymel 238," "Cymel 251," "Cymel 303," "Cymel 323," "Cymel 324," "Cymel 325," "Cymel 327," "Cymel 350," "Cymel 385," "Cymel 1156," "Cymel 1158," "Cymel 1116," and "Cymel 1130" (all produced by Nihon Cytec Industries Inc.); and "U-VAN 120," "U-VAN 20HS," "U-VAN 20SE60," "U-VAN 2021," "U-VAN 2028," and "U-VAN 28-60" (all produced by Mitsui Chemicals, Inc.).

When a melamine resin is used as the crosslinking agent (B), a sulfonic acid such as p-toluenesulfonic acid, dodecylbenzenesulfonic acid, or dinonylnaphthalene sulfonic acid, salts of these acids with amine compounds, or the like can be used as a catalyst.

The blocked polyisocyanate compound is a polyisocyanate compound having at least two isocyanate groups per molecule, and is obtained by blocking isocyanate groups (—N—C=O group) of the polyisocyanate compound with a blocking agent.

Examples of the polyisocyanate compound having at least two isocyanate groups per molecule include aliphatic diisocyanate compounds such as hexamethylene diisocyanate, trimethylhexamethylene diisocyanate, dimer acid diisocyanate, and lysine diisocyanate; alicyclic diisocyanate compounds such as hydrogenated xylylene diisocyanate, cyclohexylene diisocyanate, and isophorone diisocyanate; aromatic diisocyanate compounds such as tolylene diisocyanate, phenylene diisocyanate, 4,4'-diphenylmethane diisocyanate, xylylene diisocyanate, tetramethylxylylene diisocyanate, and naphthalene diisocyanate; trivalent or higher organic polyisocyanate compounds such as 2-isocyanato-ethyl-2,6-diisocyanatocaproate, 3-isocyanatomethyl-1,6-hexamethylene diisocyanate, and 4-isocyanatomethyl-, 8-octamethylene diisocyanate (common name: triaminononane triisocyanate); dimers and trimers of such polyisocyanate compounds (biuret adducts, isocyanurates, etc.); and prepolymers obtained by urethanization reactions of such polyisocyanate compounds with polyhydric alcohols, low-molecular-weight polyester resins, or water, under conditions such that isocyanate groups are present in excess.

Examples of the blocking agents include phenol compounds such as phenol, cresol, xylenol, nitrophenol, ethylphenol, hydroxydiphenyl, butylphenol, isopropylphenol, nonylphenol, octylphenol, and methyl hydroxybenzoate; lactam compounds such as ε-caprolactam, δ-valerolactam, γ-butyrolactam, and β-propiolactam; aliphatic alcohol compounds such an methanol, ethanol, propyl alcohol, butyl alcohol, amyl alcohol, and lauryl alcohol; ether compounds such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol compounds such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime compounds such as formamide oxime, acetamide oxime, acetoxime, methyl ethyl ketoxime, diacetyl monoxime, benzophenone oxime, and cyclohexane oxime; active methylene compounds such as dimethyl malonate, diethyl malonate, ethyl acetoacetate, methyl acetoacetate, and acetylacetone; mercaptan compounds such as butyl mercaptan, tert-butyl mercaptan, hexyl mercaptan, tert-dodecyl mercaptan, 2-mercaptobenzothiazole, thiophenol, methylthiophenol, and ethylthiophenol; acid amide compounds such as acetanilide, acetanisidide, acetotoluide, acrylamide, methacrylamide, acetic acid amide, stearic acid amide, and benzamide; imide compounds such as succinimide, phthalimide, and maleimide; amine compounds such as diphenylamine, phenylnaphthylamine, xylidine, N-phenylxylidine, carbazole, aniline, naphthylamine, butylamine, dibutylamine, and butylphenylanime; imidazole compounds such as imidazole and 2-ethylimidazole; urea compounds such as urea, thiourea, ethylene urea, ethylenethiourea, and diphenylurea; carbamate compounds such as phenyl N-phenylcarbamate; imine compounds such as ethyleneimine and propyleneimine; sulfite compounds such as sodium bisulfite and potassium bisulfite; and azole compounds. Examples of such azole compounds include pyrazole or pyrazole derivatives such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives such as imidazole, benzimidazole, 2-methylimidazole, 2-ethylimidazole, and 2-phenylimidazole; and imidazoline derivatives such as 2-methylimidazoline and 2-phenylimidazoline.

Particularly preferable blocking agents are, for example, oxime compounds, active methylene compounds, and pyrazole of pyrazole derivatives.

As the blocking agent, a hydroxycarboxylic acid that has at least one hydroxy group and at least one carboxy group, such as hydroxypivalic acid or dimethylolpropionic acid, can also be used. Blocked polyisocyanate compounds that are rendered water-dispersible by blocking their isocyanate groups with the hydroxycarboxylic acid and then neutralizing the carboxy group of the hydroxycarboxylic acid are particularly preferable for use.

As the carbodiimido-containing compound, for example, those obtained by reacting isocyanate groups of the polyisocyanate compound with each other to remove carbon dioxide can be used. As the carbodiimido-containing compound, commercially available products can also be used. Examples of such commercially available products include "Carbodilite V-02," "Carbodilite V-02-L2," "Carbodilite V-04," "Carbodilite E-01," and "Carbodilite E-02" (trade names, all produced by Nisshinbo).

Blocked Polyisocyanate Compound (B1)

One of the preferable embodiments of the coating composition of the present invention is a coating composition comprising a blocked polyisocyanate compound (B1) described below as the crosslinking agent (B).

The blocked polyisocyanate compound (B1) is a blocked polyisocyanate compound having at least one blocked isocyanate group selected from the group consisting of a blocked isocyanate group represented by formula (I)

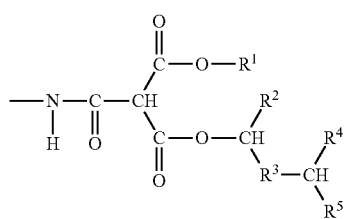

(wherein $R^1$, $R^2$, $R^4$, and $R^5$ independently represent a $C_{1-12}$ hydrocarbon group, and $R^3$ is a $C_{1-12}$ linear or branched alkylene group), a blocked isocyanate group represented by formula (II)

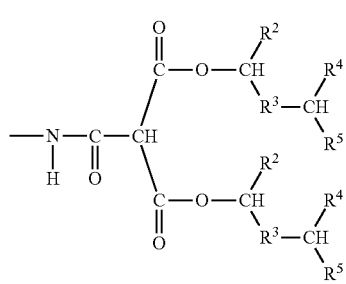

(wherein $R^2$, $R^3$, $R^4$, and $R^5$ are the same as above), and a blocked isocyanate group represented by formula (III)

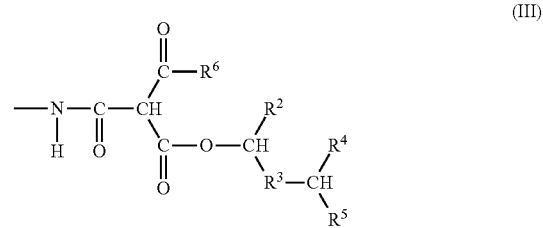

(wherein $R^2$, $R^3$, $R^4$, and $R^5$ are the same as above, and $R^6$ is a $C_{1-12}$ hydrocarbon group).

Examples of $C_{1-12}$ hydrocarbon groups include linear or branched alkyl groups, such as methyl, ethyl, n-propyl, isopropyl, n-butyl, isobutyl, sec-butyl, t-butyl, n-pentyl, n-hexyl, 2-ethylhexyl, n-heptyl, n-octylnonyl, n-decyl, n-undecyl, and n-dodecyl; and aryl groups such as phenyl and benzyl.

Specific examples of $R^1$ include methyl, ethyl, propyl, isopropyl, n-butyl, isobutyl, sec-butyl, t-butyl, n-pentyl, n-hexyl, 2-ethylhexyl, phenyl, and benzyl. Among these, alkyl groups having 1 to 3 carbon atoms, such as methyl, ethyl, and isopropyl, are preferable, and isopropyl is particularly preferable.

$R^2$, $R^4$, and $R^5$ are each preferably methyl.

Specific examples of $R^3$ include $C_{1-12}$ linear or branched alkylene groups, which are represented by $-C_pH_{2p}-$ (wherein p is an integer of 1 to 12). Preferable examples of $R^3$ include $C_{1-12}$ linear or branched alkylene groups, which are represented by $-(CH_2)_p-$ (wherein p is an integer of 1 to 12). $R^3$ is particularly preferably an alkylene group having 1 to 3 carbon atoms (methylene, ethylene, propylene, or trimethylene).

Specific examples of $R^6$ include methyl and isopropyl. Isopropyl is particularly preferable.

The above blocked polyisocyanate compound (B1) can be obtained, for example, by reacting isocyanate groups of the polyisocyanate compound (b1) having at least two isocyanate groups per molecule with an active methylene compound (b2) to obtain a blocked polyisocyanate compound (b3), and then reacting the obtained blocked polyisocyanate compound (b3) with a secondary alcohol (b4).

Polyisocyanate Compound (b1)

The polyisocyanate compound (b1) is a compound having at least two isocyanate groups per molecule. Examples of such compounds include aliphatic polyisocyanates, alicyclic polyisocyanates, aromatic-aliphatic polyisocyanates, aromatic polyisocyanates, and derivatives of such polyisocyanates.

Examples of the aliphatic polyisocyanates include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimeric acid diisocyanate, and methyl 2,6-diisocyanatohexanoate (common name: lysine diisocyanate); and aliphatic triisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl) diisocyanate (common name: hydrogenated MDI), and norbornane diisocyanate; and alicyclic triisocyanates such as 1,3,5-triisocyanatocyclohexane, 1,3,5-trimethylisocyanatocyclohexane, 2-(3-isocynatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl) 2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane.

Examples of the aromatic-aliphatic polyisocyanates include aromatic-aliphatic diisocyanates such as methylenebis(4,1-phenylene)diisocyanate (common name: MDI), 1,3- or 1,4-xylylene diisocyanate or mixtures thereof, $\omega,\omega'$-diisocyanato-1,4-diethylbenzene, and 1,3- or 1,4-bis(1-isocyanato-1-methylethyl)benzene (common name: tetramethylxylylene diisocyanate) or mixtures thereof; and aromatic-aliphatic triisocyanates such as 1,3,5-triisocyanatomethylbenzene.

Examples of the aromatic polyisocyanates include aromatic diisocyanates such as m-phenylene diisocyanate, p-phenylene diisocyanate, 4,4'-diphenyldiisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates such as triphenylmethane-4,4',4''-triisocyanate, 3,3,5-triisocyanatobenzene, and 2,4,6-triisocyanatotoluene; and aromatic tetraisocyanates such as 4,4'-diphenylmethane-2,2',5,5'-tetraisocyanate.

Examples of the polyisocyanate derivative include dimers, trimers, biuret adducts, allophanates, urethodiones, urethoimines, isocyanurates, oxadiazinetriones, polymethylene polyphenyl polyisocyanates (crude MDI; polymeric MDI), crude TDI, and like derivatives of the above-mentioned polyisocyanate compounds.

Such polyisocyanates and derivatives thereof can be used singly, or in a combination of two or more. Among these polyisocyanates, aliphatic diisocyanates, alicyclic diisocyanates, and derivatives of these diisocyanates are preferable as the polyisocyanate compound (b1) because yellowing is less likely to occur during heating of the obtained blocked polyisocyanate compound (B1). From the viewpoint of improving flexibility of the resulting coating film, aliphatic diisocyanates and derivatives thereof are more preferable.

It is also possible to use, as the polyisocyanate compound (b1), a prepolymer formed by reacting the polyisocyanate or a derivative thereof with a compound reactive to the polyisocyanate under conditions such that the isocyanate groups are present in excess. Examples of the compound reactive to the polyisocyanate includes compounds that have active hydrogen groups such as hydroxy or amino, and specific examples thereof include polyhydric alcohols, low-molecular-weight polyester resins, amine, and water.

As the polyisocyanate compound (b1), a homopolymer of an isocyanate-containing polymerizable unsaturated monomer, or a copolymer of the isocyanate-containing polymerizable unsaturated monomer and a polymerizable unsaturated monomer other than the isocyanate-containing polymerizable unsaturated monomer may be used.

In view of reactivity of the obtained blocked polyisocyanate compound (B1) and compatibility of the blocked polyisocyanate compound (B1) with other coating components, the polyisocyanate compound (b1) preferably has a number average molecular weight of 300 to 20,000, more preferably 400 to 8,000, and even more preferably 500 to 2,000.

In view of reactivity of the obtained blocked polyisocyanate compound (B1) and compatibility of the blocked polyisocyanate compound (B1) with other coating components, the polyisocyanate compound (b1) preferably has an average isocyanate functionality per molecule of 2 to 100. In terms of enhancing the reactivity of the obtained blocked polyisocyanate compound (B1), the lower limit of the average isocyanate functionality per molecule is preferably 3. In view of preventing gelation during the production of the blocked polyisocyanate compound (B1), the upper limit of the average isocyanate functionality per molecule is preferably 20.

Active Methylene Compound (b2)

Examples of the active methylene compound (b2) that blocks isocyanate groups of the polyisocyanate compound (b1) include malonate esters such as dimethyl malonate, diethyl malonate, di-n-propyl malonate, diisopropyl malonate, di-n-butyl malonate, diisobutyl malonate, di-sec-butyl malonate, di-t-butyl malonate, di-n-pentyl malonate, di-n-hexyl malonate, di(2-ethylhexyl) malonate, methyl isopropyl malonate, ethyl isopropyl malonate, methyl n-butyl malonate, ethyl n-butyl malonate, methyl isobutyl malonate, ethyl isobutyl malonate, methyl sec-butyl malonate, ethyl sec-butyl malonate, diphenyl malonate, and dibenzyl malonate; acetoacetates such as methyl acetoacetate, ethyl acetoacetate, n-propyl acetoacetate, isopropyl acetoacetate, n-butyl acetoacetate, isobutyl acetoacetate, sec-butyl acetoacetate, t-butyl acetoacetate, n-pentyl acetoacetate, n-hexyl acetoacetate, 2-ethylhexyl acetoacetate, phenyl acetoacetate, and benzyl acetoacetate; and isobutyryl acetates such as isobutyryl methyl acetate, isobutyryl ethyl acetate, isobutyryl n-propyl acetate, isobutyl isopropyl acetate, isobutyryl n-butyl acetate, isobutyl isobutyryl acetate, isobutyryl sec-butyl acetate, isobutyryl t-butyl acetate, isobutyryl n-pentyl acetate, isobutyryl n-hexyl acetate, isobutyryl 2-ethylhexyl acetate, isobutyryl phenyl acetate, and isobutyryl benzyl acetate. These can be used singly, or in a combination of two or more.

In view of smoothness and distinctness of image of the resulting multilayer coating film, the active methylene compound (b2) is preferably at least one compound selected from the group consisting of dimethyl malonate, diethyl malonate, diisopropyl malonate, methyl acetoacetate, ethyl acetoacetate, isobutyryl methyl acetate, and isobutyryl ethyl acetate, and more preferably at least one compound selected from the group consisting of diisopropyl malonate, isobutyryl methyl acetate, and isobutyryl ethyl acetate. In view of smoothness and distinctness of image of the resulting multilayer coating film as well as reactivity of the obtained blocked polyisocyanate compound (B) and storage stability of the coating composition of the invention, diisopropyl malonate is particularly preferable.

If necessary, a reaction catalyst may be used for the blocking reaction of isocyanate groups with the active methylene compound (b2). As the reaction catalyst, for example, basic compounds such as metal hydroxides, metal alkoxides, metal carboxylates, metal acetylacetonates, hydroxides of onium salts, onium carboxylates, metal salts of active methylene compounds, onium salts of active methylene compounds, aminosilanes, amines, and phosphines can be preferably used. Among these, ammonium salts, phosphonium salts, and sulfonium salts are preferable as onium salts. It is usually preferable that the amount of reaction catalyst is in the range of 10 to 10,000 ppm, and more preferably 20 to 5,000 ppm, based on the total solid mass of the polyisocyanate compound (b1) and the active methylene compound (b2).

The blocking reaction of the isocyanate groups by the active methylene compound (b2) can be carried out at 0 to 150° C. In the reaction, a solvent may be used. In this case, the solvent is preferably a non-protic solvent. Esters, ethers, N-alkylamides, ketones, and the like are particularly preferable. When the reaction has progressed as desired, the reaction may be terminated by adding an acid component to neutralize the basic compound as a catalyst.

The amount of the active methylene compound (b2) to be used in the blocking reaction of the isocyanate groups by the active methylene compound (b2) is not particularly limited but is preferably from 0.1 to 3 moles, more preferably 0.2 to 2 moles, per mole of the isocyanate groups in the polyisocyanate compound (b1). The active methylene compound that has not reacted with the isocyanate groups in the polyisocyanate compound (b1) can be removed after the blocking reaction.

Other blocking agents such as alcohol, phenol, oxime, amine, acid amides, imidazole, pyridine, or mercaptan blocking agents may also be used in combination with the active methylene compound (b2).

Some of the isocyanate groups in the polyisocyanate compound (b1) may be reacted with an active hydrogen-containing compound. The reaction of some of the isocyanate groups in the polyisocyanate compound (b1) with an active hydrogen-containing compound can enhance storage stability of the obtained blocked polyisocyanate compound (B1), adjustment of compatibility of the blocked polyisocyanate compound (B1) with other coating components, and flexibility of the resulting coating film.

When some of the isocyanate groups in the polyisocyanate compound (b1) are reacted with an active hydrogen-containing compound as mentioned above, the order of the reactions of the polyisocyanate compound (b1), active methylene compound (b2), and active hydrogen-containing compound is not particularly limited. For example, the following methods can be used. After some of the isocyanate groups in the polyisocyanate compound (b1) are blocked with an active methylene compound (b2), the residual isocyanate groups are reacted with an active hydrogen-containing compound. Alternatively, after some of the isocyanate groups in the polyisocyanate compound (b1) are reacted with an active hydrogen-containing compound, the residual isocyanate groups are blocked with an active methylene compound (b2). Further alternatively, isocyanate groups in the polyisocyanate compound (b1) are reacted simultaneously with an active methylene compound (b2) and an active hydrogen-containing compound.

Examples of the active hydrogen-containing compound include hydroxy-containing compounds and amino-group containing compounds.

Examples of hydroxy-containing compounds include propanol, butanol, pentanol, hexanol, heptanol, 2-ethyl-1-hexanol, octanol, nonanol, decanol, tridecanol, stearyl alcohol, ethylene glycol, propylene glycol, polyethylene glycol, polypropylene glycol, polyethylene glycol (propylene glycol), polyethylene glycol monoalkyl ether, polypropylene glycol monoalkyl ether, polyethylene glycol(propylene glycol) monoalkyl ether, trimethylolpropane, and the like. These compounds can be used singly, or in a combination of two or more. In this specification, "polyethylene glycol (propylene glycol)" refers to a copolymer of ethylene glycol and propylene glycol, and includes any of blocked copolymers and random copolymers.

In view of suppressing viscosity increase of the blocked polyisocyanate compound (B1), the hydroxy-containing compound is preferably a monovalent alcohol. Examples of the monovalent alcohol include propanol, butanol, pentanol, hexanol, heptanol, 2-ethyl-1-hexanol, octanol, nonanol, decanol, tridecanol, stearyl alcohol, polyethylene glycol monoalkyl ether, polypropylene glycol monoalkyl ether, and polyethylene glycol(propylene glycol) monoalkyl ether. These can be used singly, or in a combination of two or more.

Examples of the amino group-containing compounds include butylamine, octylamine, stearylamine, dibutylamine, dioctylamine, dicyclohexylamine, di-lauryl amine, α-(aminoalkyl)-ω-alkoxy polyoxyethylene (oxypropylene), hexamethylenediamine, diethylenetriamine, polyoxypropylene-α,ω-diamine (examples of commercially available products include "Jeffamine D-400" produced by Huntsman Corporation). These can be used singly, or in a combination of two or more.

In view of suppressing high viscosity of the obtained blocked polyisocyanate compound (B1), the amino group-containing compound is particularly preferably a monovalent amine. Examples of the monovalent amine include butylamine, octylamine, stearylamine, dibutylamine, dioctylamine, dicyclohexylamine, dilauryl amine, and α-(aminoalkyl)-ω-alkoxy polyoxyethylene(oxypropylene). These can be used singly, or in a combination of two or more.

In view of storage stability and curability of the coating composition of the invention and smoothness, distinctness of image, and adhesion of the resulting multilayer coating film, the reaction ratio of the active hydrogen-containing compound to the polyisocyanate compound (b1) in the reaction of some of the isocyanate groups in the polyisocyanate compound (b1) with the active hydrogen-containing compound is preferably such that the number of moles of the active hydrogen in the active hydrogen-containing compound is 0.03 to 0.6 mole per mole of the isocyanate groups in the polyisocyanate compound (b1). In view of curability of the coating composition of the invention and adhesion of the resulting multilayer coating film, the upper limit is preferably 0.4, and more preferably 0.3. In view of smoothness and distinctness of image of the resulting multilayer coating film, the lower limit is preferably 0.04, and more preferably 0.05.

In view of smoothness, distinctness of image, and adhesion of the resulting multilayer coating film, the blocked polyisocyanate compound (B1) is preferably a blocked polyisocyanate compound (B1') having a hydrophilic group.

The blocked polyisocyanate compound (B1') can be obtained, for example, by using an active hydrogen-containing compound having a hydrophilic group as the active hydrogen-containing compound.

As the active hydrogen-containing compound having a hydrophilic group, an active hydrogen-containing compound having a nonionic hydrophilic group, an active hydrogen-containing compound having an anionic hydrophilic group, an active hydrogen containing compound having a cationic hydrophilic group, or the like can be used. These compounds can be used singly, or in a combination of two or more. Among these, active hydrogen-containing compounds having nonionic hydrophilic groups are preferable because the reaction of blocking isocyanate groups in the polyisocyanate compound (b1) by the active methylene compound (b2) is less likely to be inhibited.

As the active hydrogen-containing compound having a nonionic hydrophilic group, for example, an active hydrogen-containing compound having a polyoxyalkylene group can be preferably used. Examples of the polyoxyalkylene group include polyoxyethylene, polyoxypropylene, and polyoxyethylene(oxypropylene). These can be used singly, or in a combination of two or more. In view of storage stability of the coating composition, an active hydrogen-containing compound having a polyoxyethylene group is particularly preferable.

In view of storage stability of the coating composition of the invention and adhesion of the resulting multilayer coating film, the active hydrogen-containing compound having a polyoxyethylene group preferably contains at least 3, preferably 5 to 100, and more preferably 8 to 45 continuous oxyethylene groups.

The active hydrogen-containing compound having a polyoxyethylene group may contain an oxyalkylene group other than the continuous oxyethylene groups. Examples of oxyalkylene groups other than the oxyethylene groups include oxypropylene, oxybutylene, and oxystyrene. In view of storage stability of the coating composition of the invention, the molar ratio of the oxyethylene group in oxyalkylene groups of the active hydrogen-containing compound having a polyoxyethylene group is preferably 20 to 100 mol %, and more preferably 50 to 100 mol %. When the molar ratio of the oxyethylene group in oxyalkylene groups is less than 20 mol %, sufficient hydrophilicity may not be imparted, thus resulting in reduced storage stability of the coating composition.

In view of storage stability of the coating composition of the invention and water resistance of the resulting multilayer coating film, the active hydrogen-containing compound having a nonionic hydrophilic group preferably has a number average molecular weight of 200 to 2,000. The lower limit of the number average molecular weight is preferably 300, and more preferably 400, in view of storage stability of the coating composition of the invention. The upper limit of the number average molecular weight is preferably 1,500, and more preferably 1,200, in view of water resistance of the resulting multilayer coating film.

Examples of the active hydrogen-containing compound having a nonionic hydrophilic group include polyethylene glycol monoalkyl ethers (alternate name: ω-alkoxypolyoxyethylenes), such as polyethylene glycol monomethyl ether and polyethylene glycol monoethyl ether; polypropyleneglycol monoalkyl ethers (alternate name: ω-alkoxypolyoxypropylenes), such as polypropyleneglycol monomethyl ether and polypropyleneglycol monoethyl ether; ω-alkoxypolyoxyethylene(oxypropylene), such as ω-methoxypolyoxyethylene (oxypropylene) and ω-ethoxypolyoxyethylene (oxypropylene); polyethylene glycol (propylene glycol) monoalkyl ethers, such as polyethylene glycol (propylene glycol)monomethyl ether and polyethylene glycol (propylene glycol)monoethyl ether; and polyethylene glycol, polypropylene glycol, polyethylene glycol (propylene glycol), α-(aminoalkyl)-ω-alkoxypolyoxyethylene, α-(aminoalkyl)-ω-alkoxypolyoxypropylene, α-(aminoalkyl)-ω-alkoxypolyoxyethylene(oxypropylene), and the like. These can be used singly, or in a combination of two or more. Among these, polyethylene glycol monomethyl ether, polyethylene glycol monoethyl ether, and polyethylene glycol are preferable. Polyethylene glycol monomethyl ether is more preferable.

Examples of commercial available products of the polyethylene glycol monomethyl ether include "Uniox M-400," "Uniox M-550," "Uniox M-1000," and "Uniox M-2000," all produced by NOF Corporation. Examples of commercially available products of the polyethylene glycol include "PEG #200," "PEG #300," "PEG #400," "PEG #600," "PEG #1000," "PEG #1500," "PEG #1540," and "PEG #2000," all produced by NOF Corporation.

As the active hydrogen-containing compound having an anionic hydrophilic group, for example, an active hydrogen-containing compound having a carboxy group, an active hydrogen-containing compound having a sulfonic acid group, an active hydrogen-containing compound having a phosphoric acid group, and their neutralized salts can be used. These can be used singly, or in a combination of two or more. Among these, active hydrogen-containing compounds having carboxy groups are preferable in view of compatibility of the resulting blocked polyisocyanate compound (B1) with other coating components.

Some or all of the acid groups in the active hydrogen-containing compound having an anionic hydrophilic group are preferably neutralized with a basic compound, because the reaction of blocking isocyanate groups in the polyisocyanate compound (b1) with the active methylene compound (b2) described above is less likely to be inhibited.

The acid group in the active hydrogen-containing compound having an anionic group may be neutralized before or after the reaction of the active hydrogen-containing compound having an anionic group with the polyisocyanate compound (b1).

Examples of the basic compound include hydroxides of alkali metals or alkaline earth metals, such as sodium hydroxide, potassium hydroxide, lithium hydroxide, calcium hydroxide, and barium hydroxide; metal alkoxides; ammonia; primary monoamines such as ethylamine, propylamine, butylamine, benzylamine, monoethanolamine, 2,2-dimethyl-3-amino-1-propanol, 2-aminopropanol, 2-amino-2-methyl-1-propanol, and 3-aminopropanol; secondary monoamines, such as diethylamine, diethanolamine, di-n-propanolamine, diisopropanolamine, N-methylethanolamine, and N-ethylethanolamine; tertiary monoamines, such as dimethylethanolamine, trimethylamine, triethylamine, triisopropylamine, methyldiethanolamine, and 2-(dimethylamino)ethanol; and polyamines such as diethylenetriamine, hydroxyethylaminoethylamine, ethylaminoethylamine, and methylaminopropylamine. These can be used singly, or in a combination of two or more. The amount of the basic compound is typically in the range of 0.1 to 1.5 equivalents, and preferably 0.2 to 1.2 equivalents, relative to the anionic group in the active hydrogen-containing compound having an anionic group.

Examples of the active hydrogen-containing compound having a carboxy group include monohydroxycarboxylic acids such as glycolic acid, lactic acid, hydroxypivalic acid, malic acid, and citric acid; dihydroxycarboxylic acids such as 2,2-dimethylolacetic acid, 2,2-dimethylollactic acid, 2,2-dimethylolpropionic acid, 2,2-dimethylolbutanoic acid, dimethylolheptanoic acid, dimethylolnonanoic acid, 2,2-dimethylolbutyric acid, and 2,2-dimethylolvaleric acid; lactone ring-opening adducts of these dihydroxycarboxylic acids; glycine, 1-carboxy-1,5-pentylenediamine, dihydroxybenzoic acid, 3,5-diaminobenzoic acid, lysine, and arginine.

Examples of the active hydrogen-containing compound having a sulfonic acid group include 2-amino-1-ethanesulfonic acid, N,N-bis(2-hydroxyethyl)-2-aminoethanesulfonic acid, 1,3-phenylenediamine-4,6-disulfonic acid, diaminobutanesulfonic acid, 3,6-diamino-2-toluenesulfonic acid, 2,4-diamino-5-toluenesulfonic acid, 2-(cyclohexylamino)-ethanesulfonic acid, and 3-(cyclohexylamino)-propanesulfonic acid.

Examples of the active hydrogen-containing compound having a phosphoric acid group include 2,3-dihydroxypropyl phenyl phosphate, hydroxyalkylphosphonic acids, and aminoalkylphosphonic acids.

The reaction of some of the isocyanate groups in the polyisocyanate compound (b1) with the active hydrogen-containing compound having a hydrophilic group can be carried out at 0 to 150° C. In the reaction, a solvent may be used. In this case, the solvent is preferably an aprotic solvent. Ether, N-alkylamide, ketone, and the like are particularly preferable. The active hydrogen-containing compound that has not reacted with isocyanate groups of the polyisocyanate compound (b1) can be removed after completion of the reaction.

When some of the isocyanate groups of the polyisocyanate compound (b1) are to be reacted with the active hydrogen-containing compound having a hydrophilic group, the reaction ratio of the active hydrogen-containing compound having a hydrophilic group to the polyisocyanate compound (b1) is 0.03 to 0.6 mole of the active hydrogen in the active hydrogen-containing compound per mole of the isocyanate groups in the polyisocyanate compound (b1), in view of storage stability and curability of the coating composition of the invention and smoothness, distinctness of image, and adhesion of the resulting multilayer coating film. The upper limit of the ratio is preferably 0.4, and more preferably 0.3, in view of curability of the coating composition of the invention and water resistance of the resulting multilayer coating film. The lower limit of the ratio is preferably 0.04, and more preferably 0.05, in view of storage stability of the coating composition of the invention and smoothness and distinctness of image of the resulting multilayer coating film.

The blocked polyisocyanate compound (B1) may also be added as a mixture with a surfactant to impart water dispersibility. In this case, the surfactant is preferably a nonionic surfactant and/or anionic surfactant, in view of stability of the coating composition.

Blocked Polyisocyanate Compound (b3)

The blocked polyisocyanate compound (b3) is a compound obtained by reacting a polyisocyanate compound (b1) having at least two isocyanate groups per molecule with an active methylene compound (b2), so that some or all of the isocyanate groups in the polyisocyanate compound (b1) are blocked with the active methylene compound (b2).

It is particularly preferable that the blocked polyisocyanate compound (b3) is at least one blocked isocyanate compound selected from the blocked polyisocyanate compound (b3-1) having a blocked isocyanate group represented by formula (IV)

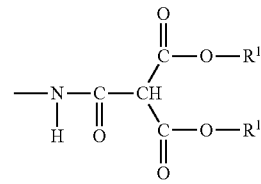

(wherein each $R^1$ independently represents a $C_{1-12}$ hydrocarbon group and may be the same or different), and the blocked polyisocyanate compound (b3-2) having a blocked isocyanate group represented by formula (V)

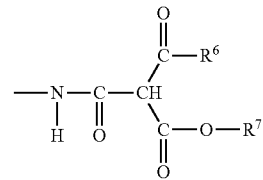

(wherein $R^6$ and $R^7$ independently represent a $C_{1-12}$ hydrocarbon group).

Blocked Polyisocyanate Compound (b3-1)

The blocked polyisocyanate compound (b3-1) is a blocked polyisocyanate compound having a blocked isocyanate group represented by formula (IV).

The blocked polyisocyanate compound (b3-1) is preferably one wherein $R^1$ is a $C_{1-3}$ alkyl group because an active methylene compound that can be relatively easily produced can be used as the active methylene compound (b2), which is one of the starting materials for the blocked polyisocyanate compound. In view of improving compatibility of the resulting blocked polyisocyanate compound (B1) with other coating components, $R^1$ is more preferably an alkyl group having 2 or 3 carbon atoms. In view of storage stability of the coating composition of the invention, and smoothness and distinctness of image of the resulting multilayer coating film, $R^1$ is more preferably an isopropyl group.

The blocked polyisocyanate compound (b3-1) may be obtained, for example, by reacting the polyisocyanate compound (b1) and a dialkyl malonate having a $C_{1-12}$ hydrocarbon group.

Examples of the dialkyl malonates include dimethyl malonate, diethyl malonate, di-n-propyl malonate, diisopropyl malonate, di-n-butyl malonate, di-isobutyl malonate, di-sec-butyl malonate, di-tert-butyl malonate, di-n-pentyl malonate, di-n-hexyl malonate, and di(2-ethylhexyl) malonate. These can be used singly, or in a combination of two or more. Among these, dimethyl malonate, diethyl malonate, di-n-propyl malonate, di-isopropyl malonate, di-n-butyl malonate, di-isobutyl malonate, di-sec-butyl malonate, and di-tert-butyl malonate are preferable; diethyl malonate, di-n-propyl malonate, and di-isopropyl malonate are more preferable; and di-isopropyl malonate is even more preferable.

Blocked Polyisocyanate Compound (b3-2)

The blocked polyisocyanate compound (b3-2) is a blocked polyisocyanate compound having a blocked isocyanate group represented by formula (V).

The blocked polyisocyanate compound (b3-2) is preferably one wherein $R^6$ and $R^7$ are $C_{1-3}$ alkyl groups, in view of usability of an active methylene compound that can be relatively easily produced, as the active methylene compound (b2) that is one of the starting materials for the blocked polyisocyanate compound. In view of enhancing compatibility of the resulting blocked polyisocyanate compound with other coating components, $R^6$ and $R^7$ are more preferably alkyl groups having 2 or 3 carbon atoms. In view of storage stability of the coating composition of the invention, and smoothness and distinctness of image of the multilayer coating film, $R^6$ and $R^7$ are more preferably isopropyl groups.

The blocked polyisocyanate compound (b3-2) can be obtained, for example, by reacting a polyisocyanate compound (b1) with an acetoacetic acid ester having a $C_{1-12}$ hydrocarbon group or with an isobutyrylacetic acid ester having a $C_{1-12}$ hydrocarbon group. The active methylene compound (b3-2) is preferably obtained by reacting the polyisocyanate compound (b2) with an isobutyrylacetic acid ester having a $C_{1-12}$ hydrocarbon group.

Examples of the isobutyrylacetic acid esters include methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate, and benzyl isobutyrylacetate. These can be used singly, or in a combination of two or more. Among these, methyl isobutyrylacetate, ethyl isobutyrylacetate, and isopropyl isobutyrylacetate are preferable.

Examples of the acetoacetic acid esters include methyl acetoacetate, ethyl acetoacetate, n-propyl acetoacetate, isopropyl acetoacetate, n-butyl acetoacetate, isobutyl acetoacetate, sec-butyl acetoacetate, tort-butyl acetoacetate, n-pentyl acetoacetate, n-hexyl acetoacetate, 2-ethylhexyl acetoacetate, phenyl acetoacetate, and benzyl acetoacetate. These can be used singly, or in a combination of two or more. Methyl acetoacetate, ethyl acetoacetate, and isopropyl acetoacetate are particularly preferable.

The blocked polyisocyanate compound (b3) may be a compound obtained by reacting a polyisocyanate compound (b1) having at least 2 isocyanate groups per molecule with an active methylene compound (b2) and an active hydrogen-containing compound as mentioned above. Specifically, for example, when an active hydrogen-containing having a polyoxyalkylene group as mentioned above is used as the active hydrogen-containing compound, a blocked polyisocyanate compound in which some of the isocyanate groups in the polyisocyanate compound (b1) are blocked with the active methylene compound (b2), and some or all of the other isocyanate groups are reacted with the active hydrogen-containing compound having a polyoxyalkylene group can be produced.

In the present invention, the blocked polyisocyanate compound (B1) can be obtained, for example, by reacting the blocked polyisocyanate compound (b3) with a secondary alcohol (b4) represented by formula (VI)

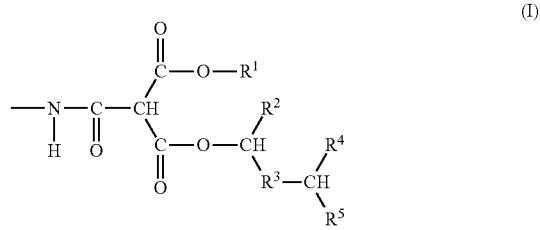

(VI)

(wherein $R^2$, $R^4$, and $R^5$ independently represent a $C_{1-12}$ hydrocarbon group, and $R^3$ is a $C_{1-12}$ linear or branched alkylene group).

Secondary Alcohol (b4)

The secondary alcohol (b4) is a compound represented by formula (VI). A compound wherein $R^2$ is methyl is particularly preferable in view of enhancing the reactivity of the blocked polyisocyanate compound (b3) with the secondary alcohol (b4). If each of $R^3$, $R^4$, and $R^5$ contains many carbon atoms, the resulting blocked polyisocyanate compound (B1) may have low polarity, which results in reduced compatibility with other coating components. Therefore, $R^3$ is preferably $C_{1-3}$ alkylene, and $R^4$ and $R^5$ are each preferably methyl.

Examples of the secondary alcohol (b4) include 4-methyl-2-pentanol, 5-methyl-2-hexanol, 6-methyl-2-heptanol, and 7-methyl-2-octanol. These can be used singly, or in a combination of two or more. Among these, 4-methyl-2-pentanol having a relatively low boiling point is preferable because the unreacted secondary alcohol (b4) can be relatively easily removed at the time of partial or complete removal of the unreacted secondary alcohol (b4) by distillation after reacting the blocked polyisocyanate compound (b3) with the secondary alcohol (b4).

Specifically, the blocked polyisocyanate compound (B1) can be obtained, for example, by reacting the secondary alcohol (b4) and the blocked polyisocyanate compound (b3-1) having a blocked isocyanate group represented by formula (IV)

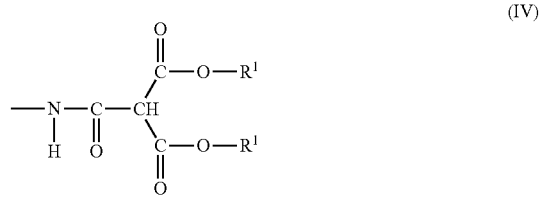

(IV)

(wherein each $R^1$ independently represents $C_{1-12}$ hydrocarbon group, and may be the same or different), which is described in the explanation of the blocked polyisocyanate compound (b3).

In this case, at least one of the $R^1$s in the blocked isocyanate groups in the blocked polyisocyanate compound (b3-1) is replaced with a group represented by formula (VII)

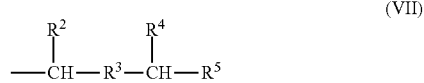

(VII)

(wherein $R^2$, $R^4$, and $R^5$ independently represent a $C_{1-12}$ hydrocarbon group, and $R^3$ is a linear or branched alkylene group).

In this case, the obtained blocked polyisocyanate compound (B1) has a blocked isocyanate group represented by formula (I)

(I)

(wherein $R^1$, $R^2$, $R^4$, and $R^5$, independently represent a $C_{1-12}$ hydrocarbon group, and $R^3$ is a $C_{1-12}$ linear or branched alkylene group), or a blocked isocyanate group represented by formula (II)

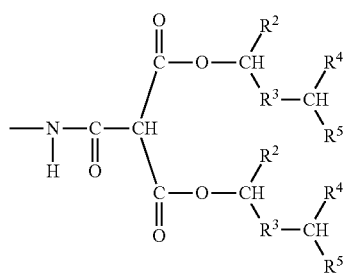

(II)

(wherein $R^2$, $R^3$, $R^4$, and $R^5$ are the same as above).

The reaction of the blocked polyisocyanate compound (b3-1) with the second alcohol (b4) is not particularly limited as long as the reaction method is capable of replacing, for example, at least one of the $R^1$s in the blocked isocyanate groups in the blocked polyisocyanate compound (b3-1) with a group represented by formula (VII). It is particularly preferable to use a method of obtaining a blocked polyisocyanate compound (B1) having a blocked isocyanate group represented by formula (I) or (II) by adjusting off part or all of the alcohol derived from at least one of the $R^1$s in the blocked polyisocyanate compound (b3-1) from the system by heating, vacuuming, etc., and promoting the reaction.

Specifically, as the production method, it is suitable to remove part or all of the alcohol at a temperature of 20 to 150° C., preferably 75 to 95° C., over a period of 5 minutes to 20 hours, preferably 10 minutes to 10 hours, and, if necessary, under reduced pressure. An excessively low temperature is not preferable because the exchange reaction of the alkoxy group in the blocked polyisocyanate compound (b3-1) may progress slowly, and result in reduced production efficiency. An excessively high temperature is also not preferable because severe decomposition/deterioration of the obtained blocked polyisocyanate compound (B1) may occur, and result in reduced curability.

The blocked polyisocyanate compound (B1) can be obtained by reacting the secondary alcohol (b4) and a blocked polyisocyanate compound (b3-2) having a blocked isocyanate group represented by formula (V)

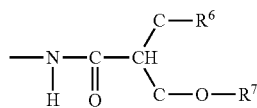

(V)

(wherein $R^6$ and $R^7$ independently represent $C_{1-12}$ hydrocarbon group), which is described above in the explanation of the blocked polyisocyanate compound (b3).

In this case, $R^7$ in the blocked isocyanate group in the blocked polyisocyanate compound (b3-2) is replaced by a group represented by formula (VII)

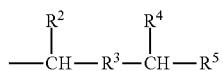

(VII)

(wherein $R^2$, $R^4$, and $R^5$ independently represent a $C_{1-12}$ hydrocarbon group and $R^3$ represents a $C_{1-12}$ linear or branched alkylene group).

In this case, the blocked polyisocyanate compound (B1) has a blocked isocyanate group represented by formula (III)

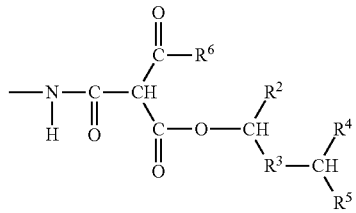

(III)

(wherein $R^2$, $R^3$, $R^4$, and $R^5$ are the same as above, and $R^6$ represents a $C_{1-12}$ hydrocarbon group).

The reaction of the blocked polyisocyanate compound (b3-2) with the secondary alcohol (b4) is not particularly limited, as long as the reaction method is capable of replacing, for example, $R^7$ in the blocked isocyanate group in the blocked polyisocyanate compound (b3-2) with a group represented by formula (VII). It is particularly preferable to use a method of obtaining a blocked polyisocyanate compound (B1) having a blocked isocyanate group represented by formula (III) by distilling off part or all of the alcohol derived from $R^7$ in the blocked polyisocyanate compound (b3-2) from the system by heating, vacuuming, etc., and promoting the reaction.

Specifically, as the production method, it is suitable to remove part or all of the alcohol at a temperature of 20 to 150° C., preferably 75 to 95° C., over a period of 5 minutes to 20 hours, preferably 10 minutes to 10 hours, and, if necessary, under reduced pressure. An excessively low temperature is not preferable because the exchange reaction of the alkoxy group ($R^7$—O—) in the blocked polyisocyanate compound (b3-2) may progress slowly and result in reduced production efficiency. An excessively high temperature is also not preferable because severe decomposition/deterioration of the obtained blocked polyisocyanate compound (B1) may occur, and result in reduced curability.

In view of reactivity of the obtained blocked polyisocyanate compound (B1) and production efficiency, the blending ratio of the secondary alcohol (b4) to the blocked polyisocyanate compound (b3) in the production of the blocked polyisocyanate compound (B1) is preferably such that the amount of the secondary alcohol (b4) is in the range of 5 to 500 parts by mass, more preferably 10 to 200 parts by mass, relative to 100 parts by mass of the solids content of the blocked polyisocyanate compound (b3). When the amount of the secondary alcohol (b4) is less than 5 parts by mass, the reaction of the blocked polyisocyanate compound (b3) with the secondary alcohol (b4) may progress too slowly. When the amount of the secondary alcohol (b4) is more than 500 parts by mass, the concentration of the resulting blocked polyisocyanate compound (B1) may be too low, and result in reduced production efficiency.

In the reaction of the blocked polyisocyanate compound (b3) with the secondary alcohol (b4), in order to control the molecular weight of the blocked polyisocyanate compound (B1), the above-mentioned removing operation may be carried out after addition of the polyfunctional hydroxy-containing compound to the blocked polyisocyanate compound (b3) and the secondary alcohol (b4).

In view of compatibility with other coating components, and smoothness, distinctness of image, water resistance, and chipping resistance of the resulting multilayer coating film, the blocked polyisocyanate compound (B1) preferably has a number average molecular weight of 600 to 30,000. The upper limit of the number average molecular weight is preferably 10,000, and more preferably 5,000, in view of compatibility with other coating components, and smoothness and distinctness of image of the resulting multilayer coating film. The lower limit of the number average molecular weight is preferably 900, and more preferably 1,000, in view of water resistance and chipping resistance of the resulting multilayer coating film.

Acrylic Urethane Resin Composite Particles (C)

The acrylic urethane resin composite particles (C) of the aqueous coating composition of the present invention are resin composite particles comprising a urethane resin component and an acrylic resin component that are present in the same micelle. In the aqueous coating composition of the present invention, the form of the acrylic urethane resin composite particles is not particularly limited as long as the acrylic urethane resin composite particles are dispersed in water. It is preferable that the acrylic urethane resin composite particles are dispersed in water as particles that have a structure in which the acrylic resin component is positioned around the urethane resin component. In other words, preferably, the acrylic urethane resin composite particles are dispersed in water as micelles having a core shell structure in which the acrylic resin component portion (hereinafter sometimes referred to as the acrylic portion) is present outside and the urethane resin component portion (hereinafter sometimes referred to as the urethane portion) is present inside. The core shell structure refers to a structure comprising an inner shell portion (in other words, "the core" or "the central portion") and an outer shell portion (in other words, "the shell").

In one embodiment of the present invention, the urethane resin component and the acrylic resin component are preferably present in the acrylic urethane resin composite particles at a urethane resin:acrylic resin ratio ranging from 5:95 to 50:50 (mass ratio), and more preferably from 10:90 to 40:60. For example, when the aqueous coating composition of the present invention is used as the aqueous first (colored coating composition in a 3-coat 1-bake process, the ratio of the urethane resin component to the acrylic resin component in the acrylic urethane resin composite particles is preferably set to the above-mentioned range.

In another embodiment of the present invention, the urethane resin component and the acrylic resin component are preferably present in the acrylic urethane resin composite particles at a urethane resin:acrylic resin ratio ranging from 3:97 to 50:50 (mass ratio), more preferably from 5:95 to 40:60, and particularly preferably 7:93 to 30:70. For example, when the blocked polyisocyanate compound (B1) is used as a crosslinking agent (B), the ratio of the urethane resin component to the acrylic resin component in the acrylic urethane resin composite particles is preferably set to the above range.

Less than 5 mass % of the urethane resin in the acrylic urethane resin composite particles may result in reduced chipping resistance of the resulting coating film. More than 50 mass % of the urethane resin in the acrylic urethane resin composite particles may result in reduced wash-off of the aqueous coating composition (e.g., ease of removal of the coating composition from a coating device at the time of cleaning the coating device after the coating operation.

In view of chipping resistance of the resulting coating film and wash-off properties of the aqueous coating composition, the urethane resin component in the acrylic urethane resin composite particles preferably has a weight average molecular weight of about 10,000 to 100,000, and particularly about 20,000 to 80,000.

A weight average molecular weight of less than 10,000 may result in reduced chipping resistance of the resulting coating film. A weight average molecular weight of more than 100,000 may result in reduced wash-off of the aqueous coating composition.

The urethane resin component can be synthesized, for example, by using an organic polyisocyanate compound, a polyol, and a compound containing both an active hydrogen group and an ion-forming group.

More specifically, the urethane resin component can be synthesized, for example, in the following manner.

In a (meth)acrylic monomer that is not reactive to isocyanate groups, an organic polyisocyanate compound and a polyol are reacted with a compound containing both an active hydrogen group and an ion-forming group to obtain an isocyanate group-terminated urethane prepolymer.

In view of costs, etc., the polyol component preferably comprises a polyester polyol and/or a polyether polyol.

In this reaction, the ratio of NCO groups of the organic polyisocyanate compound to active hydrogen groups of the polyol and the compound containing both an active hydrogen group and an ion-forming group is preferably in the range of 1.1:1 to 3.0:1 (molar ratio).

The prepolymerization reaction is preferably conducted at 50 to 100° C. In order to prevent thermal polymerization of the (meth)acrylic monomer described hereinunder, a polymerization inhibitor, such as a p-methoxy phenol, is preferably added at a concentration of about 20 to 13,000 ppm to the (meth)acrylic monomer in the presence of air, and the reaction is preformed.

As a catalyst for the urethanization reaction, an organic tin compound such as dibutyltin dilaurate, dibutyltin dioctoate, or stannous octoate, or a tertiary amine compound such as triethylamine or triethylenediamine, can be used as desired. In this way, a (meth)acrylic monomer solution of an isocyanate group-terminated urethane prepolymer can be obtained.

Examples of the organic polyisocyanate compound include isophorone diisocyanate (IPDI), 2,4-tolylene diisocyanate (2,4-TDI), and a mixture thereof with 2,6-tolylene diisocyanate (2,6-TDI), 4,4'-diphenylmethane diisocyanate, 1,4-phenylene diisocyanate, 1,5-naphthalene diisocyanate, hexamethylene diisocyanate (HMDI), trimethylhexamethylene diisocyanate, cyclohexane-1,4-diisocyanate, 4,4'-dicyclohexylmethane diisocyanate, xylylene diisocyanate, and tetramethylxylylene diisocyanate. If necessary, trimers of the above-mentioned TDI, HMDI, IPDI, etc., or trivalent polyisocyanates that are reactants with trimethylolpropane or the like can also be used.

Examples of polyols include the following compounds.

Diol compounds: ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane glycol, 2,5-hexanediol, dipropylene glycol, 2,2,4-trimethyl-1,3-pentanediol, tricyclodecanedimethanol, 1,4-cyclohexanedimethanol, and the like.

Polyetherdiols: alkylene oxide addition products of the diol compounds described above, ring-opening (co)polymers of alkylene oxides and cyclic ethers (tetrahydrofuran and the like), such as polyethylene glycol, polypropylene glycol, (blocked or random) copolymers of ethylene glycol and propylene glycol, glycol, polytetramethylene glycol, polyhexamethylene glycol, polyoctamethylene glycol, and the like.

Polyester diols: compounds obtained by polycondensing dicarboxylic acids (or dicarboxylic acid anhydrides), such as adipic acid, succinic acid, sebacic acid, glutaric acid, maleic acid, fumaric acid, and phthalic acid, with diol compounds described above, such as ethylene glycol, propylene glycol, 1,4-butanediol, 1,6-hexanediol, 1,8-octamethylenediol, and neopentyl glycol, under conditions such that hydroxy groups are present in excess. Specific examples thereof include ethylene glycol-adipic acid condensation products, butanediol-adipic acid condensation products, hexamethylene glycol-adipic acid condensation products, ethylene glycol-propylene glycol-adipic acid condensation products, and polylactonediols obtained by subjecting lactone to ring-opening polymerization using glycol as an initiator.

Polyether esterdiols: compounds obtained by adding ether group-containing diols (e.g., the above-mentioned polyether diol and diethylene glycol), or mixtures thereof with other glycols to dicarboxylic acids (or dicarboxylic acid anhydrides) as described above and then reacting alkylene oxides therewith, such as polytetramethylene glycol-adipic acid condensation products.

Polycarbonate diols: compounds represented by the formula HO—R—(C—C(O)—O—R)$_x$—OH (wherein R represents a $C_{1-12}$ saturated fatty acid diol residue, and x represents the number of repetitive units in the molecule and is usually an integer of 5 to 50). These compounds can be obtained by a transesterification method in which a saturated aliphatic diol is reacted with a substituted carbonate (diethyl carbonate, diphenyl carbonate, etc.) under conditions such that hydroxy groups are present in excess, and a method in which the saturated aliphatic diol described above is reacted with a phosgene, or the reaction product is then further reacted, if necessary, with the saturated aliphatic diol.

In view of water dispersibility and wash-off of the aqueous coating composition, the polyol preferably has a number average molecular weight of 300 to 3,000, and more preferably 500 to 2,500.

Examples of the compound containing both an active hydrogen group and an ion-forming group include compounds containing at least two hydroxy groups and at least one carboxy group per molecule, and compounds containing at least two hydroxy groups and at least one sulfonic acid group per molecule. This compound acts as an ion-forming group in the urethane resin.

Examples of carboxy-containing compounds include alkananol carboxylic acids, such as dimethylol propionic acid, dimethylol acetic acid, dimethylol butanoic acid, dimethylol heptanoic acid, dimethylolnonanoic acid, 1-carboxy-1,5-pentylenediamine, dihydroxybenzoic acid, and 3,5-diaminobenzoic acid; and half-ester compounds of polyoxypropylene triol with maleic anhydride or phthalic anhydride.

Examples of sulfonic acid group-containing compounds include 2-sulfonic acid-1,4-butanediol, 5-sulfonic acid-di-β-hydroxyethyl isophthalate, and N,N-bis(2-hydroxyethyl) aminoethylsulfonic acid.

When a carboxy- or sulfonic acid group-containing compound is used as the compound having both an active hydrogen group and an ion-forming group, a neutralizer can be used to form a salt and hydrophilize the compound. Examples of neutralizers that can be used include amines such as trimethylamine, triethylamine, monoethanolamine, diethanolamine, triethanolamine, triethylenediamine, and dimethylaminoethanol; and alkali metal compounds such as sodium hydroxide and potassium hydroxide. The percent neutralization of carboxy or sulfonic acid can usually be 50 to 100 mol %. The neutralizer is preferably triethylamine in view of basicity and enhancing water resistance.

The acrylic resin component of the acrylic urethane resin composite particles (C) can be obtained by polymerization using, as constituent monomers, a polymerizable unsaturated monomer (c-1) having per molecule one polymerizable unsaturated group selected from the group consisting of a polymerizable unsaturated monomer (c-1-1) having one polymerizable unsaturated group per molecule and having a $C_{4-22}$ alkyl group, and a polymerizable unsaturated monomer (c-1-2) having one polymerizable unsaturated group per molecule and being other than the polymerizable unsaturated monomer (c-1-1), and a polymerizable unsaturated monomer (c-2) having at least two polymerizable unsaturated groups per molecule.

In one embodiment of the present invention, the acrylic resin component of the acrylic urethane resin composite particles (C) can be obtained by polymerization using, as constituent monomers, a polymerizable unsaturated monomer (c-1-1), a polymerizable unsaturated monomer (c-2) having at least two polymerizable unsaturated groups per molecule, and, if necessary, an additional polymerizable unsaturated monomer (c-1-2) having one polymerizable unsaturated group per molecule and being other than the polymerizable unsaturated monomer (c-1). For example, when the aqueous coating composition of the present invention is used as an aqueous first colored coating composition in a 3-coat 1-bake process, the acrylic resin component of the acrylic urethane resin composite particles (C) is preferably obtained by polymerizing the constituent monomers.

A polymerizable unsaturated monomer having a hydroxy group is classified as belonging to the polymerizable unsaturated monomer (c-1-2) rather than to the polymerizable unsaturated monomer (c-1-11), even when the monomer has a $C_{4-22}$ alkyl group.

The $C_{4-22}$ alkyl group in the polymerizable unsaturated monomer (c-1-1) may be any of linear, branched, or circular alkyl.

Examples of the polymerizable unsaturated monomer (c-1-1) include alkyl or cycloalkyl (meth)acrylate, such as n-butyl (meth)acrylate, iso-butyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, isobornyl (meth)acrylate, adamanthyl (meth)acrylate, and tricyclodecanyl (meth)acrylate. These monomers can be used singly, or in a combination of two or more.

In this specification, the term "alkyl or cycloalkyl (meth) acrylate" means "one member selected from the group consisting of alkyl acrylate, cycloalkyl acrylate, alkyl methacrylate, and cycloalkyl methacrylate."

The polymerizable unsaturated monomer (c-1-1) is preferably a polymerizable unsaturated monomer having $C_{6-18}$ alkyl group, and more preferably a polymerizable unsaturated monomer having a $C_{6-13}$ alkyl group. In view of smoothness of the resulting coating film, 2-ethylhexyl (meth)acrylate, dodecyl (meth)acrylate, and tridecyl (meth) acrylate are preferable, and 2-ethylhexyl acrylate is particularly preferable.

Examples of the polymerizable unsaturated monomer (c-1-2) include $C_{1-3}$ alkyl-containing alkyl (meth)acrylate, such as methyl (meth)acrylate, ethyl (meth)crylate, n-propyl (meth)acrylate, and isopropyl (meth)acrylate; aromatic ring-containing polymerizable unsaturated monomers, such as benzyl (meth)acrylate, styrene, α-methylstyrene, and vinyltoluene; alkoxysilyl-containing polymerizable unsaturated monomers, such as vinyltrimethoxysilane, vinyltriethoxysilane, vinyltris(2-methoxyethoxy)silane, γ-(meth)acryloyoxypropyltrimethoxysilane, and γ-(meth)acryloyloxypropyltriethoxysilane; perfluoroalkyl (meth)acrylates, such as perfluorobutylethyl (meth)acrylate and perfluorooctylethyl (meth)acrylate; fluorinated alkyl-containing polymerizable unsaturated monomers, such as fluoroolefin; polymerizable unsaturated monomers having photo-polymerizable functional groups, such as maleimide; vinyl compounds, such as N-vinylpyrrolidone, ethylene, butadiene, chloroprene, vinyl propionate, and vinyl acetate; carboxy-containing polymerizable unsaturated monomers, such as (meth) acrylic acid, maleic acid, crotonic acid, and β-carboxy ethyl acrylate; nitrogen-containing polymerizable unsaturated monomers, such as (meth)acrylonitrile, (meth)acrylamide, N,N-dimethylaminoethyl (meth)acrylate, N,N-diethylaminoethyl (meth)acrylate, N,N-dimethylaminopropyl (meth) acrylamide, and adducts of glycidyl (meth)acrylates with amines; epoxy-containing polymerizable unsaturated monomers, such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allyl glycidyl ether; (meth) acrylates having alkoxy-terminated polyoxyethylene chains; carbonyl-containing polymerizable unsaturated monomers, such as acrolein, diacetone acrylamide, diacetone methacrylamide, acetoacetoxylethyl methacrylate, formylstyrol, and vinyl alkyl ketones having 4 to 7 carbon atoms (e.g., vinyl methyl ketone, vinyl ethyl ketone, and vinyl butyl ketone); and monoesterified products of (meth)acrylic acid with a $C_{2-8}$ dihydric alcohol, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone-modified compounds of the monoesterified products of (meth)acrylic acid with a $C_{2-8}$ dihydric alcohol, N-hydroxymethyl (meth)aerylamide, allyl alcohol, (meth)acrylates having hydroxy-terminated polyoxyethylene chains, and like hydroxy-containing polymerizable unsaturated monomers. These monomers can be used singly, or in a combination of two or more.

Examples of the polymerizable unsaturated monomer (c-2) include allyl (meth)acrylate, ethylene glycol di(meth) acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth) acrylate, 1,1,1-tris-hydroxymethylethane di(meth)acrylate, 1,1,1-tris-hydroxymethylethane tri(meth)acrylate, 1,1,1-tris-hydroxymethylpropane tri(meth)acrylate, triallyl isocyanurate, diallyl terephthalate, divinylbenzene, methylenebisacrylamide, and ethylenebisacrylamide. These monomers can be used singly, or in a combination of two or more.

Particularly preferable as the polymerizable unsaturated monomer (c-2) are allyl (meth)acrylate, ethylene glycol di(meth)acrylate, 1,4-butanediol di(meth)acrylate, neopentyl glycol di(meth)acrylate, and 1,6-hexanediol di(meth) acrylate.

In one embodiment of the present invention, in view of smoothness and distinctness of image of the resulting coating film, the proportion of the polymerizable unsaturated monomer (c-1-1) used may be 30 to 80 mass %, and particularly preferably 30 to 60 mass %, based on the total amount of the polymerizable unsaturated monomer (c-1) and polymerizable unsaturated monomer (c-2) (hereinafter sometimes referred to as "the total amount of the constituent monomers of the acrylic resin component"). For example, when the aqueous coating composition of the present invention is used as an aqueous first colored coating composition in a 3-coat 1-bake process, the proportion of the polymerizable unsaturated monomer (c-1-1) is preferably within the above-mentioned range.

In another embodiment of the present invention, in view of smoothness and distinctness of image of the resulting coating film, the proportion of the polymerizable unsaturated monomer (c-1) may be 80 to 99.5 mass %, particularly 85 to 99 mass %, more particularly 88 to 99 mass %, and even more particularly about 90 to 98 mass %, based on the total amount of the polymerizable unsaturated monomer (c-1): and polymerizable unsaturated monomer (c-2). It is also possible that the proportion of the polymerizable unsaturated monomer (c-1) is 88 to 99 mass %.

In view of excellent stability of the acrylic urethane resin composite particles (C) in aqueous media and excellent smoothness and distinctness of image of the resulting coating film, the proportion of the polymerizable unsaturated monomer (c-1-1) is preferably 10 to 90 mass %, more preferably 15 to 80 mass %, and even more preferably 20 to 70 mass %, based on the total amount of the constituent monomers of the acrylic resin component. For example, when the blocked polyisocyanate compound (B1) is used as a crosslinking agent (B), the proportions of the polymerizable unsaturated monomer (c-1) and polymerizable unsaturated monomer (c-1-1) are preferably within the above-mentioned ranges.

The proportion of the polymerizable unsaturated monomer (c-2) can be suitably determined according to the desired degree of crosslinking of the acrylic urethane resin composite particles (C). In one embodiment of the present invention, in view of water resistance of the resulting coating film, the proportion of the polymerizable unsaturated monomer (c-2) may preferably be 1 to 20 mass %, 2 to 15 mass %, particularly 3 to 12 mass %, and more particularly 3 to 10 mass %, based on the total amount of the constituent monomers of the acrylic resin component. For example, when the aqueous coating composition of the present invention is used as an aqueous first colored coating composition in a 3-coat 1-bake process, the proportion of the polymerizable unsaturated monomer (c-2) is preferably within the above-mentioned range.

In another embodiment of the present invention, in view of water resistance of the resulting coating film, the proportion of the polymerizable unsaturated monomer (c-2) may be 0.5 to 20 mass %, particularly 1 to 15 mass %, more particularly 2 to 12 mass %, and even more particularly about 2 to 10 mass %, based on the total amount of the constituent monomers of the acrylic resin component. It is also possible that the proportion of the polymerizable unsaturated monomer (c-2) is 1 to 20 mass %. For example, when a blocked polyisocyanate compound (B1) is used as the crosslinking agent (B), the proportion of the polymerizable unsaturated monomer (c-2) is preferably within the above-mentioned range.

The polymerizable unsaturated monomer (c-1-2) of the acrylic resin component in the acrylic urethane resin composite particles (C) preferably includes a hydroxy-containing polymerizable unsaturated monomer.

The hydroxy-containing polymerizable unsaturated monomer introduces a hydroxy group that can be crosslinked with a crosslinking agent (B) into the resulting acrylic urethane resin composite particles (C) to thereby enhance water resistance, etc. of the coating film as well as enhance stability of the acrylic urethane resin composite particles (C) in aqueous media.

Examples of the hydroxy-containing polymerizable unsaturated monomer include those mentioned as examples in the above description of the polymerizable unsaturated monomer (c-1-2). These monomers can be used singly, or in a combination of two or more.

As the hydroxy-containing polymerizable unsaturated monomer, 2-hydroxyethyl (meth)acrylate, 2-hydroxypropyl (meth)acrylate, 3-hydroxypropyl (meth)acrylate, and 4-hydroxybutyl (meth)acrylate can be particularly preferably used.

When a hydroxy-containing polymerizable unsaturated monomer is used as a constituent monomer of the acrylic resin component, the proportion of the hydroxy-containing polymerizable unsaturated monomer is preferably 1 to 30 mass %, more preferably 2 to 25 mass %, and even more preferably 3 to 20 mass %, based on the total amount of the constituent monomers of the acrylic resin component, in view of excellent stability of the acrylic urethane resin composite particles (C) in aqueous media and excellent water resistance of the resulting coating film.

Further, a carboxy-containing polymerizable unsaturated monomer can be contained as a polymerizable unsaturated monomer (c-1-2) of the acrylic resin component in the acrylic urethane resin composite particles (C).

Examples of the carboxy-containing polymerizable unsaturated monomer include those mentioned as examples in the above description of the polymerizable unsaturated monomer (c-1-2). These monomers can be used singly, or in a combination of two or more. Among these, acrylic acid and/or methacrylic acid are preferable.

When a carboxy-containing polymerizable unsaturated monomer is contained as a constituent monomer of the acrylic resin component, the amount of the carboxy-containing polymerizable unsaturated monomer is preferably 0.1 to 10 mass %, more preferably 0.2 to 5 mass %, and even more preferably 0.5 to 4 mass %, based on the total amount of the constituent monomers of the acrylic resin component.

In view of enhancing water resistance of the resulting coating film, the polymerizable unsaturated monomer (c-1-2) of the acrylic resin component in the acrylic urethane resin composite particles (C) preferably includes a $C_1$ or $C_2$ alkyl-containing polymerizable unsaturated monomer.

Examples of the $C_1$ or $C_2$ alkyl-containing polymerizable unsaturated monomer include methyl (meth)acrylate and ethyl (meth)acrylate. These monomers can be used singly, or in a combination of two or more.

In view of enhancing smoothness, distinctness of image, and water resistance of the resulting coating film, the $C_1$ or $C_2$ alkyl-containing polymerizable unsaturated monomer is preferably methyl methacrylate and/or ethyl methacrylate, and more preferably methyl methacrylate.

When a $C_1$ or $C_2$ alkyl-containing polymerizable unsaturated monomer is included as the constituent monomer of the acrylic resin component, the proportion of the $C_1$ or $C_2$ alkyl-containing polymerizable unsaturated monomer is preferably 10 to 50 mass %, more preferably 15 to 50 mass %, and even more preferably 20 to 40 mass %, based on the total amount of the constituent monomers of the acrylic resin component, in view of enhancing smoothness and distinctness of image of the resulting coating film.

In view of excellent water resistance, etc. of the resulting coating film, the acrylic resin component of the acrylic urethane resin composite particles (C) preferably has a hydroxy value of 1 to 150 mg KOH/g, more preferably 2 to 100 mg KOH/g, and even more preferably 5 to 60 mg KOH/g.

In view of excellent smoothness, distinctness of image, etc., of the resulting coating film, the acrylic resin component of the acrylic urethane resin composite particles (C) preferably has an acid value within the range of 0 to 50 mg KOH/g, particularly 0 to 20 mg KOH/g, and more particularly 0 to 10 mg KOH/g.

In view of smoothness of the resulting coating film, the acrylic resin component of the acrylic urethane resin composite particles (C) preferably has a glass transition temperature within the range of −60 to 60° C., particularly −50 to 50° C., and more particularly −35 to 40° C.

In view of smoothness and distinctness of image of the resulting coating film, the acrylic resin component of acrylic urethane resin composite particles (C) preferably has a core shell structure in which the inner shell portion (core) and the outer shell portion (shell) are different from each other in terms of resin composition.

When the acrylic resin component has a core shell structure, the core/shell ratio by mass is preferably in the range of 5/95 to 95/5, more preferably 50/50 to 90/10, and even more preferably 65/35 to 85/15, on a solids basis, in view of enhancing smoothness of the coating film.

When the acrylic resin component has a core shell structure, the inner shell portion (core) preferably has a glass transition temperature ($Tg_1$) in the range of −65 to −10° C., more preferably −60 to −20° C., and even more preferably −55 to −25° C.

The outer shell portion (shell) preferably has a glass transition temperature ($Tg_2$) in the range of −50 to −150° C., more preferably −5 to −120° C., and even more preferably 10 to 110° C.

It is also preferable that $Tg_2$ is greater than $Tg_1$ and that the difference between $T_2$ and $T_1$ is 5 to 200° C., more preferably 30 to 180° C., and even more preferably 50 to 160° C.

In this specification, the glass transition temperature Tg (absolute temperature) refers to a value calculated according to the following equation.

$$1/Tg = W_1/T_1 + W_2/T_2 + \ldots W_n/T_n$$

(wherein $W_1, W_2, \ldots W_n$ are mass fractions of the respective monomers; and $T_1, T_2 \ldots T_n$ are glass transition temperatures (absolute temperatures) of homopolymers of the respective monomers). The glass transition temperatures of homopolymers of the respective monomers are values shown in "Polymer Handbook" Fourth Edition, edited by J. Brandrup, E. H. Immergut, and E. A. Grulke, 1999. When the glass transition temperature of a monomer was not shown in the Handbook, a homopolymer of the monomer having a weight average molecular weight of around 50,000 was synthesized, and the glass transition temperature of the homopolymer was determined by differential scanning thermal analysis.

When a (meth)acrylic monomer is further added to the (meth)acrylic monomer solution of a urethane prepolymer obtained by producing a urethane prepolymer in a (meth) acrylic monomer that is not reactive to isocyanate groups, there is no particular limitation on the timing of adding the monomer. The (meth)acrylic monomer may be added at any time before or after the neutralization step of the urethane prepolymer described below. A (meth)acrylic monomer may also be added in the dispersion after the neutralized urethane prepolymer is dispersed in water.

A representative method for producing the acrylic urethane resin composite particles (C) is described below. However, the method is not limited thereto, and known methods for producing acrylic urethane resin composite particles can also be used.

The process until the production of a urethane prepolymer of the urethane resin component is as described above. In this process, the urethane prepolymer was produced in a polymerizable unsaturated monomer ((meth)acrylic monomer) that is not reactive to isocyanate groups.

The polymerizable unsaturated monomer that is not reactive to isocyanate groups ((meth)acrylic monomer) may be a part or the entirety of the constituent monomer of the acrylic resin component (the inner shell portion (the core) of the acrylic resin component when the acrylic resin component has a core shell structure).

Subsequently, after a neutralizer is added, water is added to subject an oil layer and an aqueous layer to phase invasion, and dispersed in water to obtain an aqueous dispersion. A radical polymerization initiator is added to the aqueous dispersion to allow a polymerization reaction of a polymerizable unsaturated monomer ((meth)acrylic monomer) to proceed. If necessary, a chain extension reaction of the urethan resin component (urethane prepolymer) (subjecting isocyanate groups to a chain extension reaction with water) may be further conducted to complete all of the polymerization reactions.

As a method for obtaining the aqueous dispersion, the following method can also be preformed, if necessary.

When a solution of the polymerizable unsaturated monomer ((meth)acrylic monomer) of the urethane prepolymer is dispersed in water, addition of a polyoxyalkylene-containing (meth)acrylic monomer enhances the dispersibility in water and can provide a uniform, more stable aqueous dispersion. The polyoxyalkylene-containing (meth)acrylic monomer refers to an acrylic monomer that terminally contains a hydroxy group or a $C_{1-3}$ alkoxy group, and that has a polyoxyethylene group or a polyoxypropylene group.

In view of enhancing stability of the aqueous dispersion of the polymerizable unsaturated monomer ((meth)acrylic monomer) solution of the urethane prepolymer or stability in the polymerization of the polymerizable unsaturated monomer ((meth)acrylic monomer), a small amount of surfactant may also be added.

As the surfactant, for example, anionic surfactants and nonionic surfactants are preferable. Examples of anionic surfactants include sodium salts and ammonium salts of fatty acid salts, alkyl sulfates, alkylbenzene sulfonates, naphthalene sulfonates, alkylsulfosuccinates, and alkylphosphates. Examples of nonionic surfactants include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monoleate, sorbitan monolaurate, sorbitan monostearate, sorbitan trioleate, and polyoxyethylene sorbitan monolaurate. Such anionic surfactants and nonionic surfactants can be used in combination. Further, polyoxyalkylene-containing anionic surfactants having an anionic group and a polyoxyalkylene group, such as a polyoxyethylene group or a polyoxypropylene group, per molecule may also be used. Reactive anionic surfactants having the anionic group and a reactive group, such as a polymerizable unsaturated group, per molecule may also be used in view of enhancing water resistance, etc. of the resulting coating film.

The amount of the surfactant is preferably 0.1 to 15 mass %, more preferably 0.5 to 10 mass %, and even more preferably 1 to 5 mass %, based on the total amount of all of the polymerizable unsaturated monomers of the acrylic resin component.

As a method for dispersing the solution of an unsaturated monomer ((meth)acrylic monomer) of a urethane prepolymer in water, a usual stirrer can be used for the dispersion. To obtain a uniform aqueous dispersion of finer particles, homomixers, homogenizers, dispersing devices, line mixers, etc., can be used.

After the aqueous dispersion of the unsaturated monomer ((meth)acrylic monomer) solution of a urethane prepolymer is thus obtained, a polymerization initiator is added thereto and the temperature is raised to the range of polymerization temperature of the unsaturated monomer ((meth)acrylic monomer). With the temperature being maintained in this range, while optionally performing chain extension of the urethane prepolymer with water, an unsaturated monomer ((meth)acrylic monomer) is polymerized to obtain an aqueous dispersion of acrylic urethane resin composite particles comprising a urethane resin component and an acrylic resin component.

The polymerization reaction in the aqueous dispersion can be performed by a known radical polymerization reaction. The polymerization initiator may be a water-soluble initiator or an oil-soluble initiator. When an oil-soluble initiator is used, the oil-soluble initiator is preferably added to the unsaturated monomer ((meth)acrylic monomer) solution of a urethane prepolymer before forming an aqueous dispersion.

It is usually preferable that the polymerization initiator is used within the range of about 0.05 to 5 mass %, based on the total mass of all of the unsaturated monomers ((meth) acrylic monomers).

The polymerization can be performed at a temperature of about 20 to 100° C. When a redox initiator is used, the reaction temperature may be about 75° C. or less.

Examples of polymerization initiators include azo compounds such as azobisisobutyronitrile, azobis(2,4-dimethylvaleronitrile), azobis(2-methylpropiononitrile), azobis(2-methylbutyronitrile), 4,4'-azobis(4-cyanobutanoic acid), dimethyl azobis(2-methylpropionate), azobis[2-methyl-N-(2-hydroxyethyl)-propionamide], and azobis{2-methyl-N-[2-(1-hydroxybutyl)]-propionamide}; organic peroxides such as benzoyl peroxide, octanoyl peroxide, lauroyl peroxide, stearoyl peroxide, cumene hydroperoxide, tert-butyl peroxide, tert-butylperoxy laurate, tert-butylperoxyisopropyl carbonate, tert-butylperoxy acetate, and diisopropylbenzene hydroperoxide; and inorganic peroxide such as potassium persulfate, ammonium persulfate, sodium persulfate, and like persulfates.

These polymerization initiators can be used singly, or in a combination of two or more.

An organic or inorganic peroxide can be used in combination with a reducing agent in the form of a redox initiator.

Examples of the reducing agent include L-ascorbic acid, L-sorbic acid, sodium metabisulfite, ferric sulfate, ferric chloride, and rongalite.

The method for adding the polymerization initiator is not particularly limited, and can be suitably selected according to the type and amount of the polymerization initiator. For example, the polymerization initiator may be incorporated beforehand into the monomer mixture or aqueous medium, or added at one time or dropwise at the time of polymerization. Any of the following methods can be used: a method of adding the initiator at one time at the beginning of the polymerization, a method of adding the initiator dropwise over time, or a method comprising incorporating a part of the polymerization initiator at the beginning of the polymerization, and then adding the rest of the initiator.

In view of fully performing the polymerization reaction and reducing the residual monomers, it is also possible to add a polymerization initiator during the polymerization reaction or after the polymerization, and further conduct a polymerization reaction. In this case, any combination of polymerization initiators can be selected.

Generally, the amount of the polymerization initiator used is preferably about 0.1 to 5 mass %, and more preferably about 0.2 to 3 mass %, based on the total mass of all the monomers used.

In the polymerization of the polymerizable unsaturated monomer ((meth)acrylic monomer), a known chain transfer agent can be used in order to adjust the molecular weight. Examples of the chain transfer agent include mercapto-containing compounds. Specific examples thereof include lauryl mercaptan, t-dodecylmercaptan, octylmercaptan, 2-ethylhexyl thioglycolate, 2-methyl-5-tert-butylthiophenol, mercaptoethanol, thioglycerol, mercaptoacetic acid (thioglycolic acid), mercaptopropionate, and n-octyl 3-mercaptopropionate.

When the chain transfer agent is used, it is usually preferable that the amount of the chain transfer agent is in the range of 0.05 to 10 mass %, particularly 0.1 to 5 mass %, based on the total amount of all the polymerizable unsaturated monomers used.

The monomer mixture for forming the acrylic resin component may contain components such as the above emulsifiers, polymer initiator initiators, reducing agents, and chain transfer agents as desired. Preferably, the monomer mixture is added dropwise as a monomer emulsion obtained by dispersing the monomer mixture into an aqueous medium; however, the monomer mixture may also be added dropwise unmodified. In this case, the particle size of the emulsified monomer is not particularly limited.

When chain extension of a urethane prepolymer is performed, a chain extender other than water may be added, if necessary, to react the urethane prepolymer with the chain extender. As the chain extender, a known chain extender having an active hydrogen can be used. Specific examples of such chain extenders include diamines such as ethylenediamine, hexamethylenediamine, cyclohexanediamine, cyclohexylmethanediamine, isophoronediamine, and hydrazine.

In the preparation of an aqueous dispersion of acrylic urethane resin composite particles, the composition of each resin component (acrylic resin component, urethane resin component), reaction conditions, etc., are adjusted to provide an aqueous dispersion of the acrylic urethane resin composite particles in a desired form, such as having a core shell structure or being in the state that the acrylic resin component and the urethane component are partially or wholly mixed.

When the acrylic resin component is to have a core shell structure in which the inner shell portion (core) and the outer shell portion (shell) have different resin compositions, mixtures of at least two types of unsaturated monomers ((meth) acrylic monomers) having different compositions are used and a reaction is performed at multiple stages (for example, unsaturated monomer mixtures having different compositions are prepared, and each unsaturated monomer mixture is added at multiple stages to allow the reaction to proceed), whereby an aqueous dispersion of acrylic urethane resin particles having a core shell structure in which the inner shell portion (core) and the outer shell portion (shell) have different resin compositions can be obtained as the acrylic resin component.

When the acrylic resin component is an aqueous dispersion of acrylic urethane resin composite particles having a core shell structure in which the inner shell portion (core) and the outer shell portion (shell) have different resin compositions, the inner shell portion (core) of the acrylic resin component may have a urethane resin component mixed therein.

In the present invention, when the acrylic urethane resin composite particles (C) have a core/shell type multilayer structure, the "shell portion" of the acrylic urethane resin composite particles (C) refers to the polymeric layer present as the outermost layer of the resin composite particles, the "core portion" refers to a polymeric layer inside the resin composite particles other than the shell portion, and the "core/shell type multi layer structure" means a structure having the core portion and the shell portion.

The core/shell type multilayer structure generally takes a layered structure such that the core portion is completely covered by the shell portion. However, depending on the mass ratio of the core portion to the shell portion, etc., the monomer amount for the shell portion may be insufficient for forming a layered structure. In that case, a complete layered structure as described above is not necessary. A structure in which the shell partially covers the core, or a structure in which a polymerizable unsaturated monomer that is a constituent of the shell is graft-polymerized at a part of the core, may be selected.

The concept of the multilayer structure in the above core/shell type multilayer structure also applies to the case in which the core of the acrylic urethane resin composite particles (C) of the present invention has a multilayer structure.

The acrylic urethane resin composite particles (C) typically has an average particle size of about 10 to 5,000 mm, preferably 10 to 1,000 nm, more preferably 20 to 500 nm, and particularly preferably 40 to 400 nm.

In this specification, the average particle size of the acrylic urethane resin composite particles (C) refers to a value obtained by measurement at 20° C. using a submicron particle size distribution analyzer after dilution with deionized water according to a usual method. For example, a "COULTER N4" (trade name, produced by Beckman Coulter, Inc.) may be used as the submicron particle size distribution analyzer.

When the acrylic urethane resin composite particles (C) have an acidic group such as carboxy, the acidic group is preferably neutralized with a neutralizing agent to improve mechanical stability of the acrylic urethane resin composite particles (C). The neutralizing agent is not particularly limited, as long as it can neutralize acid groups. Examples of such neutralizing agents include sodium hydroxide, potassium hydroxide, trimethylamine, 2-(dimethylamino) ethanol, 2-amino-2-methyl-1-propanol, triethylamine, and aqueous ammonia. Such a neutralizing agent is preferably used in an amount such that the pH of the aqueous dispersion of the acrylic urethane resin composite particles (C) after neutralization is about 6.0 to 9.0.

The solids concentration of the acrylic urethane resin composite particles (C) in an aqueous dispersion is preferably 20 to 50 mass %, and more preferably 30 to 40 mass %. The solids concentration of the acrylic urethane resin composite particles (C) in the aqueous dispersion may also be 25 to 45 mass %. When the solids concentration is more than 50 mass %, an aqueous dispersion may be difficult to obtain. When the solids concentration is less than 20 mass %, such a low concentration results in a high proportion of the solvent (mainly water) component; therefore, it may be difficult to use such an aqueous dispersion as a component of an aqueous coating composition.

Aqueous Coating Composition

The aqueous coating composition of the present invention is a coating composition comprising the aqueous film-forming resin (A), crosslinking agent (B), and acrylic urethane resin composite particles (C).

In one embodiment of the present invention, the blending ratio of the aqueous film-forming resin (A), crosslinking agent (B), and acrylic urethane resin composite particles (C) in the aqueous coating composition of the present invention can be within the range described below, per 100 parts by mass of the total amount of the aqueous film-forming resin (A) and crosslinking agent (B). For example, when the aqueous coating composition of the present invention is used as an aqueous first colored coating composition in a 3-coat 1-bake process, the blending ratio of each component is preferably within the following range:
aqueous film-forming resin (A): 30 to 95 parts by mass, preferably 50 to 90 parts by mass, and more preferably 60 to 80 parts by mass;
crosslinking agent (B): 5 to 70 parts by mass, preferably 10 to 50 parts by mass, and more preferably 20 to 40 parts by mass; and acrylic urethane resin composite particles (C): 1 to 50 parts by mass, preferably 5 to 40 parts by mass, and more preferably 10 to 30 parts by mass.

When a blocked polyisocyanate compound (B1) is used as the crosslinking agent (B), the blending ratio of each component is preferably within the following range:
aqueous film-forming resin (A): 30 to 90 parts by mass, preferably 35 to 80 parts by mass, and more preferably 40 to 70 parts by mass;
blocked polyisocyanate compound (B): 5 to 40 parts by mass, preferably 5 to 38 parts by mass, and more preferably 5 to 35 parts by mass; and
acrylic urethane resin composite particles (C): 1 to 30 parts by mass, preferably 3 to 25 parts by mass, and more preferably 5 to 20 parts by mass.

The aqueous coating composition of the present invention preferably comprises a pigment (D). Examples of the pigment (D) include color pigments, extender pigments, and effect pigments. Such pigments (D) can be used singly, or in a combination of two or more.

When the aqueous coating composition of the present invention contains a pigment (D), the amount of the pigment (D) can be generally 1 to 200 parts by mass, preferably 20 to 150 parts by mass, and more preferably 50 to 120 parts by mass, based on 100 parts by mass of the total amount of the aqueous film-forming resin (A), crosslinking agent (B), and acrylic urethane resin composite particles (C).

Examples of the color pigments include titanium dioxide, zinc oxide, carbon black, molybdenum red, Prussian blue, cobalt blue, azo pigments, phthaloxcyanine pigments, quinacridone pigments, isoindoline pigments, threne pigments, and perylene pigments. Among these, titanium dioxide and carbon black can be preferably used.

When the aqueous colored coating composition of the present invention contains such a color pigment, the amount of the color pigment is usually 1 to 120 parts by mass, preferably 3 to 100 parts by mass, and more preferably 5 to 90 parts by mass, based on 100 parts by mass of the total amount of the aqueous film-forming resin (A), crosslinking agent (B), and acrylic urethane resin composite particles (C) in the aqueous coating composition of the invention.

Examples of the extender pigments include clay, kaolin, barium sulfate, barium carbonate, calcium carbonate, talc, silica, alumina white, and the like. Of these, barium sulfate and/or talc is preferably used.

In particular, a coating composition containing barium sulfate with an average primary particle size of 1 μm or less, more preferably 0.01 to 0.8 μm, as the extender pigment is preferable, because it can provide a multilayer coating film with excellent appearance, such as excellent smoothness, and a high flip-flop effect and little metallic mottling, when used as a coating composition (for example, as the aqueous second colored coating composition (Y) described below) for forming an undercoating film of a multilayer film comprising an upper coating film of a coating composition comprising an effect pigment.

The average primary particle size of barium sulfate as used herein is determined by observing barium sulfate using a scanning electron microscope and averaging the maximum diameter of 20 barium sulfate particles on a straight line drawn at random on the electron microscope photograph.

When the aqueous coating composition of the present invention contains an extender pigment as described above, the amount of the extender pigment is typically 1 to 120 parts by mass, preferably 5 to 100 parts by mass, and more preferably 10 to 80 parts by mass, based on 100 parts by mass of the total amount of base resin (A), crosslinking agent (B), and acrylic urethane resin composite particles (C) in the aqueous intermediate coating composition of the invention. For example, when the aqueous coating composition of the present invention is used as an aqueous first colored coating composition in a 3-coat 1-bake process, the amount of each component is preferably within the above-mentioned range.

When the crosslinking agent (B) is a blocked polyisocyanate compound (B1), the amount of the extender pigment is typically 1 to 100 parts by mass, preferably 5 to 80 parts by mass, and more preferably 10 to 60 parts by mass, based on 100 parts by mass of the total amount of the aqueous film-forming resin (A), blocked polyisocyanate compound (B1), and acrylic urethane resin composite particles (C) in the aqueous coating composition of the present invention.

Examples of the effect pigments include aluminium (such as vapor-deposited aluminum), copper, zinc, brass, nickel, aluminium oxide, mica, titanium oxide- or iron oxide-coated aluminium oxide, titanium oxide- or iron oxide-coated mica, glass flakes, and holographic pigments. These effect pigments may be used singly, or in a combination of two or more. Examples of aluminum pigments include non-leafing aluminum pigments and leafing aluminum pigments. Any of these pigments can be used.

When the aqueous coating composition of the present invention contains an effect pigment as mentioned above, the amount of the effect pigment in the aqueous coating composition of the present invention is typically 1 to 50 parts by mass, preferably 2 to 30 parts by mass, and more preferably 3 to 20 parts by mass, per 100 parts by mass of the total amount of the aqueous film-forming resin (A), crosslinking agent (B), and acrylic urethane resin composite particles (C) in the aqueous coating composition of the present invention.

In view of improving smoothness and distinctness of image, the aqueous coating composition of the present invention preferably further comprises a hydrophobic solvent (E).

The hydrophobic solvent (E) is desirably an organic solvent of which a mass of 10 g or less dissolves in 100 g of water at 20° C., preferably 5 g or less, and more preferably 1 g or less. Examples of the organic solvent include hydrocarbon solvents such as rubber gasoline, mineral spirit, toluene, xylene, and solvent naphtha; alcoholic solvents such as 1-hexanol, 1-octanol, 2-octanol, 2-ethyl-1-hexanol, 1-decanol, benzyl alcohol, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether, and propylene glycol monophenyl ether; and ester solvents such as n-butyl acetate, isobutyl acetate, isoamyl acetate, methylamyl acetate, and ethylene glycol monobutyl ether acetate; ketone solvents such as methyl isobutyl ketone, cyclohexanone, ethyl n-amyl ketone, and diisobutyl ketone. These solvents can be used singly, or in a combination of two or more.

The hydrophobic solvent (E) is preferably an alcohol hydrophobic solvent. $C_{7-14}$ alcoholic hydrophobic solvents are particularly preferable. At least one alcoholic hydrophobic solvent selected from the group consisting of 1-octanol, 2-octanol, 2-ethyl-1-hexanol, ethylene glycol mono-2-ethylhexyl ether, propylene glycol mono-n-butyl ether, and dipropylene glycol mono-n-butyl ether is more preferable.

When the aqueous coating composition comprises a hydrophobic solvent (E), the amount of the hydrophobic solvent (E) is preferably 3 to 50 parts by mass, more preferably 5 to 40 parts by mass, and even more preferably 8 to 30 parts by mass, per 100 parts by mass of the total solids content of the aqueous film-forming resin (A), cross linking agent (B), and acrylic urethane resin composite particles (C).

In view of enhancing smoothness and distinctness of the resulting coating film, the aqueous coating composition of the present invention can further comprise a diester compound (F) represented by formula (1)

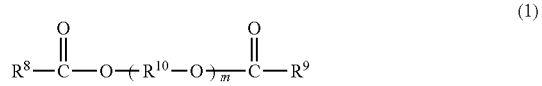

(1)

(wherein $R^8$ and $R^9$ independently represent a $C_{4-18}$ hydrocarbon group, $R^{10}$ represents a $C_{2-4}$ alkylene group, m is an integer of 3-25, and each $R^{10}$ may be the same or different).

$R^8$ and $R^9$ independently represent a $C_{4-18}$ hydrocarbon group, preferably $C_{5-11}$ alkyl, more preferably $C_{5-9}$ alkyl, and even more preferably $C_{6-8}$ alkyl. $R^8$ and $R^9$ may be any of linear, branched, and circular hydrocarbon groups. In particular, when $R^8$ and $R^9$ are $C_{6-8}$ branched alkyl, excellent smoothness and distinctness of image can be imparted to the resulting coating film, even when the coating composition is applied after storage for a relatively long period of time.

Examples of $C_{4-18}$ hydrocarbon groups include any of linear, branched, and circular alkyl groups, such as n-butyl, n-pentyl, 1-ethylpropyl, 2-methylbutyl, phenyl, cyclohexyl, n-hexyl, 1-ethylbutyl, 2-ethylbutyl, n-heptyl, 1-ethylpentyl, 3-ethylpentyl, n-octyl, 1-ethylhexyl, n-nonenyl, 1-ethylheptyl, 3-ethylheptyl, n-undecanyl, n-pentadecanyl, and n-heptadecanyl. Among these, linear or branched alkyl groups such as n-pentyl, n-hexyl, 1-ethylbutyl, 2-ethylbutyl, n-heptyl, 1-ethylpentyl, 3-ethylpentyl, n-octyl, 1-ethylhexyl, n-nonenyl, 1-ethylheptyl, and 3-ethylheptyl are preferable. Linear or branched $C_{6-8}$ alkyl groups such as n-hexyl, 1-ethylbutyl, 2-ethylbutyl, n-heptyl, 1-ethylpentyl, 3-ethylpentyl, n-octyl, and 1-ethylhexyl are more preferable. Linear or branched $C_{6-8}$ alkyl groups such as 1-ethylbutyl, 2-ethylbutyl, 1-ethylpentyl, 3-ethylpentyl, and 1-ethylhexyl are even more preferable.

Examples of $C_{2-4}$ alkylene groups include ethylene, propylene, trimethylene, and tetramethylene. Among these, ethylene and propylene are preferable, and ethylene is particularly preferable. When $R^{10}$s are different, a specific example of a combination of differing $R^{10}$s is a combination of ethylene and propylene.

The diester compound (E) can be obtained by, for example, art esterification reaction of a polyoxyalkylene glycol having two terminal hydroxy groups with a monocarboxylic acid having a $C_{4-18}$ hydrocarbon group.

Examples of the polyoxyalkylene glycol include polyethylene glycols, polypropylene glycols, copolymers of polyethylene and propylene glycols, and polybutylene glycols. Polyethylene glycols are particularly preferable. Generally, these polyoxyalkylene glycols preferably have a number average molecular weight of 100 to 1,200, more preferably 150 to 600, and even more preferably 200 to 400.

Examples of the monocarboxylic acid having a $C_{4-18}$ hydrocarbon group include pentanoic acid, hexanoic acid, 2-ethylbutanoic acid, 3-methylpentanoic acid, benzoic acid, cyclohexanecarboxylic acid, heptanoic acid, 2-ethylpentanoic acid, 3-ethylpentanoic acid, octanoic acid, 2-ethylhexanoic acid, 4-ethylhexanoic acid, nonanoic acid, 2-ethyheptanoic acid, decanoic acid, 2-ethyloctanoic acid, 4-ethyloctanoic acid, dodecanoic acid, hexadecanoic acid, and octadecanoic acid. Among these, monocarboxylic acids having $C_{5-9}$ alkyl groups, such as hexanoic acid, heptanoic acid, 2-ethylpentanoic acid, 3-ethylpentanoic acid, octanoic acid, 2-ethylhexanoic acid, 4-ethylhexanoic acid, nonanoic acid, 2-ethylheptanoic acid, decanoic acid, 2-ethyloctanoic acid, and 4-ethyloctanoic acid, are preferable. Monocarboxylic acids having $C_{6-8}$ alkyl groups, such as heptanoic acid, 2-ethylpentanoic acid, 3-ethylpentanoic acid, octanoic acid, 2-ethylhexanoic acid, 4-ethylhexanoic acid, nonanoic acid, and 2-ethylheptanoic acid, are more preferable. Monocarboxylic acids having $C_{6-8}$ branched alkyl groups, such as 2-ethylpentanoic acid, 3-ethylpentanoic acid, 2-ethylhexanoic acid, 4-ethylhexanoic acid, and 2-ethylheptanoic acid, are even more preferable.

The diesterification reaction of the polyoxyalkylene glycol with the monocarboxylic acid having a $C_{4-18}$ hydrocarbon group can be carried out by a known method. The above polyoxyalkylene glycols and monocarboxylic acids having $C_{4-18}$ hydrocarbon groups can be used singly, or in a combination of two or more. The obtained diester compound (F) preferably has a molecular weight of 320 to 1,400, more preferably 450 to 1,000, even more preferably 500 to 800, and particularly preferably 500 to 700.

When the aqueous coating composition of the present invention comprises a diester compound (F), the amount of the diester compound (F) is preferably 1 to 30 parts by mass, more preferably 3 to 20 parts by mass, and even more preferably 5 to 15 parts by mass, per 100 parts by mass of the total solids content of the aqueous film-forming resin (A), crosslinking agent (B), and acrylic urethane resin composite particles (C).

If necessary, the aqueous coating composition of the present invention may contain additives for coating compositions, such as thickening agents, curing catalysts, UV absorbers, light stabilizers, antifoaming agents, plasticizers, organic solvents other than the above hydrophobic solvents (E), surface control agents, and antisettling agents.

Examples of the thickening agents include inorganic thickening agents such as silicates, metal silicates, montmorillonite, and colloidal alumina; polyacrylic acid thickening agents such as copolymers of (meth)acrylic acids and (meth)acrylic esters, and sodium polyacrylate; associative thickening agents having a hydrophilic moiety and a hydrophobic moiety per molecule and exhibiting a thickening effect by adsorption of the hydrophobic portion onto the surface of the pigment or emulsion particle in the coating composition in an aqueous medium or by association between the hydrophobic portions; cellulose derivative thickening agents such as carboxymethyl cellulose, methyl cellulose, and hydroxyethyl cellulose; protein thickening agents such as casein, sodium caseinate, and ammonium caseinate; alginate thickening agents such as sodium alginate; polyvinyl thickening agents such as polyvinyl alcohol, polyvinylpyrrolidone, and polyvinyl benzyl ether copolymers; polyether thickening agents such as Pluronic polyethers, polyether dialkyl esters, polyether dialkyl ethers, and polyether epoxy-modified compounds; maleic anhydride copolymer thickening agents such as partial esters of vinyl methyl ether-maleic anhydride copolymers; and polyamide thickening agents such as polyamide amine salts. These thickening agents can be used singly, or in a combination of two or more.

As the polyacrylic acid thickening agents, commercially available products can be used. Examples of such commercially available products include "PRIMAL ASE-60," "PRIMAL, TT-615," and "PRIMAL RM-5," produced by Rohm and Haas, "SN Thickener 613," "SN Thickener 618," "SN Thickener 630," "SN Thickener 634," and "SN Thickener 636," produced by San Nopco Ltd. As the associative thickening agents, commercially available products can be used. Examples of such commercially available products include "UH-420," "UH-450," "UH-462," "UH-472," "UH-540," "UH-752," "UH-756VF," and "UH-814N," produced by ADEKA Co. Ltd.; "PRIMAL RM-8W," "PRIMAL PM-825," "PRIMAL RM-2020NPR," "PRIMAL RM-12W," and "PRIMAL SCT-275," produced by Rohm and Haas; and "SN Thickener 612," "SN Thickener 621N," "SN Thickener 625N," "SN Thickener G27N," and "SN Thickener 660T," produced by San Nopco Ltd.

The thickening agent is preferably a polyacrylic acid thickening agent and/or an associative thickening agent. The use of an associative thickening agent is more preferable. Hydrophobic group-terminated urethane associative thickening agents containing a urethane bond in the molecular chain are even more preferable. As the urethane associative thickening agents, commercially available products can be used. Examples of such commercially available products include "UH-420," "UH-462," "UH-472," "UH-540," "UH-752," "UH-756VF," and "UH-814N," produced by ADEKA Co. Ltd.; and "SN thickener 612," "SN thickener 621N," "SN thickener 625N," "SN thickener 627N," and "SN thickener 660T," produced by San Nopco Ltd.

When the aqueous coating composition of the present invention comprises a thickening agent as described above, the amount of the thickening agent is preferably 0.01 to 10 parts by mass, more preferably 0.05 to 3 parts by mass, and even more preferably 0.1 to 2 parts by mass, per 100 parts by mass of the total solids content of the aqueous film-forming resin (A), crosslinking agent (B), and acrylic urethane resin composite particles (C).

In view of enhancing smoothness and water resistance of the coating film, the aqueous coating composition of the present invention preferably contains an aqueous film-forming resin (A) and a crosslinking agent (B) in proportions such that the amount of the aqueous film-forming resin (A) is 30 to 95 mass %, more preferably 50 to 90 mass %, and even more preferably about 60 to 80 mass %, and the amount of the crosslinking agent (B) is 5 to 70 mass %, more preferably 10 to 50 mass %, and even more preferably 20 to 40 mass %, based on the total amount of these two components.

When the aqueous coating composition of the present invention contains a hydroxy-containing polyester resin (A1) as at least a part of the aqueous film-forming resin (A), the amount of the hydroxy-containing polyester resin (A1) is preferably 2 to 80 mass %, more preferably 10 to 60 mass %, and even more preferably 20 to 50 mass %, based on the total amount of the aqueous film-forming resin (A) and the crosslinking agent (B).

When the aqueous coating composition of the present invention contains a hydroxy-containing acrylic resin (A2) as at least a part of the aqueous film-forming resin (A), the amount of the hydroxy-containing acrylic resin (A2) is preferably 2 to 80 mass %, more preferably 5 to 60 mass %, and even more preferably 10 to 50 mass %, based on the total amount of the aqueous film-forming resin (A) and the crosslinking agent (B).

When the aqueous coating composition of the present invention contains a hydroxy-containing polyester resin (A1) as at least one type of aqueous film-forming resin (A) and the crosslinking agent (B) is a blocked polyisocyanate compound (II), the amount of the hydroxy-containing polyester resin (A1) is preferably 2 to 50 mass %, more preferably 10 to 40 mass %, and even more preferably 15 to 45 mass %, based on the total solids content of the aqueous film-forming resin (A), crosslinking agent (B), and acrylic urethane resin composite particles (C).

When the aqueous coating composition of the present invention contains a hydroxy-containing acrylic resin (A2) as at least one type of aqueous film-forming resin (A) and the crosslinking agent (B) is a blocked polyisocyanate compound (B1), the amount of the hydroxy-containing acrylic resin (A2) is preferably 2 to 50 mass %, more preferably 10 to 40 mass %, and even more preferably 15 to 35 mass %, based on the total solids content of the aqueous film-forming resin (A), crosslinking agent (B), and acrylic urethane resin composite particles (C).

When the aqueous coating composition of the present invention contains a blocked polyisocyanate compound (B1) as the crosslinking agent (B), a crosslinking agent (B) other than the blocked polyisocyanate compound (B1) may be optionally contained. The amount of such an optional component is typically 1 to 50 mass parts, and preferably 5 to 30 mass parts, based on 100 parts by mass of the total solids content of the aqueous film-forming resin (A) and blocked polyisocyanate compound (B1).

The aqueous coating composition of the present invention may be provided as a one-pack coating composition or two-pack coating composition. The two-pack coating composition may be formed of, for example, one pack containing a crosslinking agent (B1) and optionally a solvent, and the other pack containing all of the components other than the crosslinking agent (B) (i.e., principal components); the components in the two packs are usually mixed together immediately before use, and applied as a coating composition.

Preparation of the Aqueous Coating Composition

The aqueous coating composition of the present invention can be prepared by mixing and dispersing, in an aqueous medium, an aqueous film-forming resin (A), a crosslinking agent (B), and acrylic urethane resin composite particles (C), optionally with a pigment (D), a hydrophobic solvent (E), a diester compound (F), and other additives for coating compositions, by a known method. As the aqueous medium, deionized water or a mixture of deionized water and a hydrophilic organic solvent can be used. Examples of the hydrophilic organic solvent include propylene glycol monomethyl ether.

It is usually preferable that the aqueous coating composition has a solid concentration of 30 to 80 mass %, more preferably 40 to 70 mass %, and even more preferably 45 to 60 mass %.

Substrate

The substrate to be coated with the coating composition of the present invention is not limited. Examples of such substrates include exterior panel parts of automotive bodies such as passenger cars, tracks, motorcycles, and buses; automotive components; and exterior panel parts of household electric appliances such as cellular phones and audiovisual apparatus. The exterior panel parts of automotive bodies and automotive components are particularly preferable.

The materials for such substrates are not particularly limited. Examples thereof include metallic materials such as iron, aluminium, brass, copper, tin plate, stainless steel, galvanized steel, steels plated with zinc alloy (Zn—Al, Zn–Ni, Zn–Fe, etc.); plastic materials such as polyethylene resins, polypropylene resins, acrylonitrile-butadiene-styrene (ABS) resins, polyamide resins, acrylic resins, vinylidene chloride resins, polycarbonate resins, polyurethane resins, epoxy resins, and like resins, and various types of FRP; inorganic materials such as glass, cement, and concrete; wood; and textile materials such as paper and cloth. Among these, metallic materials and plastic materials are preferable.

The substrate may be an exterior panel part of an automotive body, a household electric appliance, or a metal substrate, such as a steel plate that forms such a panel or appliance, the metal surface of which has been subjected to a surface treatment, such as phosphate treatment, chromate treatment, or composite oxide treatment. The substrate may have an undercoating film and/or an intermediate coating film formed on the metallic surface. Among these, vehicle bodies having an undercoating film formed thereon by using an electrodeposition coating composition are preferable, and vehicle bodies having an undercoating film formed thereon by using a cationic electrodeposition coating composition are particularly preferable.

The aqueous coating composition of the present invention can be applied to the substrate by a known method, such as air spray coating, airless spray coating, and rotary atomization coating. Among these, air spray coating, rotary atomization coating, and the like are preferable. An electrostatic charge may be applied during the coating. It is usually preferable that the coating film thickness is about 5 to 70 μm, more preferably about 10 to 50 μm, and even more preferably about 10 to 40 μm, when cured.

Multilayer Coating Film-Forming Method

The multilayer coating film-forming method of the present invention comprises the steps in order of:

(1) applying an aqueous first colored coating composition (X) to a substrate to form a first colored coating film thereon;
(2) applying an aqueous second colored coating composition (Y) to the uncured first colored coating film to form a second colored coating film thereon;
(3) applying a clear coating composition (Z) to the uncured second colored coating film to form a clear coating film thereon; and
(4) heating to simultaneously cure the first colored coating film, the second colored coating film, and the clear coating film.

Step (1)

In the multilayer coating film-forming method of the present invention, first, the aqueous first colored coating composition of the present invention is applied to a substrate to form a first colored coating film thereon.

The aqueous coating composition (aqueous first colored coating composition (X)) of the present invention can be applied to the substrate by a known method, such as air spray coating, airless spray coating, or rotary atomization coating. Among these, air spray coating, rotary atomization coating, and the like are preferable. An electrostatic charge may be applied during the coating. Generally, the coating film thickness is preferably about 5 to 70 μm, more preferably about 10 to 50 μm, and even more preferably about 10 to 40 μm, when cured.

Step (2)

An aqueous second colored coating composition (Y) is further applied to the first colored coating film thus formed.

In view of smoothness of the resulting coating film, and inhibition of coating film defects such as popping and sagging, the aqueous second colored coating composition (Y) is preferably applied when the first colored coating film has a solids content within the range of 70 to 100 mass %, more preferably 80 to 100 mass %, and even more preferably 90 to 100 mass %.

Before the aqueous second colored coating composition (Y) is applied, the solids content of the first colored coating film can be adjusted by preheating, air-blowing, or the like.

The preheating can usually be performed by directly or indirectly heating the coated substrate in a drying furnace at a temperature of about 50 to 110° C., preferably about 60 to 80° C., for about 1 to 30 minutes.

The air-blowing can usually be performed by blowing, onto the coated surface of the substrate, air that is room temperature or that is heated to about 25 to 80° C.

In view of recent requirement for reduction in the number of operational steps, after application of the aqueous first colored coating composition (X), the aqueous second colored coating composition (Y) may be applied without preheating, air blowing, or the like. In this case, after the aqueous first colored coating composition (X) is applied, setting at room temperature (about 20 to 35° C.) for about 30 seconds to 10 minutes is preferable. This can increase the solids content of the first colored coating film after application of the aqueous first colored coating composition (X), whereby formation of a mixed layer with the upper coating film (the second colored coating film formed using the aqueous second colored coating composition (Y)) can be inhibited even without preheating.

In this case, the aqueous second colored coating composition (Y) is preferably applied after the aqueous first colored coating film is adjusted to a solids content of 45 mass % or more, preferably 50 mass % or more, as measured one minute after the application of the aqueous first colored coating composition (X).

When preheating or the like is not performed, the solids content of the first colored coating film at the time of applying the aqueous second colored coating composition (Y) tends to be low, and the resulting multilayer coating film is liable to have a mixed layer. However, the use of the coating composition of the present invention as an aqueous first colored coating composition (X) can inhibit poor finish appearance due to the formation of a mixed layer, and can form a multilayer coating film with excellent finish appearance, such as smoothness and distinctness of image, even without preheating.

The solids content of the first colored coating film can be measured, for example, by the following method.

First, the aqueous coating composition is applied simultaneously to the substrate and to an aluminum foil whose mass ($W_1$) is measured beforehand. Subsequently, the aluminum foil optionally subjected to preheating or like treatment as desired after the application is collected just before the application of the aqueous base coating composition (Y), and the mass thereof ($W_2$) is measured. Subsequently, after the collected aluminum foil is dried at 110° C. for 60 minutes and allowed to cool to room temperature in a desiccator, the mass ($W_3$) of the aluminum foil is measured. The solids content is measured according to the following formula.

Solids content(mass %)={($W_3-W_1$)/($W_2-W_1$)}×100

As the aqueous second colored coating composition (Y), known coating compositions that are usually used for coating automotive bodies can be used. A specific example of the aqueous second colored coating composition (Y) is a coating composition obtained by dissolving or dispersing in water a resin component comprising a base resin having a crosslinking functional group, such as carboxy or hydroxy, and a crosslinking agent, together with a pigment and/or other additives. Examples of the base resin include acrylic resins, polyester resins, alkyd resins, urethane resins, and epoxy resins. Examples of the crosslinking agent include blocked or unblocked polyisocyanate compounds, melamine resins, and urea resins. A thermosetting aqueous coating composition containing a hydroxy-containing polyester resin (A1) and/or a hydroxy-containing acrylic resin (A2) as a base resin and a melamine resin as a curing agent can be advantageously used.

The pigment component may be any of the colored pigments, effect pigments, and extender pigments mentioned as examples in the description of the coating composition of the present invention. By using an effect pigment as at least a part of the pigment component, metallic tone or pearlescent tone coating film having a delicate appearance can be formed.

Examples of the effect pigments include aluminium (such as vapor-deposited aluminum), copper, zinc, brass, nickel, aluminium oxide, mica, titanium oxide- or iron oxide-coated aluminium oxide, titanium oxide- or iron oxide-coated mica, glass flakes, and holographic pigments. Among these, aluminium, aluminium oxide, mica, titanium oxide- or iron oxide-coated aluminium oxide, and titanium oxide- or iron oxide-coated mica are preferable, and aluminium is particularly preferable. These effect pigments can be used singly, or in a combination of two or more.

The effect pigment is preferably in the form of scales. As the effect pigment, pigments having a longitudinal dimension of 1 to 100 µm, particularly 5 to 40 µm, and a thickness of 0.001 to 5 µm, particularly 0.01 to 2 µm, are suitable.

When the aqueous second colored coating composition (Y) contains an effect pigment as mentioned above, the content of the effect pigment is typically 1 to 50 parts by mass, preferably 2 to 30 parts by mass, and more preferably 3 to 20 parts by mass, based on 100 parts by mass of the resin solids content of the aqueous base coating composition.

The aqueous second colored coating composition (Y) preferably comprises the hydrophobic solvent (E).

In view of enhancing brilliance of the resulting coating film, the use of an alcoholic hydrophobic solvent as the hydrophobic solvent (E) is preferable. In particular, $C_{7-14}$ alcoholic hydrophobic solvents, such as at least one alcoholic hydrophobic solvent selected from the group consisting of 1-octanol, 2-octanol, 2-ethyl-1-hexanol, ethylene glycol mono-2-ethylhexyl ether, propylene glycol mono-n-butyl ether, and dipropylene glycol mono-n-butyl ether, are preferable.

In view of brilliance of the resulting coating film, the aqueous second colored coating composition (Y) preferably contains a hydrophobic solvent (E), if used, in an amount of 2 to 70 parts by mass, preferably 11 to 60 parts by mass, and even more preferably 16 to 50 parts by mass, based on 100 parts by mass of the resin solids content of the aqueous second colored coating composition (Y).

The aqueous second coating composition (Y) can be applied to the substrate by a known method, such as air spray coating, airless spray coating, or rotary atomization coating. An electrostatic charge may be applied during the coating. The aqueous second coating composition (Y) can usually be applied to a film thickness of about 5 to 40 µm, and more preferably 10 to 30 µm (when cured).

The aqueous second colored coating composition (Y) may further contain, if necessary, additives generally used for coating compositions, such as curing catalysts, thickeners, UV absorbers, light stabilizers, antifoaming agents, plasticizers, organic solvents, surface control agents, and antisettling agents. These additives can be used singly, or in a combination of two or more.

The coating film of the aqueous second colored coating composition (Y) is dried, for example, by preheating, air-blowing, or the like, at about 50 to 110° C., preferably about 60 to 90° C., for about 1 to 60 minutes.

Step (3)

A clear coating composition (Z) is further applied to the thus-obtained coating film of the aqueous second colored coating composition (Y).

As the clear coating composition (Z), known thermosetting clear coating compositions that are usually used for coating automotive bodies can be used. Examples of such thermosetting clear coating compositions include organic solvent thermosetting coating compositions, aqueous thermosetting coating compositions, and powder thermosetting coating compositions, all of which contain a crosslinkable functional group-containing base resin and a crosslinking agent that are reactive to the crosslinkable functional group.

Examples of the crosslinkable functional group contained in the base resin include carboxy, hydroxy, epoxy, and silanol. Examples of the type of base resin include acrylic resins, polyester resins, alkyd resins, urethane resins, epoxy resins, and fluororesins. Examples of the crosslinking agent include polyisocyanate compounds, blocked polyisocyanate compounds, melamine resins, urea resins, carboxy-containing compounds, carboxy-containing resins, epoxy-containing resins, and epoxy-containing compounds.

Examples of preferable combinations of base resin/crosslinking agent for the clear coating composition are carboxy-containing resin/epoxy-containing resin, hydroxy-containing resin/polyisocyanate compound, hydroxy-containing resin/blocked polyisocyanate compound, and hydroxy-containing resin/melamine resin.

The clear coating composition may be a one-pack coating composition or a multi-pack coating composition, such as a two-pack urethane resin coating composition.

The clear coating composition (Z) may contain, if necessary, color pigments, effect pigments, dyes, and the like in amounts such that the transparency of the clear coating composition is not impaired, and may further contain extender pigments, UV absorbers, light stabilizers, antifoaming agents, thickeners, anticorrosives, surface control agents, and the like.

The clear coating composition (Z) can be applied to the coated surface of the aqueous second colored coating composition (Y) by a known method, such as air spray coating, airless spray coating, or rotary atomization coating. An electrostatic charge may be applied during the coating. The clear coating composition can be applied to a coating thickness of typically 10 to 60 μm, and preferably 25 to 50 μm, when cured.

Step (4)

The three layers, i.e., the first colored coating film, the second colored coating film, and the clear coating film, of the multilayer coating film can be simultaneously cured by a usual coating-film-baking method, such as hot-air heating, infrared heating, or high-frequency heating, at about 80 to 170° C., preferably about 120 to 160° C., for about 20 to 40 minutes.

EXAMPLES

The present invention will be described in more detail below with reference to Examples and Comparative Examples. However, the present invention is not limited to these Examples. Note that "parts" and "%" are expressed on a mass basis.

Production of Hydroxy-Containing Polyester Resin (A1)

Production Example 1

174 parts of trimethylolpropane, 327 parts of neopentyl glycol, 352 parts of adipic acid, 109 parts of isophthalic acid, and 101 parts of 1,2-cyclohexanedicarboxylic acid anhydride were placed in a reactor equipped with a thermometer, a thermostat, a stirrer, a reflux condenser, and a water separator, and the mixture was heated from 160° C. to 230° C. over 3 hours. While the resulting condensation water was distilled off via the water separator and the temperature was maintained at 230° C., a reaction was allowed to proceed until an acid value of 3 mg KOH/g or less was achieved. 59 parts of trimellitic anhydride was added to the reaction product, and an addition reaction was conducted at 170° C. for 30 minutes. The resulting product was cooled to 50° C. or lower, and neutralized by adding one equivalent of 2-(dimethylamino)ethanol relative to the acid group. Subsequently, deionized water was gradually added to provide a hydroxy-containing polyester resin solution (A1-1) having a solids content of 45% and a pH of 7.2. The combined content of the aliphatic polybasic acid and alicyclic polybasic acid was 76 mol % and the aromatic polybasic acid content was 24 mol %, based on the total amount of the acid components of the resulting hydroxy-containing polyester resin. The resin had an acid value of 35 mg KOH/g, a hydroxy value of 128 mg KOH/g, and a number average molecular weight of 1,480.

Production Example 2

168 parts of trimethylolpropane, 316 parts of neopentyl glycol, 93 parts of adipic acid, 211 parts of isophthalic acid, 188 parts of phthalic anhydride, and 65 parts of 1,2-cyclohexanedicarboxylic acid anhydride were placed in a reactor equipped with a thermometer, a thermostat, a stirrer, a reflux condenser, and a water separator, and the mixture was heated from 160° C. to 230° C. over 3 hours. While the resulting condensation water is distilled off via the water separator and the temperature was maintained at 230° C., a reaction was allowed to proceed until an acid value of 3 mg KOH/g or less was achieved. 59 parts of trimellitic anhydride was added to the reaction product, and an addition reaction was conducted at 170° C. for 30 minutes. The resulting product was cooled to 50° C. or lower and neutralized by adding one equivalent of 2-(dimethylamino)ethanol relative to the acid group. Subsequently, deionized water was gradually added to provide a hydroxy-containing polyester resin solution (A1-2) having a solids content of 45% and a pH of 7.2. The combined content of the aliphatic polybasic acid and alicyclic polybasic acid was 27 mol %, and the aromatic polybasic acid content was 73 mol %, based on the total amount of the acid components of the resulting hydroxy-containing polyester resin. The resin had an acid value of 35 mg KOH/g, a hydroxy value of 124 mg KOH/g, and a number average molecular weight of 1,530.

Production Example 3

166 parts of trimethylolpropane, 314 parts of neopentyl glycol, 338 parts of adipic acid, and 194 parts of 1,2-cyclohexanedicarboxylic acid anhydride were placed in a reactor equipped with a thermometer, a thermostat, a stirrer, a reflux condenser, and a water separator, and the mixture was heated from 160° C. to 230° C. over 3 hours. While the resulting condensation water was distilled off via the water separator and the temperature was maintained at 230° C., a reaction was allowed to proceed until an acid value of 3 mg KOH/g or less was achieved. 94 parts of 1,2-cyclohexanedicarboxylic acid anhydride was added to the reaction product, and an addition reaction was conducted at 170° C. for 30 minutes. The resulting product was cooled to 50° C. or lower and neutralized by adding one equivalent of 2-(dimethylamino) ethanol relative to the acid group. Subsequently, deionized water was gradually added to provide a hydroxy-containing polyester resin solution (A1-3) having a solids content of 45% and a pH of 7.2. The combined content of the aliphatic polybasic acid and alicyclic polybasic acid was 100 mol %, and the aromatic polybasic acid content was 0 mol %, based on the total amount of the acid components in the resulting hydroxy-containing polyester resin. The resin had an acid value of 35 mg KOH/g, a hydroxy value of 106 mg KOH/g, and a number average molecular weight of 1,540.

Production of Hydroxy-Containing Acrylic Resin (A2)

Production Example 4

30 parts of propylene glycol monopropyl ether was placed in a reactor equipped with a thermometer, a thermostat, a stirrer, a reflux condenser, a nitrogen inlet tube, and a dropping funnel, and the mixture was heated to 85° C. Subsequently, a mixture comprising 6 parts of styrene, 30 parts of methyl methacrylate, 25 parts of n-butyl acrylate, 20 parts of 2-ethylhexyl acrylate, 13 parts of 4-hydroxybutyl acrylate, 6 parts of acrylic acid, 10 parts of propylene glycol monopropyl ether, and 2 parts of 2,2'-azobis(2,4-dimethylvaleronitrile) was added dropwise thereto over 4 hours. After completion of the dropwise addition, the mixture was aged for 1 hour. Subsequently, a mixture of 5 parts of propylene glycol monopropyl ether and 1 part of 2,2'-azobis(2,4-dimethylvaleronitrile) was further added dropwise thereto over 1 hour. After completion of the dropwise addition, the mixture was aged for 1 hour. 7.4 parts of 2-(dimethylamino) ethanol was further added for neutralization, and deionized water was gradually added to provide a hydroxy-containing acrylic resin solution (A2-1) having a solids content of 40%. The obtained hydroxy-containing acrylic resin had an acid value of 47 mg KOH/g, a hydroxy value of 51 mg KOH/g, and a weight average molecular weight of 50,000.

Production Example 5

100 parts of deionized water and 1 part of "Adekaria Soap SR-1025" (trade name, produced by ADEKA Corporation, an ammonium salt of α-sulfo-ω-(1-(alkoxy)methyl-2-(2-propenyloxy)ethoxy)-poly(oxy-1,2-ethandiyl), active ingredient: 25%) were placed in a reactor equipped with a thermometer, a thermostat, a stirrer, a reflux condenser, a nitrogen inlet tube, and a dropping funnel, and were mixed by stirring in a nitrogen stream and heated to 75° C. Subsequently, 3% of the total amount of an emulsion of the monomers shown below and 10 parts of 0.5% aqueous ammonium persulfate solution were introduced into the reactor and maintained at 75° C. for 2 hours. The remainder of the monomer emulsion was then added dropwise to the reactor over 5 hours, and aged for 6 hours after completion of the dropwise addition. The reaction mixture was then cooled to 30° C. and adjusted to a solids content of 40% and pH 6.8 using a 5% aqueous 2-(dimethylamino)ethanol solution and deionized water. Subsequently, the mixture was filtered through a 200-mesh nylon cloth to obtain a hydroxy-containing acrylic resin dispersion (A2-2). The obtained hydroxy-containing acrylic resin had an acid value of 11 mg KOH/g, a hydroxy value of 24 mg KOH/g, and a weight average molecular weight of 1,800,000.
Monomer emulsion: 55 parts of deionized water, 4 parts of "LATEMUL E-118B" (trade name, produced by Kao Corporation, sodium polyoxy ethylene alkyl ether sulfate, active ingredient: 26%), 10 parts of styrene, 53.5 parts of methyl methacrylate, 30 parts of n-butyl acrylate, 5 parts of 2-hydroxyethyl acrylate, 1.5 parts of acrylic acid, and 0.2 part of 2,2'-azobis[2-(2'imidazolin-2-yl)propane] were mixed by stirring to obtain a monomer emulsion.
Production of Blocked Polyisocyanate Compound (B1)

Production Example 6

480 parts of "Sumidur N-3300" (trade name, Sumika Bayer Urethane Co., Ltd., polyisocyanate having a hexamethylene diisocyanate-derived isocyanurate structure, solids content: about 100%, isocyanate group content: 21.8%), 150 parts of ethyl acetate, and 365 parts of diisopropyl malonate were placed in a reactor equipped with a thermometer, a thermostat, a stirrer, a reflux condenser, a nitrogen inlet tube, a dropping funnel, and a simplified trap for the removed solvent. While the mixture was stirred in a nitrogen stream, 4 parts of a 28% methanol solution of sodium methoxide was added, and the resulting mixture was stirred at 65° C. for 8 hours. The amount of isocyanate in the resin solution was 0.07 mol/kg. 870 parts of 4-methyl-2-pentanol was added thereto. While the temperature of the reaction system was maintained at 90 to 95° C., the solvent was distilled off under reduced pressure over 3 hours. Further, 120 parts of 4-methyl-2-pentanol was added to obtain 1,400 parts of a blocked polyisocyanate compound solution (B1-1). 183 parts of isopropanol was contained in the simplified trap for the removed solvent. The obtained blocked polyisocyanate compound solution (B1-1) had a solids concentration of about 60%.

Production Example 7

450 parts of "DURANATE TPA-100" (trade name, produced by Asahi Kasei Chemicals Corporation, hexamethylene diisocyanate-derived isocyanurate structure-containing polyisocyanate, solids content: about 300%, isocyanate group content: 23.0%), 150 parts of ethyl acetate, and 310 parts of diethyl malonate were placed in a reactor equipped with a thermometer, a thermostat, a stirrer, a reflux condenser, a nitrogen inlet tube, a dropping funnel, and a simplified trap for the removed solvent. While the mixture was stirred in a nitrogen stream, 4 parts of a 28% methanol solution of sodium methoxide was added thereto, and the mixture was stirred at 65° C. for 8 hours. The amount of the isocyanate in the obtained resin solution was 0.07 mol/kg. 870 parts of 4-methyl-2-pentanol was added thereto. While the temperature of the reaction system was maintained at 90 to 95° C., the solvent was distilled off under reduced pressure over 3 hours. Further, 120 parts of 4-methyl-2-pentanol was added to give 1350 parts of a blocked polyisocyanate compound solution (B1-2). 140 parts of ethanol was contained in the simplified trap for the removed solvent. The obtained blocked polyisocyanate compound solution (B1-2) had a solids concentration of about 60%.

Production Example 8

480 parts of "Sumidur N-3300," 150 parts of ethyl acetate, and 330 parts of diisopropyl malonate were placed in a reactor equipped with a thermometer, a thermostat, a stirrer, a reflux condenser, a nitrogen inlet tube, a dropping funnel, and a simplified trap for the removed solvent. While the mixture was stirred in a nitrogen stream, 4 parts of a 28% methanol solution of sodium methoxide was added, and the mixture was stirred at 65° C. for 8 hours. The amount of isocyanate in the resulting resin solution was 0.08 mol/kg. 870 parts of 4-methyl-2-pentanol was added thereto. While the temperature of the reaction system was maintained at 90 to 95° C., the solvent was distilled off under reduced pressure over 3 hours. 120 parts of 4-methyl-2-pentanol was added to obtain 1,390 parts of a blocked polyisocyanate compound solution (B1-3). 173 parts of isopropanol was contained in the simplified trap for the removed solvent. The obtained blocked polyisocyanate compound solution (B1-3) had a solids concentration of about 60%.

Production Example 9

480 parts of "Sumidur N-3300," 150 parts of ethyl acetate, and 280 parts of diethyl malonate were placed in a reactor equipped with a thermometer, a thermostat, a stirrer, a reflux condenser, a nitrogen inlet tube, a dropping funnel, and a simplified trap for the removed solvent. While the mixture was stirred in a nitrogen stream, 4 parts of a 28% methanol solution or sodium methoxide was added thereto, and the resulting mixture was stirred at 65° C. for 8 hours. The amount of isocyanate in the resin solution was 0.08 mol/kg. 870 parts of 4-methyl-2-pentanol was added thereto. While the temperature of the reaction system was maintained at 90 to 95° C., the solvent was distilled off under reduced pressure over 3 hours. 120 parts of 4-methyl-2-pentanol was added to obtain 1,350 parts of a blocked polyisocyanate compound solution (B1-4). 133 parts of ethanol was contained in the simple solvent for the removed solvent. The obtained blocked polyisocyanate compound solution (B1-4) had a solids concentration of about 60%.

Production Example 10

480 parts of "Sumidur N-3300," 150 parts of ethyl acetate, and 360 parts of diisopropyl malonate were placed in a reactor equipped with a thermometer, a thermostat, a stirrer, a reflux condenser, a nitrogen inlet tube, a dropping funnel, and a simplified trap for the removed solvent. While the mixture was stirred in a nitrogen stream, 4 parts of a 28% methanol solution of sodium methoxide was added, and the resulting mixture was stirred at. 65° C. for 8 hours. The amount of isocyanate in the obtained resin solution was 0.07 mol/kg. 990 parts of 5-methyl-2-hexanol was added thereto. While the temperature of the reaction system was maintained at 90 to 95° C., the solvent was distilled off under reduced pressure over 3 hours. 120 parts of 5-methyl-2-hexanol was further added to obtain 1,400 parts of a blocked polyisocyanate compound solution (B1-5). 180 parts of isopropanol was contained in the simplified trap for the removed solvent. The obtained blocked polyisocyanate compound solution (B1-5) had a solids concentration of about 60%.

Production Example 11

450 parts of "DURANATE TPA-100," 150 parts of ethyl acetate, and 360 parts of diisopropyl malonate were placed in a reactor equipped with a thermometer, a thermostat, a stirrer, a reflux condenser, a nitrogen inlet tube, a dropping funnel, and a simplified trap for the removed solvent. While the mixture was stirred in a nitrogen stream, 4 parts of a 28% methanol solution of sodium methoxide was added thereto, and the resulting mixture was stirred at 65° C. for 8 hours. The amount of isocyanate in the obtained resin solution was 0.07 mol/kg. 1,100 parts of 6-methyl-2-heptanol was added thereto. While the temperature of the reaction system was maintained at 80 to 85° C., the solvent was distilled off under reduced pressure over 6 hours. Further, 120 parts of 6-methyl-2-heptanol was added to obtain 1,430 parts of a blocked polyisocyanate compound solution (B1-6). 170 parts of isopropanol was contained in the simplified trap for the removed solvent. The obtained blocked polyisocyanate compound solution (B1-6) had a solids concentration of about 60%.

Production Example 12

360 parts of "Sumidur N-3300," 60 parts of "Uniox M-550" (produced by NOF Corporation, polyethylene glycol monomethyl ether, average molecular weight: about 550), and 0.2 part of 2,6-di-tert-butyl-4-methylphenol were placed in a reactor equipped with a thermometer, a thermostat, a stirrer, a reflux condenser, a nitrogen inlet tube, a dropping funnel, and a simplified trap for the removed solvent, then mixed well, and heated in a nitrogen stream at 130° C. for 3 hours. Subsequently, 110 parts of ethyl acetate, and 252 parts of diisopropyl malonate were added. While the mixture was stirred in a nitrogen stream, 3 parts of a 28% methanol solution of sodium methoxide was added thereto, and the resulting mixture was stirred at 65° C. for 8 hours. The amount of isocyanate in the obtained resin solution was 0.12 mol/kg. 683 parts of 4-methyl-2-pentanol was added thereto. While the temperature of the reaction system was maintained at 80 to 85° C., the solvent was distilled off under reduced pressure over 3 hours to obtain 1,010 parts of a blocked polyisocyanate compound solution (B1-7). 95 parts of isopropanol was contained in the simplified trap for the removed solvent. The obtained blocked polyisocyanate compound solution (B1-7) had a solids concentration of about 60%.

Production Example 13

360 parts of "Sumidur N-3300," 50 parts of "Uniox M-440" (produced by NOF Corporation, polyethylene glycol monomethyl ether, average molecular weight: about 400), 5 parts of "PEG #600" (produced by NOF Corporation, polyethylene glycol, average molecular weight: about 600), and 0.2 part of 2,6-di-tert-butyl-4-methylphenol were placed in a reactor equipped with a thermometer, a thermostat, a stirrer, a reflux condenser, a nitrogen inlet tube, a dropping funnel, and a simplified trap for the removed solvent, then mixed well, and heated in a nitrogen stream at 130° C. for 3 hours. Subsequently, 110 parts of ethyl acetate and 247 parts of diisopropyl malonate were added thereto. While the mixture was stirred in a nitrogen stream, 3 parts of 28% methanol solution of sodium methoxide were added, and the resulting mixture was stirred at 65° C. for 8 hours. The amount of isocyanate in the resin solution was 0.11 mol/kg. 670 parts of 4-methyl-2-pentanol was added thereto. While the temperature of the reaction system was maintained at 80 to 85° C., the solvent was distilled off under reduced pressure over 3 hours to obtain 1,010 parts of a blocked polyisocyanate compound solution (B1-8). 92 parts of isopropanol was contained in the simplified trap for the removed solvent. The obtained blocked polyisocyanate compound solution (B1-8) had a solids concentration of about 60%.

Production of Acrylic Urethane Resin Composite Particles (C1)

Production Example 14

24.3 parts of "ETERNACOLL UH-100" (trade name, produced by Ube Industries, Ltd., 1,6-hexanediol-based polycarbonate diol, molecular weight: about 1,000), 35 parts of 2-ethylhexyl acrylate, 0.008 part of butylhydroxytoluene, and 0.03 part of dibutyltin laurate were placed in a reactor equipped with a thermometer, a thermostat, a stirrer, and a reflux condenser. After the mixture was heated to 90° C., 5.7 parts of hydrogenated MDI were added dropwise over 30 minutes. Then, while the mixture was maintained at 90° C., the reaction was allowed to proceed until an NCO value of 1 mg/g or less was achieved. 2 parts of n-butyl acrylate and 3 parts of allyl methacrylate were added to the reaction mixture to obtain a hydroxy-containing polyurethane resin (C1) diluted with an acrylic monomer. The urethane resin component of the obtained polyurethane resin had a hydroxy value of 10 mg KOH/g, and a weight average molecular weight of 30,000.

Then, the components shown below were placed in a glass beaker, and stirred with a dispersing device at 2,000 rpm for 15 minutes to provide a pre-emulsion. This pre-emulsion was then high-pressure treated at 100 MPa with a high-pressure emulsifying apparatus to provide an acrylic monomer emulsion (1) in which the dispersed particles had an average particle size of 290 nm.

Formulation of Monomer Emulsion (1)

| Acrylic monomer-diluted hydroxy-containing polyurethane resin (C1) | 70 parts |
|---|---|
| "Newcol 707SF" (**1) | 4.7 parts |
| Deionized water | 65.3 parts |

(**1) "Newcol 707SF": trade name, produced by Nippon Nyukazai Co., Ltd., an anionic emulsifier having a polyoxyethylene chain, active ingredient: 30%

140 parts of the monomer emulsion (1) was transferred to a flask and diluted with 42.5 parts of deionized water. While stirring, the mixture was heated to 70° C., and an aqueous initiator solution of 0.2 part of "VA-057" (*2) as dissolved in 10 parts of deionized water was added dropwise over 30 minutes. While the temperature was maintained, the mixture was stirred for 2 hours. Then, a monomer emulsion (2) of the following formulation and a solution of 0.15 part of "VA-057" in 7.5 parts of deionized water were added dropwise over 1.5 hours. While the temperature was maintained, the mixture was stirred for 1 hour, after which an aqueous initiator solution of 0.1 part of "VA-057" as dissolved in 5 parts of deionized water was added to the flask. While the temperature was maintained, the mixture was stirred for 2 hours, and then cooled to provide an aqueous dispersion of acrylic urethane resin composite particles (C1).

(**2) "VA-057": trade name, produced by Wako Pure Chemical Industries, Ltd., a polymerization initiator for emulsion polymerization Formulation of Monomer Emulsion (2)

| 2-Ethylhexyl acrylate | 8 parts |
|---|---|
| n-Butyl acrylate | 3 parts |
| Methyl methacrylate | 14 parts |
| 2-Hydroxyethyl methacrylate | 3.5 parts |
| Acrylic acid | 0.5 part |
| Allyl methacrylate | 1 part |
| "Newcol 707SF" | 2.0 parts |
| Deionized water | 18 parts |

The aqueous dispersion of the obtained acrylic urethane resin composite particles (C1) had a mass solids concentration of 40%, an average particle size of 210 nm (measured with a submicron particle size distribution analyzer, "COULTER N4" (produced by Beckman Coulter, Inc.) ac 20° C. as diluted with deionized water). The acrylic resin component had a hydroxy value of 21.6 mg KOH/g, and an acid value of 5.6 mg KOH/g.

Production Examples 15 to 20 and 22 to 23

Aqueous dispersions of acrylic urethane resin composite particles (C2) to (C7) and (C9) to (C10) were produced in the same manner as in Example 14, except that the formulations of monomer emulsions shown in Table 1 below were used. Table 1 shows the solids concentration, acid value, hydroxy value, and average particle size of each of the obtained aqueous dispersions of acrylic urethane resin composite particles (C2) to (C7) and (C9) to (C10).

The aqueous dispersion of the acrylic urethane resin composite particles (C10) obtained in Production Example 23 is for use in a Comparative Example.

Production Example 21

24.3 parts of "ETERNACOLL UH-100," 43 parts of 2-ethylhexyl acrylate, 0.014 part of butylhydroxytoluene, and 0.03 part of dibutyltin laurate were placed in a reactor equipped with a thermometer, a thermostat, a stirrer, and a reflux condenser. After the mixture was heated to 90° C., 5.7 parts of hydrogenated MDI was added dropwise over 30 minutes. Then, while the temperature was maintained at 90° C., a reaction was allowed to proceed until an NCO value of 1 mg/g or less was achieved. 5 parts of n-butyl acrylate, 14 parts of methyl methacrylate, 3.5 parts of 2-hydroxyethyl methacrylate, 0.5 part of acrylic acid, and 4 parts of allyl methacrylate were added to the reaction mixture to obtain a hydroxy-containing polyurethane resin (C8) diluted with an acrylic monomer. The urethane resin component of the obtained polyurethane resin had a hydroxy value of 10 mg KOH/g, and a weight average molecular weight of 30,000.

Then, the components shown below were placed in a glass beaker and stirred with a dispersing device at 2,000 rpm for 15 minutes to provide a pre-emulsion. This pre-emulsion was then high-pressure treated at 100 MPa with a high-pressure emulsifying apparatus to provide a polyurethane-containing acrylic monomer emulsion having dispersed particles with an average particle size of 290 nm.

Formulation of Monomer Emulsion

| Acrylic monomer-diluted hydroxy-containing polyurethane resin (C8) | 100 parts |
|---|---|
| "Newcol 707SF" (**1) | 6.7 parts |
| Deionized water | 93.3 parts |

200 parts of the monomer emulsion was transferred to a flask and diluted with 28.8 parts of deionized water. The mixture was heated to 70° C., and an aqueous initiator solution of 0.35 part of "VA-057" as dissolved in 17.5 parts of deionized water was added dropwise to the flask over 30 minutes. While the temperature was maintained, the mixture was stirred for 2 hours. An aqueous initiator solution of 0.175 part of "VA-057" as dissolved in 8.75 parts of deionized water was added to the flask. While the temperature was maintained, the mixture was stirred for 2 hours, and then cooled to provide an aqueous dispersion of acrylic urethane resin composite particles (C8).

The aqueous dispersion of the obtained acrylic urethane resin composite particles (C8) had a mass solids concentration of 40%, an average particle size of 190 nm (measured in the same manner as in Production Example 1), a hydroxy value of 21.6 mg KOH/g, and an acid value of 5.6 mg KOH/g.

In Table 1, "Polylight OD-X-668" is a trade name of DIC Corporation, an adipic acid/diethylene glycolpolyester diol, number average molecular weight: 1,000, and "PTMG-1000" is a trade name of Mitsubishi Chemical, Inc., polytetramethylene ether glycol, molecular weight: about 1,000.

TABLE 1

| Production Example No. | | | 14 | 15 | 16 | 17 | 18 | 19 | 20 | 21 | 22 | 23 |
|---|---|---|---|---|---|---|---|---|---|---|---|---|
| Acrylic urethane resin composite particles (C) | | | C1 | C2 | C3 | C4 | C5 | C6 | C7 | C8 | C9 | C10 |
| Monomer emulsion | Urethane resin | ETERNACOLL UH-100 | 24.3 | 24.3 | 24.3 | 24.3 | | | 25.1 | 24.3 | 24.3 | 24.3 |
| | | Polylight OD-X-2376 | | | | | 24.3 | | | | | |

TABLE 1-continued

| Production Example No. | | | | 14 | 15 | 16 | 17 | 18 | 19 | 20 | 21 | 22 | 23 |
|---|---|---|---|---|---|---|---|---|---|---|---|---|---|
| (1) | component | PTMG 1000 | | | | | | | 24.3 | | | | |
| | | Hydrogenated MDI | | 5.7 | 5.7 | 5.7 | 5.7 | 5.7 | 5.7 | | 5.7 | 5.7 | 5.7 |
| | | Isophorone diisocyanate | | | | | | | | 4.9 | | | |
| | | Hydroxy value of the urethane resin component (mg KOH/g) | | | | | | 10 | | | | | 10 |
| | | Weight average molecular weight of the urethane resin component | | | | | | 30000 | | | | | 30000 |
| | Acrylic resin component (1) | Polymerizable unsaturated monomer (c-1-1) | n-Butyl acrylate | 2 | 2 | 2 | 2 | 2 | 2 | 2 | 5 | 2 | 5 |
| | | | 2- Ethylhexyl acrylate | 35 | | 35 | 35 | 35 | 35 | 35 | 43 | | 35 |
| | | | Lauryl methacrylate | | 17.5 | | | | | | | | |
| | | | Tridecyl methacrylate | | 17.5 | | | | | | | | |
| | | Polymerizable unsaturated monomer (c-2) | Allyl methacrylate | 3 | 3 | | 3 | 3 | 3 | 3 | 4 | 3 | |
| | | | 1,6-Hexanediol diacrylate | | | 3 | | | | | | | |
| | | Polymerizable unsaturated monomer (c-1-2) | Methyl methacrylate | | | | | | | | 14 | 35 | |
| | | | 2-Hydroxyethyl methacrylate | | | | | | | | 3.5 | | |
| | | | Acrylic acid | | | | | | | | 0.5 | | |
| | Newcol 707SF | | | 4.7 | 4.7 | 4.7 | 4.7 | 4.7 | 4.7 | 4.7 | 6.7 | 4.7 | 4.7 |
| | Deionized water | | | 65.3 | 65.3 | 65.3 | 65.3 | 65.3 | 65.3 | 65.3 | 93.3 | 65.3 | 65.3 |
| | Glass transition temperature Tg1 of acrylic resin component (1) (° C.) | | | −49 | −60 | −49 | −49 | −49 | −49 | −49 | −14 | 85 | −53 |
| Monomer emulsion (2) | Acrylic resin component (2) | Polymerizable unsaturated monomer (c-1) | n-Butyl acrylate | 3 | 3 | 3 | 3 | 3 | 3 | 3 | | 3 | 4 |
| | | | 2- Ethylhexyl acrylate | 8 | | 8 | 8 | 8 | 8 | 8 | | 8 | 8 |
| | | | Lauryl methacrylate | | 4 | | | | | | | | |
| | | | Tridecyl methacrylate | | 4 | | | | | | | | |
| | | Polymerizable unsaturated monomer (c-2) | Allyl methacrylate | 1 | 1 | | 1 | 1 | 1 | 1 | | 1 | |
| | | | 1,6-Hexanediol diacrylate | | | 1 | | | | | | | |
| | | Polymerizable unsaturated monomer (c-3) | Methyl methacrylate | 14 | 14 | 14 | 17.5 | 14 | 14 | 14 | | 14 | 14 |
| | | | 2-Hydroxyethyl methacrylate | 3.5 | 3.5 | 3.5 | | 3.5 | 3.5 | 3.5 | | 3.5 | 3.5 |
| | | | Acrylic acid | 0.5 | 0.5 | 0.5 | 0.5 | 0.5 | 0.5 | 0.5 | | 0.5 | 0.5 |
| | Newcol 707SF | | | 2.0 | 2.0 | 2.0 | 2.0 | 2.0 | 2.0 | 2.0 | | 2.0 | 2.0 |
| | Deionized water | | | 18.0 | 18.0 | 18.0 | 18.0 | 18.0 | 18.0 | 18.0 | | 18.0 | 18.0 |
| | Glass transition temperature Tg2 of acrylic resin component (2) (° C.) | | | 20 | 14 | 20 | 24 | 20 | 20 | 20 | | 20 | 16 |
| Hydroxy value of all of the acrylic resin components (mg KOH/g) | | | | 21.6 | 21.6 | 21.6 | 0 | 21.6 | 21.6 | 21.6 | 21.6 | 21.6 | 21.6 |
| Acid value of all the acrylic resin components (mg KOH/g) | | | | 5.6 | 5.6 | 5.6 | 5.6 | 5.6 | 5.6 | 5.6 | 5.6 | 5.6 | 5.6 |
| Glass transition temperature Tg of all of the acrylic resin components (° C.) | | | | −24 | −34 | −24 | −23 | −24 | −24 | −24 | −14 | 54 | −28 |
| Average particle size (nm) | | | | 210 | 230 | 220 | 240 | 260 | 250 | 240 | 190 | 210 | 250 |
| Solids content (%) | | | | 40 | 40 | 40 | 40 | 40 | 40 | 40 | 40 | 40 | 40 |

Production Examples of Acrylic Resin Emulsion for Aqueous Second Colored Coating Composition (Y)

Production Example 24

130 parts of deionized water and 0.52 part of "Aqualon KH-10" were placed in a reactor equipped with a thermometer, a thermostat, a stirrer, a reflux condenser, a nitrogen-introducing tube, and a dropping funnel, then mixed by stirring in a nitrogen stream, and heated to 80° C. Subsequently, 1% of the total amount of the monomer emulsion (y-1) described below and 5.3 parts of 6% ammonium persulfate solution were introduced into the reactor, and maintained at 80° C. for 15 minutes. The remaining monomer emulsion (y-1) was then added dropwise over 3 hours to the reactor while the temperature of the reactor was maintained. After completion of the dropwise addition, the mixture was aged for 1 hour. Then, the monomer emulsion (y-2) described below was added dropwise over 1 hour and aged for 1 hour, after which, while 40 parts of a 5% dimethylethanolamine aqueous solution was gradually added thereto, the mixture was cooled to 30° C., and filtered through a 100-mesh nylon cloth to provide an acrylic resin emulsion (AC) having an average particle size of 100 nm (as measured with a "COULTER Model N4" submicron particle size distribution analyzer (produced by Beckman Coulter, Inc.) at 20° C. as diluted with deionized water), and a solids concentration of 30%. The acrylic resin component had an acid value of 33 mg KOH/g, and a hydroxy value of 25 mg KOH/g.

Monomer emulsion (y-1): 42 parts of deionized water, 0.72 part of "Aqualon KH-10," 2.1 parts of methylenebisacrylamide, 2.6 parts of styrene, 16.1 parts of methyl methacrylate, 28 parts of ethyl acrylate, and 21 parts of n-butyl acrylate were mixed by stirring to provide a monomer emulsion (y-1).

Monomer emulsion (y-2): 18 parts of deionized water, 0.31 part of "Aqualon KH-10," 0.03 part of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed by stirring to provide a monomer emulsion (y-2).

Production Examples of Polyester Resins for Aqueous Second Colored Coating Composition (Y)

Production Example 25

109 parts of trimethylolpropane, 141 parts of 1,6-hexanediol, 126 parts of hexahydrophthalic acid anhydride, and 120 parts of adipic acid were placed in a reactor equipped with a thermometer, a thermostat, a stirrer, a reflux condenser, and a water separator. The mixture was heated from 160° C. to 230° C. over 3 hours, and then subjected to a condensation reaction at 23° C. for 4 hours. Subsequently, to add carboxy groups to the resulting condensation reaction product, 38.3 parts of trimellitic anhydride was further added thereto, and a reaction was allowed to proceed at 170° C. for 30 minutes. The reaction product was then diluted with 2-ethyl-1-hexanol (mass dissolved in 100 g of water at 20° C.: 0.1 g) to obtain a polyester resin solution (PE1) having a solids concentration of 70%. The obtained polyester resins had an acid value of 46 mg KOH/g, a hydroxy value of 150 mg KOH/g, a solids concentration of 70%, and a number average molecular weight of 6,400.

Production Example 26

A polyester resin solution (PE2) was prepared in the same manner as in Production Example 17 except that ethylene glycol mono-n-butyl ether (mass dissolved in 100 g of water at 20° C.: infinite) was used instead of 2-ethyl-1-hexanol as the diluting solvent.

Reference Production Example of Pigment Dispersion Paste for Aqueous Second Colored Coating Composition (Y)

Reference Production Example 1

56 parts (resin solids content: 25 parts) of the hydroxy-containing polyester resin solution (A1-1) obtained in Production Example 11, 60 parts of "JR-806" (produced by Tayca Corporation, trade name, rutile titanium, dioxide), and 5 parts of deionized water were mixed, and adjusted to a pH of 8.0 with 2-(dimethylamino)ethanol. The mixture was then dispersed using a paint shaker for 30 minutes to obtain a pigment dispersion paste.

Production Example of Effect Pigment Dispersion for Aqueous Second Colored Coating Composition (Y)

Production Example 27

19 parts of "GX-180A" aluminium pigment paste (produced by Asahi Kasei Metals Co., Ltd.; metal content: 74%), 35 parts of 2-ethyl-1-hexanol, 8 parts of a phosphoric acid-containing resin solution A, and 0.2 part of 2-(dimethylamino)ethanol were uniformly mixed in a stirring mixer to obtain an effect pigment dispersion (P1).

Phosphoric acid group-containing resin solution A: A mixed solvent comprising 27.5 parts of methoxypropanol and 27.5 parts of isobutanol was placed in a reactor equipped with a thermometer, a thermostat, a stirrer, a reflux condenser, a nitrogen inlet tube, and a dropping funnel, and heated to 110° C. Subsequently, 121.5 parts of a mixture comprising 25 parts of styrene, 27.5 parts of n-butyl methacrylate, 20 parts of "Isostearyl Acrylate" (trade name, produced by Osaka Organic Chemical Industry, Ltd., branched higher alkyl acrylate), 7.5 parts of 4-hydroxybutyl acrylate, 15 parts of a phosphoric acid group-containing polymerizable monomer A, 12.5 parts of 2-methacryloyloxy ethyl acid phosphate, 10 parts of isobutanol, and 4 parts of tert-butyl peroxyoctanoate were added to the above mixed solvent over 4 hours. Further, a mixture comprising 0.5 part of tert-butyl peroxyoctanoate and 20 parts of isopropanol was added dropwise thereto over 1 hour, and then aged with stirring for 1 hour to provide a phosphoric acid group-containing resin solution A having a solids concentration of 50%. The phosphoric acid group-containing resin had an acid value of 83 mg KOH/g, based on the phosphoric acid group of the resin, a hydroxy value of 29 mg KOH/g, and a weight average molecular weight of 10,000.

Phosphoric acid group-containing polymerizable monomer A: 57.5 parts of monobutyl phosphate and 41 parts of isobutanol were placed in a reactor equipped with a thermometer, a thermostat, a stirrer, a reflux condenser, a nitrogen inlet tube, and a dropping funnel, and heated to 90° C. Thereafter, 42.5 parts of glycidyl methacrylate was added dropwise over 2 hours, and then aged with stirring for 1 hour. 59 parts of isopropanol was added thereto to obtain a phosphoric acid group-containing polymerizable monomer solution having a solids concentration of 50%. The obtained monomer had an acid value of 285 mg KOH/g based on the phosphoric acid group.

Production Example 28

An effect pigment dispersion (P2) was produced in the same manner as in Production Example 20, except that 35 parts of ethylene glycol mono-n-butyl ether was used in place of 35 parts of 2-ethyl-1-hexanol.

Production of Aqueous Second Colored Coating Compositions (Y-1) and (Y-2)

Production Example 29

100 parts of the acrylic resin emulsion (AC) obtained in Production Example 24, 57 parts of the polyester resin solution (PE1) obtained in Production Example 25, 62 parts of the effect pigment dispersion (P1) obtained in Production Example 27, and 37.5 parts of "Cymel 325" were uniformly mixed. Further, "Primal ASE-60," 2-(dimethylamino)ethanol, and deionized water were added thereto to provide an aqueous second colored coating composition (Y-1) having a pH of 8.0, a solids concentration of 25%, and a viscosity of 40 seconds as measured with Ford cup No. 4 at 20° C.

Production Example 30

100 parts of the acrylic resin emulsion (AC) obtained in Production Example 24, 57 parts of the polyester resin solution (PE2) obtained in Production Example 25, 62 parts of the effect pigment dispersion (P2) obtained in Production Example 28, and 37.5 parts of "Cymel 325" were uniformly mixed. Further, "Primal ASE-60," 2-(dimethylamino)ethanol, and deionized water were added thereto to provide an aqueous second colored coating composition (Y-2) having a pH of 8.0, a solids concentration of 25%, and a viscosity of 40 seconds as measured with Ford cup No. 4 at 20° C.

Production (1) of Aqueous Coating Composition (Aqueous First Colored Coating Composition (X))

Example 1-1

56 parts (resin solids: 25 parts) of the hydroxy-containing polyester resin solution (A1-1) obtained in Production Example 1, 60 parts of "JR-806" (trade name, produced by Tayca Corporation, rutile titanium dioxide), 1 part of "Carbon MA-100" (trade name, produced by Mitsubishi Chemical, Inc., carbon black), 15 parts of "Bariace B-35" (trade name, produced by Sakai Chemical Industry Co., Ltd., barium sulfate powder, average primary particle size: 0.5 µm,) 3 parts of "MICRO ACE S-3" (trade name, produced by Nippon Talc Co., Ltd., talc powder, average primary particle size: 4.8 µm), and 5 parts of deionized water were mixed. The mixture was adjusted to a pH of 8.0 with 2-(dimethylamino)ethanol, and then dispersed using a paint shaker for 30 minutes to obtain a pigment dispersion paste.

Subsequently, 140 parts of the obtained pigment dispersion paste, 29 parts of the hydroxy-containing polyester resin solution (A1-1) as obtained in Production Example 1, 25 parts (resin solids content: 10 parts) of the hydroxy-containing acrylic resin solution (A2-1) obtained in Production Example 4, 28 parts (resin solids content: 10 parts) of "U-COAT UX-8100" (trade name, produced by Sanyo Chemical Industries, Ltd., urethane emulsion, solids content: 35%), 33 parts (resin solids content: 26.3 parts) of a crosslinking agent (melamine resin) (B2-1) (a methyl-butyl-mixed etherified melamine resin, solids content: 80%, weight average molecular weight: 800), 15 parts (resin solids content: 5.7 parts) of "Bayhydur VPLS 2310" (trade name, produced by Sumika Bayer Urethane Co., Ltd., hexamethylene diisocyanate methylethylketoxime blocked isocyanate, number average molecular weight: 1000, solids content: 38%), and 25 parts (resin solids content: 10 parts) of the aqueous dispersion of acrylic urethane resin composite particles (C1) obtained in Production Example 14 were uniformly mixed.

Subsequently, "UH-752" (trade name, produced by ADEKA Co., Ltd., a urethane associative thickener), 2-(dimethylamino)ethanol, and deionized water were added to the resulting mixture to provide an aqueous coating composition (X1-1) having a pH of 8.0, a solids concentration of 48%, and a viscosity of 30 seconds as measured with Ford cup No. 4 at 20° C.

Examples 1-2 to 1-18 and Comparative Examples 1-1 to 1-3

Aqueous coating compositions (X1-2) to (X1-21) were produced in the same manner as in Example 1-1, except that the formulations shown in Table 2-1 below were used. The resulting compositions had a pH of 8.0, a solids concentration of 48%, and a viscosity of 30 seconds as measured with Ford cup No. 4 at 20° C.

The aqueous coating compositions (X1-9) to (X1-11) are for use in Comparative Examples.

Example 1-19

An aqueous coating composition (X1-22) was produced in the same manner as in Example 1-1, except that "Primal ASE-0.60" (trade name, produced by Rohm & Haas Co.; a polyacrylic acid thickener) was used in place of "UH-752." The resulting composition had a pH of 8.0, a solids concentration of 48%, and a viscosity of 40 seconds as measured with Ford cup No. 4 at 20° C.

Example 1-20

An aqueous coating composition (X1-23) was produced in the same manner as in Example 1-1, except that "UH-752" was not added. The resulting composition had a pH of 8.0 and a viscosity of 30 seconds as measured with Ford cup No. 4 at 20° C.

TABLE 2

Table 2-1 (No. 1)

| | | | | | Example | | | | | | | | Comparative Example | | |
|---|---|---|---|---|---|---|---|---|---|---|---|---|---|---|---|
| | | | | | 1-1 | 1-2 | 1-3 | 1-4 | 1-5 | 1-6 | 1-7 | 1-8 | 1-1 | 1-2 | 1-3 |
| Aqueous coating composition name | | | | | X1-1 | X1-2 | X1-3 | X1-4 | X1-5 | X1-6 | X1-7 | X1-8 | X1-9 | X1-10 | X1-11 |
| Pigment dispersion paste | Aqueous film-forming resin (A) | Hydroxy-containing polyester resin solution (A1) | | Kind | A1-1 | A1-1 | A1-1 | A1-1 | A1-1 | A1-1 | A1-1 | A1-1 | A1-1 | A1-1 | A1-1 |
| | | | | Amount | 56 | 56 | 56 | 56 | 56 | 56 | 56 | 56 | 56 | 56 | 56 |
| | Pigment (D) | Color pigment | JR-806 | Amount | 60 | 60 | 60 | 60 | 60 | 60 | 60 | 60 | 60 | 60 | 60 |
| | | | MA-100 | Amount | 1 | 1 | 1 | 1 | 1 | 1 | 1 | 1 | 1 | 1 | 1 |
| | | Extender pigment | Bariace B-35 | Amount | 15 | 15 | 15 | 15 | 15 | 15 | 15 | 15 | 15 | 15 | 15 |
| | | | MICRO ACE S-3 | Amount | 3 | 3 | 3 | 3 | 3 | 3 | 3 | 3 | 3 | 3 | 3 |
| Aqueous film-forming resin (A) | | Hydroxy-containing polyester resin solution (A1) | | Kind | A1-1 | A1-1 | A1-1 | A1-1 | A1-1 | A1-1 | A1-1 | A1-1 | A1-1 | A1-1 | A1-1 |
| | | | | Amount | 29 | 29 | 29 | 29 | 29 | 29 | 29 | 29 | 29 | 29 | 29 |
| | | Hydroxy-containing acrylic resin solution (A2) | | Kind | A2-1 | A2-1 | A2-1 | A2-1 | A2-1 | A2-1 | A2-1 | A2-1 | A2-1 | A2-1 | A2-1 |
| | | | | Amount | 25 | 25 | 25 | 25 | 25 | 25 | 25 | 25 | 25 | 25 | 25 |
| | | Urethane emulsion | U-COAT UX-8100 | Amount | 28 | 28 | 28 | 28 | 28 | 28 | 28 | 28 | 28 | 28 | 56 |
| Crosslinking agent (B) | | Melamine resin | | Kind | B2-1 | B2-1 | B2-1 | B2-1 | B2-1 | B2-1 | B2-1 | B2-1 | B2-1 | B2-1 | B2-1 |
| | | | | Amount | 33 | 33 | 33 | 33 | 33 | 33 | 33 | 33 | 33 | 33 | 33 |
| | | Blocked polyisocyanate compound | Bayhydur VPLS 2310 | Amount | 15 | 15 | 15 | 15 | 15 | 15 | 15 | 15 | 15 | 15 | 15 |
| Aqueous dispersion of acrylic urethane resin composite particles (C) | | | | Kind | C1 | C2 | C3 | C4 | C5 | C6 | C7 | C8 | C9 | C10 | |
| | | | | Amount | 25 | 25 | 25 | 25 | 25 | 25 | 25 | 25 | 25 | 25 | |

TABLE 3

Table 2-1 (No. 2)

| | | | | | Example | | | | | | | | | | | |
|---|---|---|---|---|---|---|---|---|---|---|---|---|---|---|---|---|
| | | | | | 1-9 | 1-10 | 1-11 | 1-12 | 1-13 | 1-14 | 1-15 | 1-16 | 1-17 | 1-18 | 1-19 | 1-20 |
| Aqueous coating composition name | | | | | X1-12 | X1-13 | X1-14 | X1-15 | X1-16 | X1-17 | X1-18 | X1-19 | X1-20 | X1-21 | X1-22 | X1-23 |
| Pigment dispersion | Aqueous film- | Hydroxy-containing polyester resin solution (A1) | | Kind | A1-1 | A1-1 | A1-2 | A1-3 | A1-1 | A1-1 | A1-1 | A1-1 | A1-1 | A1-1 | A1-1 | A1-1 |
| | | | | Amount | 56 | 56 | 56 | 56 | 56 | 56 | 56 | 56 | 56 | 56 | 56 | 56 |

TABLE 3-continued

Table 2-1 (No. 2)

| Aqueous coating composition name | | | | Example 1-9 X1-12 | 1-10 X1-13 | 1-11 X1-14 | 1-12 X1-15 | 1-13 X1-16 | 1-14 X1-17 | 1-15 X1-18 | 1-16 X1-19 | 1-17 X1-20 | 1-18 X1-21 | 1-19 X1-22 | 1-20 X1-23 |
|---|---|---|---|---|---|---|---|---|---|---|---|---|---|---|---|
| paste | forming resin (A) | | | | | | | | | | | | | | |
| | Pigment (D) | Color pigment | JR-806 | Amount | 60 | 60 | 60 | 60 | 60 | 60 | 60 | 60 | 60 | 60 | 60 | 60 |
| | | | MA-100 | Amount | 1 | 1 | 1 | 1 | 1 | 1 | 1 | 1 | 1 | 1 | 1 | 1 |
| | | Extender pigment | Bariace B-35 | Amount | 15 | 15 | 15 | 15 | 15 | 15 | 15 | | 15 | 15 | 15 | 15 |
| | | | SPARWITE W-5HB (*1) | Amount | | | | | | | | 15 | | | | |
| | | | MICRO ACE S-3 | Amount | 3 | 3 | 3 | 3 | 3 | 3 | 3 | 3 | 3 | 3 | 3 | 3 |
| Aqueous film-forming resin (A) | Hydroxy-containing polyester resin solution (A1) | | | Kind Amount Kind Amount | A1-1 29 | A1-1 29 | A1-2 29 | A1-3 29 | A1-1 23 | A1-1 29 | A1-1 29 | A1-1 29 | A1-1 18 | A1-1 29 | A1-1 29 | A1-1 29 |
| | Hydroxy-containing acrylic resin solution (A2-1) | | | Kind Amount | A2-1 25 | A2-1 25 | A2-1 25 | A2-1 25 | A2-1 12 | A2-1 25 | A2-1 25 | A2-1 25 | A2-1 13 | A2-1 25 | A2-1 25 | A2-1 25 |
| | Hydroxy-containing acrylic resin dispersion (A2-2) | | | Kind Amount | | | | | A2-2 25 | | | | | | | |
| | Urethane emulsion | U-Coat UX-5000 | | Amount | 28 | 28 | 28 | 28 | 28 | 28 | 28 | 28 | 28 | | 28 | 28 |
| Crosslinking agent (B) | Melamine resin | | | Kind | B2-1 | B2-1 | B2-1 | B2-1 | B2-1 | B2-1 | B2-2 (*2) | B2-1 | B2-1 | B2-1 | B2-1 | B2-1 |
| | | | | Amount | 33 | 33 | 33 | 33 | 33 | 40 | 33 | 33 | 30 | 33 | 33 | 33 |
| | Blocked polyisocyanate compound | Bayhydur VPLS 2310 | | Amount | 15 | 15 | 15 | 15 | 10 | | 15 | 15 | 15 | 15 | 15 | 15 |
| Aqueous dispersion of acrylic urethane resin composite particles (C) | | | | Kind Amount | C1 25 | C1 25 | C1 25 | C1 25 | C1 25 | C1 25 | C1 25 | C1 25 | C1 50 | C1 50 | C1 25 | C1 25 |
| Hydrophobic solvent (F) | 2-Ethyl-1-hexanol (* 3) | | | Amount | 10 | | | | | | | | | | | |
| Diester compound (G) | Diester compound (F-1) (*4) | | | Amount | | 10 | | | | | | | | | | |

Production (2) of Aqueous Coating Composition (Aqueous First Colored Coating Composition (X))

Example 2-1

56 parts (resin solids content: 25 parts) of the aqueous hydroxy-containing polyester resin solution (A1-1) obtained in Production Example 1, 60 parts of "JR-806" (trade name, produced by Tayca Corporation, rutile titanium dioxide), 1 part of "Carbon MA-100" (trade name, produced by Mitsubishi Chemical Corporation, carbon black), 15 parts of "Bariace B-35" (trade name, produced by Sakai Chemical Industry Co., Ltd., barium sulfate powder, average primary particle size: 0.5 µm), 3 parts of "MICRO ACE S-3" (trade name, Nippon Talc Co., Ltd., powdered talc, average primary particle size: 4.8 µm), and 5 parts of deionized water were mixed. The mixture was adjusted to a pH of 8.0 with 2-(dimethylamino)ethanol, and then dispersed with a paint shaker for 30 minutes to obtain a pigment dispersion paste.

Subsequently, 140 parts of the obtained pigment dispersion paste, 29 parts (solids content: 13 parts) of the hydroxy-containing polyester resin solution (A1-1) obtained in Production Example 1, 25 parts (resin solids content: 10 parts) of the hydroxy-containing acrylic resin solution (A2-1) obtained in Production Example 4, 42 parts (resin solids content: 25.2 parts) of the blocked polyisocyanate compound solution (solids content: 60%) obtained in Production Example 6 (P1-1), 20.8 parts (resin solids content: 16.6 parts) of a crosslinking agent (melamine resin) (B2-1) (a methyl-butyl-mixed etherified melamine resin, solids content: 80%, weight average molecular weight 800), and 25 parts of the aqueous dispersion of acrylic urethane resin composite particles (C1) obtained in Production Example 14 (resin solids content: 10 parts) were uniformly mixed.

Subsequently, "UH-752" (trade name, produced by ADEKA Co., Ltd., a urethane associative thickener), 2-(dimethylamino)ethanol, and deionized water were added to the resulting mixture to provide an aqueous coating composition (X2-1). The obtained composition had a pH of 8.0, a solids concentration of 48%, and a viscosity of 30 seconds as measured with Ford cup No. 4 at 20° C.

Examples 2-2 to 2-25 and Comparative Examples 2-1 to 2-3

Aqueous coating compositions (X2-2) to (X2-28) were produced in the same manner as in Example 2-1, except that the formulations shown in Table 2-2 below were used. The obtained compositions had a pH of 8.0, a solids concentration of 48%, and a viscosity of 30 seconds as measured with Ford cup No. 4 at 20° C.

The aqueous coating compositions (X2-9), (X2-10) and (X2-18) are for use in Comparative Examples.

Example 2-26

An aqueous coating composition (X2-29) was produced in the same manner as in Example 2-1, except that "Primal ASE-60" (trade name, produced by Rohm & Haas Co.; a polyacrylic acid thickener) was used in place of "UH-752." The obtained composition had a pH of 8.0, a solids concentration of 48%, and a viscosity of 40 seconds as measured with Ford cup No. 4 at 20° C.

Example 2-27

An aqueous coating composition (X2-30) was produced in the same manner as in Example 2-1, except that "UH-752" was not added. The obtained composition had a pH of 8.0, a solids concentration of 48%, and a viscosity of 30 seconds as measured with Ford cup No. 4 at 20° C.

TABLE 4

Table 2-2 (No. 1)

|  |  |  |  | Example | | | | | | | | | Comparative Example | |
|---|---|---|---|---|---|---|---|---|---|---|---|---|---|---|
|  |  |  |  | 2-1 | 2-2 | 2-3 | 2-4 | 2-5 | 2-6 | 2-7 | 2-8 | 2-1 | 2-2 |
| Aqueous coating composition name |  |  |  | X2-1 | X2-2 | X2-3 | X2-4 | X2-5 | X2-6 | X2-7 | X2-8 | X2-9 | X2-10 |
| Pigment dispersion paste | Aqueous film-forming resin (A) | Hydroxy-containing polyester resin solution (A1) | Kind | A1-1 | A1-1 | A1-1 | A1-1 | A1-1 | A1-1 | A1-1 | A1-1 | A1-1 | A1-1 |
|  |  |  | Amount | 56 | 56 | 56 | 56 | 56 | 56 | 56 | 56 | 56 | 56 |
|  | Pigment (D) | Color pigment | JR-806 Amount | 60 | 60 | 60 | 60 | 60 | 60 | 60 | 60 | 60 | 60 |
|  |  |  | MA-100 Amount | 1 | 1 | 1 | 1 | 1 | 1 | 1 | 1 | 1 | 1 |
|  |  | Extender pigment | Bariace B-35 Amount | 15 | 15 | 15 | 15 | 15 | 15 | 15 | 15 | 15 | 15 |
|  |  |  | MICRO ACE S-3 Amount | 3 | 3 | 3 | 3 | 3 | 3 | 3 | 3 | 3 | 3 |
| Aqueous film-forming resin (A) |  | Hydroxy-containing polyester resin solution (A1) | Kind | A1-1 | A1-1 | A1-1 | A1-1 | A1-1 | A1-1 | A1-1 | A1-1 | A1-1 | A1-1 |
|  |  |  | Amount | 29 | 29 | 29 | 29 | 29 | 29 | 29 | 29 | 29 | 29 |
|  |  | Hydroxy-containing acrylic resin solution (A2) | Kind | A2-1 | A2-1 | A2-1 | A2-1 | A2-1 | A2-1 | A2-1 | A2-1 | A2-1 | A2-1 |
|  |  |  | Amount | 25 | 25 | 25 | 25 | 25 | 25 | 25 | 25 | 25 | 50 |
| Crosslinking agent (B) |  | Blocked polyisocyanate compound (B1) | Kind | B-1 | B-1 | B-1 | B-1 | B-1 | B-1 | B-1 | B-1 | B-1 | B-1 |
|  |  |  | Amount | 42 | 42 | 42 | 42 | 42 | 42 | 42 | 42 | 42 | 42 |
|  |  |  | Kind | B2-1 | B2-1 | B2-1 | B2-1 | B2-1 | B2-1 | B2-1 | B2-1 | B2-1 | B2-1 |
|  |  |  | Amount | 20.8 | 20.8 | 20.8 | 20.8 | 20.8 | 20.8 | 20.8 | 20.8 | 20.8 | 20.8 |
| Aqueous dispersion of acrylic urethane resin composite particles (C) |  |  | Kind | C1 | C2 | C3 | C4 | C5 | C6 | C7 | C8 | C10 |  |
|  |  |  | Amount | 25 | 25 | 25 | 25 | 25 | 25 | 25 | 25 | 25 |  |

TABLE 5

Table 2-2 (No. 2)

|  |  |  |  | 2-9 | 2-10 | 2-11 | 2-12 | 2-13 | 2-14 | 2-15 | Comparative Example 2-3 |
|---|---|---|---|---|---|---|---|---|---|---|---|
| Aqueous coating composition name |  |  |  | X2-11 | X2-12 | X2-13 | X2-14 | X2-15 | X2-16 | X2-17 | X2-18 |
| Pigment dispersion paste | Aqueous film-forming resin (A) | Hydroxy-containing polyester resin solution (A1) | Kind | A1-1 | A1-1 | A1-1 | A1-1 | A1-1 | A1-1 | A1-1 | A1-1 |
|  |  |  | Amount | 56 | 56 | 56 | 56 | 56 | 56 | 56 | 56 |
|  | Pigment (D) | Color pigment | JR-806 Amount | 60 | 60 | 60 | 60 | 60 | 60 | 60 | 60 |
|  |  |  | MA-100 Amount | 1 | 1 | 1 | 1 | 1 | 1 | 1 | 1 |
|  |  | Extender pigment | Bariace B-35 Amount | 15 | 15 | 15 | 15 | 15 | 15 | 15 | 15 |
|  |  |  | MICRO ACE S-3 Amount | 3 | 3 | 3 | 3 | 3 | 3 | 3 | 3 |
| Aqueous film-forming resin (A) |  | Hydroxy-containing polyester resin solution (A1) | Kind | A1-1 | A1-1 | A1-1 | A1-1 | A1-1 | A1-1 | A1-1 | A1-1 |
|  |  |  | Amount | 29 | 29 | 29 | 29 | 29 | 29 | 29 | 29 |
|  |  | Hydroxy-containing acrylic resin solution (A2) | Kind | A2-1 | A2-1 | A2-1 | A2-1 | A2-1 | A2-1 | A2-1 | A2-1 |
|  |  |  | Amount | 25 | 25 | 25 | 25 | 25 | 25 | 25 | 25 |
| Crosslinking agent (B) |  | Blocked polyisocyanate compound (B1) | Kind | B1-2 | B1-3 | B1-4 | B1-5 | B1-6 | B1-7 | B1-8 |  |
|  |  |  | Amount | 42 | 42 | 42 | 42 | 42 | 42 | 42 |  |
|  |  |  | Kind | B2-1 | B2-1 | B2-1 | B2-1 | B2-1 | B2-1 | B2-1 | B2-1 |
|  |  |  | Amount | 20.8 | 20.8 | 20.8 | 20.8 | 20.8 | 20.8 | 20.8 | 52.3 |
| Aqueous dispersion of acrylic urethane resin composite particles (C) |  |  | Kind | C1 | C1 | C1 | C1 | C1 | C1 | C1 | C1 |
|  |  |  | Amount | 25 | 25 | 25 | 25 | 25 | 25 | 25 | 25 |

TABLE 6

Table 2-2 (No. 3)

|  |  |  |  | Example | | | | | | | | | | | |
|---|---|---|---|---|---|---|---|---|---|---|---|---|---|---|---|
|  |  |  |  | 2-16 | 2-17 | 2-18 | 2-19 | 2-20 | 2-21 | 2-22 | 2-23 | 2-24 | 2-25 | 2-26 | 2-27 |
| Aqueous coating composition name |  |  |  | X2-19 | X2-20 | X2-21 | X2-22 | X2-23 | X2-24 | X2-25 | X2-26 | X2-27 | X2-28 | X2-29 | X2-30 |
| Pigment dispersion paste | Aqueous film-forming resin (A) | Hydroxy-containing polyester resin solution (A1) | Kind | A1-1 | A1-1 | A1-2 | A1-3 | A1-1 | A1-1 | A1-1 | A1-1 | A1-1 | A1-1 | A1-1 | A1-1 |
|  |  |  | Amount | 56 | 56 | 56 | 56 | 56 | 56 | 56 | 56 | 56 | 56 | 56 | 56 |

TABLE 6-continued

Table 2-2 (No. 3)

| Aqueous coating composition name | | | | 2-16 X2-19 | 2-17 X2-20 | 2-18 X2-21 | 2-19 X2-22 | 2-20 X2-23 | 2-21 X2-24 | 2-22 X2-25 | 2-23 X2-26 | 2-24 X2-27 | 2-25 X2-28 | 2-26 X2-29 | 2-27 X2-30 |
|---|---|---|---|---|---|---|---|---|---|---|---|---|---|---|---|
| Pigment (D) | Color pigment | JR-806 | Amount | 60 | 60 | 60 | 60 | 60 | 60 | 60 | 60 | 60 | 60 | 60 | 60 |
| | | MA-100 | Amount | 1 | 1 | 1 | 1 | 1 | 1 | 1 | 1 | 1 | 1 | 1 | 1 |
| | Extender pigment | Bariace B-35 | Amount | 15 | 15 | 15 | 15 | 15 | 15 | 15 | | 15 | 15 | 15 | 15 |
| | | SPARWITE W-5HB (*1) | Amount | | | | | | | | 15 | | | | |
| | | MICRO ACE S-3 | Amount | 3 | 3 | 3 | 3 | 3 | 3 | 3 | 3 | 3 | 3 | 3 | 3 |
| Aqueous film-forming resin (A) | Hydroxy-containing polyester resin solution (A1) | | Kind | A1-1 | A1-1 | A1-2 | A1-3 | A1-1 | A1-1 | A1-1 | A1-1 | A1-1 | A1-1 | A1-1 | A1-1 |
| | | | Amount | 29 | 29 | 29 | 29 | 11.2 | 29 | 29 | 29 | 17.8 | 29 | 29 | 29 |
| | Hydroxy-containing acrylic resin solution (A2-1) | | Kind | A2-1 | A2-1 | A2-1 | A2-1 | A2-1 | A2-1 | A2-1 | A2-1 | A2-1 | A2-1 | A2-1 | A2-1 |
| | | | Amount | 25 | 25 | 25 | 25 | 20 | 25 | 25 | 25 | 12.5 | 25 | 25 | 25 |
| | Hydroxy-containing acrylic resin dispersion (A2-2) | | Kind | | | | | | | A2-2 | | | | | |
| | | | Amount | | | | | | | 25 | | | | | |
| Crosslinking agent (B) | Blocked polyisocyanate compound (B1) | | Kind | B1-1 | B1-1 | B1-1 | B1-1 | B1-1 | B1-1 | B1-1 | B1-1 | B1-1 | B1-1 | B1-1 | B1-1 |
| | | | Amount | 42 | 42 | 42 | 42 | 42 | 69.7 | 42 | 42 | 42 | 25.3 | 42 | 42 |
| | | | Kind | B2-1 | B2-1 | B2-1 | B2-1 | B2-1 | B2-1 | B2-2 (*2) | B2-1 | B2-1 | B2-1 | B2-1 | B2-1 |
| | | | Amount | 20.8 | 20.8 | 20.8 | 20.8 | 20.8 | | 20.8 | 20.8 | 20.8 | 33.3 | 20.8 | 20.8 |
| Aqueous dispersion of acrylic urethane resin composite particles (C) | | | Kind | C1 | C1 | C1 | C1 | C1 | C1 | C1 | C1 | C1 | C1 | C1 | C1 |
| | | | Amount | 25 | 25 | 25 | 25 | 25 | 25 | 25 | 25 | 50 | 25 | 25 | 25 |
| Hydrophobic solvent (E) | 2-Ethyl-1-hexanol (* 3) | | Amount | 10 | | | | | | | | | | | |
| Diester compound (F) | Diester compound (F-1) (*4) | | Amount | | 10 | | | | | | | | | | |

(*1)-(*4) in Tables 2-1 and 2-2 are as follows.
(*1) SPARWITE W-5HB: trade name, produced by Wilbur-Ellis Co., barium sulfate powder, average primary particle size: 1.6 μm
(*2) crosslinking agent (melamine resin) (B2-2): methyl-etherified melamine resin, solids content 80%, weight average molecular weight 800
(* 3) 2-ethyl-1-hexanol: the mass dissolved in 100 g of water at 20° C. is 0.1 g
(*4) Diester compound (F-I): a diester compound of polyoxyethylene glycol and 2-ethylhexanoic acid, corresponding to the compound of formula (1) in whivch $R^8$ and $R^9$ are each 2-ethylheptyl, $R^{10}$ is ethylene, and m is 7, molecular weight 578.

Multilayer Coating Film-Forming Method

Using the aqueous coating compositions (X1-1) to (X1-23) obtained in Examples 1-1 to 1-20 and Comparative Examples 1-1 to 1-3, and aqueous second colored coating compositions (Y-1) and (Y-2) obtained in Production Example 29 and 30, test plates were prepared and evaluation tests were performed in the manner described below. Further, using the aqueous coating compositions (X2-1) to (X2-30) obtained in Examples 2-1 to 2-27 and Comparative Example 2-1 to 2-3, and the aqueous second colored coating compositions (Y-1) and (Y-2) obtained in Production Examples 29 and 30, test plates were prepared and evaluation tests were performed in the manner described below.

Preparation of Test Substrates

"Electron GT-10" (trade name, produced by Kansai Paint Co., Ltd., a cationic electrodeposition coating composition) was applied to zinc phosphated cold-rolled steel plates by electrodeposition to a film thickness of 20 μm when dried, and cured by heating at 170° C. for 30 minutes to prepare test substrates.

Example 1-21

The aqueous coating composition (X1-1, aqueous first colored coating composition) obtained in Example 1-1 was electrostatically applied to the test substrate to a film thickness of 20 μm (when cured) using a rotary atomizing electrostatic coating apparatus to form an intermediate coating film, and then allowed to stand for 3 minutes. After preheating at 80° C. for 3 minutes, the aqueous colored coating composition (Y-1) obtained in Production Example 29 was electrostatically applied to the uncured intermediate coating film to a film thickness of 15 μm when cured using a rotary atomizing electrostatic coating apparatus to form a base coating film, and then allowed to stand for 3 minutes. After preheating at 80° C. for 3 minutes, "Magicron KINO #1210" (trade name, produced by Kansai Paint Co., Ltd., an acrylic resin solvent-based (acid epoxy curing-type) top clear coating composition; hereinafter sometimes referred to as "clear coating composition (z-1)") was electrostatically applied to the uncured base coating film co a film thickness of 35 μm when cured, to form a clear coating film. The thus-coated substrate was allowed to stand for 7 minutes, and then heated at 140° C. for 30 minutes to simultaneously cure the intermediate coating film, base coating film, and clear coating film, thereby preparing a test plate.

Examples 1-22 to 1-40 and Comparative Examples 1-4 to 1-6

Test plates were prepared in the same manner as in Example 1-21, except that the aqueous colored coating compositions (X1-2) to (X1-23) shown in Table 3-1 below were used in place of the aqueous first colored coating composition (X1-1) obtained in Example 1-1.

Example 1-41

A test plate was prepared in the same manner as in Example 1-21, except that the aqueous second colored coating composition (Y-2) obtained in Production Example 30 was used in place of the aqueous second colored coating composition (Y-1) obtained in Production Example 29.

Example 2-29

A test plate was prepared in the same manner as in Example 1-21, except that the aqueous first colored coating composition (X2-1) obtained in Example 2-1 was used in place of the aqueous first colored coating composition (X1-1) obtained in Example 1-1.

Examples 2-29 to 2-54 and Comparative Examples 2-4 to 2-6

Test plates were prepared in the same manner as in Examples 2-28, except that the aqueous colored coating compositions (X2-2) to (X2-30) shown in Table 2-2 below were used in place of the aqueous first colored coating composition (X2-1) obtained in Example 2-1.

Example 2-55

A test plate was prepared in the same manner as in Example 2-28, except that the aqueous second colored coating composition (Y-2) obtained in Production Example 30 was used in place of the aqueous second colored coating composition (Y-1) obtained in Example 29.

Evaluation Tests

The test plates obtained in Examples 1-21 to 1-41 and Comparative Examples 1-4 to 1-6 were evaluated for smoothness, distinctness of image, anti-water adhesion (water resistance), chipping resistance, and wash-off from a coating gun, by the test methods described below. Table 3-1 shows the evaluation results.

Further, the test plates obtained in the above Examples 2-28 to 2-55 and Comparative Examples 2-4 to 2-6 were evaluated for smoothness, distinctness of image, anti-water adhesion (water resistance), anti-water adhesion after storage, and chipping resistance, by the test methods described below. Table 3-2 below shows the evaluation results of these tests.

Test Methods

Smoothness: evaluated based on Wc value measured using "Wave Scan DOI" (trade name, produced by BYK Gardner). Wc value is an index of the amplitude of surface roughness at a wavelength of about 0.3 to 1 nm. A smaller Wc value indicates a higher smoothness of the coated surface.

Distinctness of image: evaluated based on Wb value measured using "Wave Scan DOI" (trade name, manufactured by BYK Gardner Co.). Wb value is an index of the amplitude of surface roughness at a wavelength of about 0.1 to 0.3 mm. A smaller Wb value indicates a higher distinctness of image of the coated surface.

Anti-water adhesion (water resistance): Each test plate was immersed in warm water at 40° C. for 240 hours. After being removed from the water, the test plate was dried at 20° C. for 12 hours. Then, cross-cuts reaching the substrate were made in the multilayer coating film of the test plate using a cutter knife to form a grid of 100 squares (2 mm×2 mm). Subsequently, adhesive cellophane tape was applied to the surface of the grid portion, and the tape was peeled off rapidly at 20° C. Then, the number of squares of the coating film remaining and the condition were checked.

S: 100 squares of the coating film remained, and no small edge chipping of the coating film occurred at the edge of the cut made by the cutter knife.

A: 100 squares of the coating film remained, but small edge chipping of the coating film occurred at the edge of the cut made by the cutter knife.

B: 90 to 99 squares of the coating film remained.

C: The number of squares of the coating film remaining was 89 or less.

Anti-water adhesion after storage: The aqueous coating compositions (aqueous first colored coating composition) were stored at 40° C. for 1 month. Test plates were prepared by forming multilayer coating films using the aqueous coating compositions. Each test plate was immersed in warm water at 40° C. for 240 hours. After being removed from the water, the test plate was dried at 20° C. for 12 hours. Then, cross-cuts reaching the substrate were made in the multilayer coating films of the test plates using a cutter knife to form a grid of 100 squares (2 mm×2 nm). Subsequently, adhesive cellophane tape was applied to the surface of the grid portion, and the tape was peeled off rapidly at 20° C. Then, the number of squares of the coating film remaining and the condition were checked.

S: 100 squares of the coating film remained, and no small edge chipping of the coating film occurred at the edge of the cut made by the cutter knife.

A: 100 squares of the coating film remained, but small edge chipping of the coating film occurred at the edge of the cut made by the cutter knife.

B: 90 to 99 squares of the coating film remained.

C: The number of squares of the coating film remaining was 89 or less.

Chipping resistance: Each test plate was placed on a sample holder of a "JA-400" flying stone chipping tester (a chipping test device) produced by Suga Test Instruments Co., Ltd., and 50 g of crushed granite of No. 7 particle size was blown onto the test plate at an angle of 45° with compressed air at 0.392 MPa (4 kgf/cm$^2$), at a distance of 30 cm from the test plate, and at a temperature of −20° C. Subsequently, the resulting test plate was washed with water and dried, and cloth adhesive tape (produced by Nichiban Co., Ltd.) was applied to the coating surface. After peeling off the tape, the occurrence of scratches formed on the coating film was visually observed and evaluated according to the following criteria.

S: Sizes of scratches were extremely small, and the electrodeposition surface and the substrate steel plate were not exposed.

A: Sizes of scratches were small, and the electrodeposition surface and the substrate steel plate were not exposed.

B: Sizes of scratches were small, but the electrodeposition surface and the substrate steel plate were exposed.

C: Sizes of scratches were considerably large, and the substrate steel plate was also largely exposed.

Wash-off from a coating gun: Each aqueous first colored coating composition was ejected for 10 seconds using a "G1 Copes Bell" automatic coater produced by ABB Industry K.K. (rotation speed: 30,000/min, shaping air pressure: 4.0 kg/cm$^2$, paint flow rate: 200 cc/min), and allowed to stand for 50 seconds. This procedure was repeated 10 times, and cleaning water (water/ethylene glycol butyl ether/isopropanol/dimethyl ethanol amine)=90/5/4/1 (mass ratio)) was ejected for 2 seconds. The condition of the coating composition remaining on the groove of the bell was evaluated.

A: No coating composition remained on the groove of the bell.

B: A small amount of the coating composition remained on the groove of the bell.

C: A considerable amount of the coating composition remained on the groove of the bell.

TABLE 7

TABLE 3-1

| | | Aqueous coating composition (X) | Aqueous second colored coating composition (Y) | Clear coating composition (Z) | Evaluation results | | | | |
|---|---|---|---|---|---|---|---|---|---|
| | | | | | Smoothness | Distinctness of image | Anti-water adhesion | Chipping resistance | Wash-off from coating gun |
| Example | 1-21 | X1-1 | Y-1 | Z-1 | 28.3 | 27.5 | A | S | A |
| | 1-22 | X1-2 | Y-1 | Z-1 | 21.9 | 22.7 | S | S | A |
| | 1-23 | X1-3 | Y-1 | Z-1 | 26.8 | 25.9 | A | S | A |
| | 1-24 | X1-4 | Y-1 | Z-1 | 30.5 | 29.8 | A | A | A |
| | 1-25 | X1-5 | Y-1 | Z-1 | 27.3 | 26.8 | A | S | A |
| | 1-26 | X1-6 | Y-1 | Z-1 | 26.2 | 25.5 | A | S | A |
| | 1-27 | X1-7 | Y-1 | Z-1 | 29.8 | 28.3 | A | A | A |
| | 1-28 | X1-8 | Y-1 | Z-1 | 28.9 | 26.8 | A | A | A |
| | 1-29 | X1-12 | Y-1 | Z-1 | 24.6 | 23.7 | A | S | A |
| | 1-30 | X1-13 | Y-1 | Z-1 | 19.8 | 20.6 | A | S | A |
| | 1-31 | X1-14 | Y-1 | Z-1 | 22.3 | 23.3 | S | A | A |
| | 1-32 | X1-15 | Y-1 | Z-1 | 22.9 | 24.2 | A | S | A |
| | 1-33 | X1-16 | Y-1 | Z-1 | 21.4 | 22.5 | S | S | A |
| | 1-34 | X1-17 | Y-1 | Z-1 | 20.9 | 22.0 | S | A | A |
| | 1-35 | X1-18 | Y-1 | Z-1 | 24.3 | 25.2 | A | A | A |
| | 1-36 | X1-19 | Y-1 | Z-1 | 22.1 | 23.5 | S | S | A |
| | 1-37 | X1-20 | Y-1 | Z-1 | 21.2 | 22.9 | A | S | A |
| | 1-38 | X1-21 | Y-1 | Z-1 | 22.7 | 21.4 | S | A | A |
| | 1-39 | X1-22 | Y-1 | Z-1 | 23.6 | 23.1 | S | S | A |
| | 1-40 | X1-23 | Y-1 | Z-1 | 24.7 | 25.1 | S | S | A |
| | 1-41 | X1-1 | Y-2 | Z-1 | 21.4 | 22.9 | S | S | A |
| Comparative Example | 1-4 | X1-9 | Y-1 | Z-1 | 34.8 | 33.9 | B | A | A |
| | 1-5 | X1-10 | Y-1 | Z-1 | 36.2 | 25.6 | A | B | B |
| | 1-6 | X1-11 | Y-1 | Z-1 | 41.2 | 40.4 | A | A | C |

TABLE 8

TABLE 3-2

| | | Aqueous coating composition (X) | Aqueous second colored coating composition (Y) | Clear coating composition (Z) | Evaluation results | | | | |
|---|---|---|---|---|---|---|---|---|---|
| | | | | | Smoothness | Distinctness of image | Anti-water adhesion | Anti-water adhesion after storage | Chipping resistance |
| Example | 2-28 | X2-1 | Y-1 | Z-1 | 14.1 | 13.8 | S | A | S |
| | 2-29 | X2-2 | Y-1 | Z-1 | 11.0 | 11.3 | S | S | S |
| | 2-30 | X2-3 | Y-1 | Z-1 | 13.4 | 12.8 | S | A | S |
| | 2-31 | X2-4 | Y-1 | Z-1 | 15.2 | 14.9 | S | A | A |
| | 2-32 | X2-5 | Y-1 | Z-1 | 13.6 | 13.4 | S | A | S |
| | 2-33 | X2-6 | Y-1 | Z-1 | 13.1 | 12.7 | S | A | S |
| | 2-34 | X2-7 | Y-1 | Z-1 | 14.9 | 14.1 | S | A | A |
| | 2-35 | X2-8 | Y-1 | Z-1 | 14.4 | 13.4 | S | A | A |
| | 2-36 | X2-11 | Y-1 | Z-1 | 15.5 | 15.2 | S | A | A |
| | 2-37 | X2-12 | Y-1 | Z-1 | 15.1 | 14.8 | S | A | A |
| | 2-38 | X2-13 | Y-1 | Z-1 | 13.9 | 14.5 | S | A | A |
| | 2-39 | X2-14 | Y-1 | Z-1 | 13.8 | 14.4 | S | A | A |
| | 2-40 | X2-15 | Y-1 | Z-1 | 13.5 | 14.1 | S | A | A |
| | 2-41 | X2-16 | Y-1 | Z-1 | 11.2 | 12.1 | S | A | S |
| | 2-42 | X2-17 | Y-1 | Z-1 | 12.4 | 12.6 | S | A | S |
| | 2-43 | X2-19 | Y-1 | Z-1 | 12.3 | 11.8 | S | A | S |
| | 2-44 | X2-20 | Y-1 | Z-1 | 9.9 | 10.3 | S | A | S |
| | 2-45 | X2-21 | Y-1 | Z-1 | 14.9 | 14.1 | S | S | A |
| | 2-46 | X2-22 | Y-1 | Z-1 | 11.9 | 12.2 | S | S | S |
| | 2-47 | X2-23 | Y-1 | Z-1 | 10.7 | 11.2 | S | S | S |
| | 2-48 | X2-24 | Y-1 | Z-1 | 15.6 | 12.7 | A | A | S |
| | 2-49 | X2-25 | Y-1 | Z-1 | 12.1 | 12.6 | A | A | A |
| | 2-50 | X2-26 | Y-1 | Z-1 | 11.0 | 11.7 | S | S | S |
| | 2-51 | X2-27 | Y-1 | Z-1 | 10.6 | 11.4 | A | A | S |
| | 2-52 | X2-28 | Y-1 | Z-1 | 15.3 | 14.2 | S | S | A |
| | 2-53 | X2-29 | Y-1 | Z-1 | 13.2 | 12.5 | S | A | S |
| | 2-54 | X2-30 | Y-1 | Z-1 | 12.3 | 11.8 | S | S | S |
| | 2-55 | X2-1 | Y-2 | Z-1 | 10.7 | 11.4 | S | A | S |
| Comparative Example | 2-4 | X2-9 | Y-1 | Z-1 | 21.6 | 20.9 | A | A | B |
| | 2-5 | X2-10 | Y-1 | Z-1 | 24.1 | 25.6 | A | B | A |
| | 2-6 | X2-18 | Y-1 | Z-1 | 29.5 | 39.1 | A | B | C |

The invention claimed is:
1. A method for forming a multilayer coating film comprising the steps of:
   (1) applying an aqueous first colored coating composition (X) to a substrate to form a first colored coating film thereon;
   (2) applying an aqueous second colored coating composition (Y) to the uncured first colored coating film to form a second colored coating film thereon;
   (3) applying a clear coating composition (Z) to the uncured second colored coating film to form a clear coating film thereon; and
   (4) heating to simultaneously cure the uncured first colored coating film, uncured second colored coating film, and uncured clear coating film,
       the aqueous first colored coating composition (X) comprising an aqueous film-forming resin (A), a cross-linking agent (B), and acrylic urethane resin composite particles (C), the acrylic resin of the acrylic urethane resin composite particles (C) being obtained by reacting, as constituent monomers, 30 to 80 mass % of a polymerizable unsaturated monomer (c-1-1) having one polymerizable unsaturated group per molecule and having a $C_{4-22}$ alkyl group, 1 to 20 mass % of a polymerizable unsaturated monomer (c-2) having two or more polymerizable unsaturated groups per molecule, and 0 to 69 mass % of a polymerizable unsaturated monomer (c-1-2) having one polymerizable unsaturated group per molecule and being other than the polymerizable unsaturated monomer (c-1-1),
       wherein the urethane resin of the acrylic urethane resin composite particles (C) is obtained from a polyol component, and a polyisocyanate component, and
       wherein the urethane resin component in the acrylic urethane resin composite particles (C) has a weight average molecular weight of 20,000 to 100,000.

2. The method according to claim 1, wherein the aqueous film-forming resin (A) is a hydroxy-containing polyester resin (A1) and/or a hydroxy-containing acrylic resin (A2).

3. The method according to claim 1, wherein the polymerizable unsaturated monomer (c-1-1) is at least one polymerizable unsaturated monomer selected from the group consisting of 2-ethylhexyl (meth)acrylate, dodecyl (meth)acrylate, and tridecyl (meth)acrylate.

4. The method according to claim 1, wherein the amount of polymerizable unsaturated monomer (c-1-2) is from 1 to 30 mass %, based on the total amount of the polymerizable unsaturated monomer (c-1-1), polymerizable unsaturated monomer (c-2), and polymerizable unsaturated monomer (c-1-2).

5. The method according to claim 1, wherein the amount of polymerizable unsaturated monomer (c-1-2) is from 10 to 50 mass %, based on the total amount of the polymerizable unsaturated monomer (c-1-1), polymerizable unsaturated monomer (c-2), and polymerizable unsaturated monomer (c-1-2).

6. The method according to claim 1, wherein the acrylic urethane resin composite particles (C) have a core/shell type multilayer structure.

7. The method according to claim 1, wherein the acrylic urethane resin composite particles (C) have an average particle size of 10 to 5,000 nm.

8. The method according to claim 1, wherein the cross-linking agent (B) is a blocked polyisocyanate compound (B1) having at least one blocked isocyanate group selected from the group consisting of:
a blocked isocyanate group represented by formula (I)

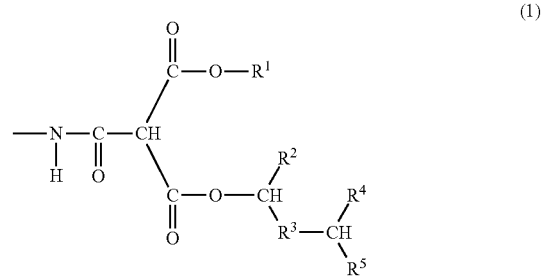

wherein $R^1$, $R^2$, $R^4$, and $R^5$ independently represent a $C_{1-12}$ hydrocarbon group, and $R^3$ represents a $C_{1-12}$ linear or branched alkylene group;
a blocked isocyanate group represented by formula (II)

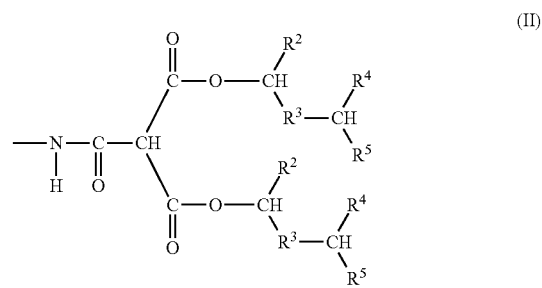

wherein $R^2$, $R^3$, $R^4$, and $R^5$ are the same as above; and
a blocked isocyanate group represented by formula (III)

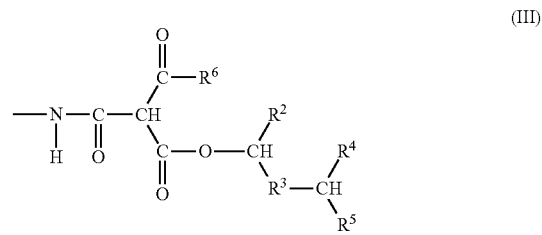

wherein $R^2$, $R^3$, $R^4$, and $R^5$ are the same as above, and $R^6$ represents a $C_{1-12}$ hydrocarbon group.

9. The method according to claim 8, wherein the $R^1$ is an isopropyl group.

10. The method according to claim 8, wherein $R^6$ in formula (III) is an isopropyl group.

11. The method according to claim 8, wherein the blocked polyisocyanate compound (B1) is obtained by reacting a blocked polyisocyanate compound (b3-1) having a blocked isocyanate group represented by formula (IV)

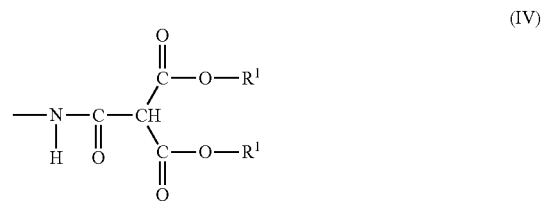

wherein $R^1$ is as defined above, and each $R^1$ may be the same or different, with a secondary alcohol (b4) represented by formula (VI)

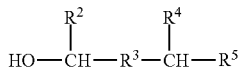
(VI)

wherein $R^2$, $R^3$, $R^4$, and $R^5$ are the same as above.

12. The method according to claim 8, wherein the blocked polyisocyanate compound (B1) is obtained by reacting a blocked polyisocyanate compound (b3-2) having a blocked isocyanate group represented by formula (V)

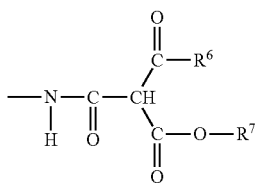
(V)

wherein $R^6$ is the same as the above, and $R^7$ is a $C_{1-12}$ hydrocarbon group, with the secondary alcohol (b4).

13. The method according to claim 8, wherein the blocked polyisocyanate compound (B1) is a blocked polyisocyanate compound (B1') having a hydrophilic group.

14. The method according to claim 1, wherein the proportions of the aqueous film-forming resin (A), crosslinking agent (B), and acrylic urethane resin composite particles (C) are 30 to 95 parts by mass of the aqueous film-forming resin (A), 5 to 70 parts by mass of the crosslinking agent (B), and 1 to 50 parts by mass of the acrylic urethane resin composite particles (C), based on 100 parts by mass of the total amount of the aqueous film-forming resin (A) and crosslinking agent (B).

15. The method according to claim 1, wherein the aqueous first colored coating composition (X) further comprises a hydrophobic solvent (E).

16. The method according to claim 1, wherein the substrate is a vehicle body having an undercoating film formed thereon by using an electrodeposition coating composition.

17. An article produced by the method according to claim 1.

18. A coating composition comprising an aqueous film-forming resin (A), a blocked polyisocyanate compound (B1), and acrylic urethane resin composite particles (C), wherein the blocked polyisocyanate compound (B1) is a blocked polyisocyanate compound having at least one blocked isocyanate group selected from the group consisting of: a blocked isocyanate group represented by formula (I)

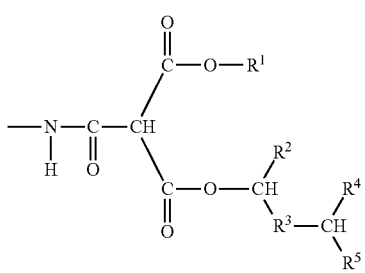
(I)

wherein $R^1$, $R^2$, $R^4$, and $R^5$ independently represent a $C_{1-12}$ hydrocarbon group, and $R^3$ represents a $C_{1-12}$ linear or branched alkylene group;

a blocked isocyanate group represented by formula (II)

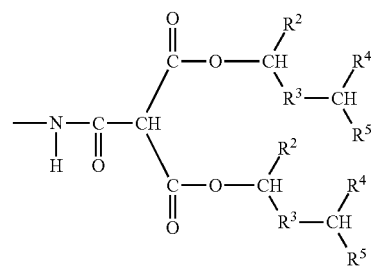
(II)

wherein $R^2$, $R^3$, $R^4$, and $R^5$ are the same as above, and a blocked isocyanate group represented by formula (III)

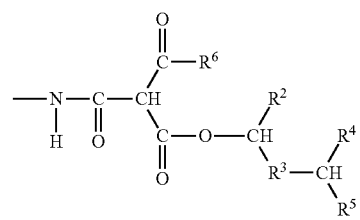
(III)

wherein $R^2$, $R^3$, $R^4$, and $R^5$ are the same as the above, and $R^6$ is a $C_{1-12}$ hydrocarbon group, and the acrylic resin of the acrylic urethane resin composite particles (C) is an acrylic resin obtained by reacting, as constituent monomers, a polymerizable unsaturated monomer (c-1) having one polymerizable unsaturated group per molecule, and a polymerizable unsaturated monomer (c-2) having two or more polymerizable unsaturated groups per molecule, wherein the urethane resin of the acrylic urethane resin composite particles (C) is obtained from a polyol component, and a polyisocyanate component, and wherein the urethane resin component in the acrylic urethane resin composite particles (C) has a weight average molecular weight of 20,000 to 100,000.

19. The coating composition according to claim 18, wherein the aqueous film-forming resin (A) is a hydroxy-containing polyester resin (A1) and/or a hydroxy-containing acrylic resin (A2).

20. The coating composition according to claim 18, wherein $R^1$ in formula (I) is isopropyl.

21. The coating composition according to claim 18, wherein $R^6$ is isopropyl.

22. The coating composition according to claim 18, wherein the blocked polyisocyanate compound (B1) is obtained by reacting a blocked polyisocyanate compound (b3-1) having a blocked isocyanate group represented by formula (IV)

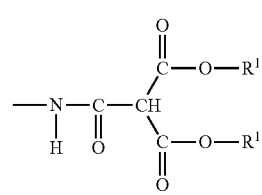
(IV)

wherein $R^1$ is as defined above, and each $R^1$ may be the same or different, with a secondary alcohol (b4) represented by formula (VI)

(VI)

wherein $R^2$, $R^3$, $R^4$, and $R^5$ are the same as above.

23. The coating composition according to claim 18, wherein the blocked polyisocyanate compound (B1) is obtained by reacting the secondary alcohol (b4) and a blocked polyisocyanate compound (b3-2) having a blocked isocyanate group represented by formula (V)

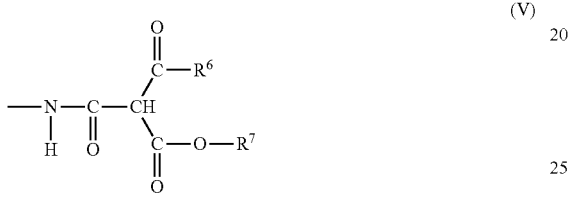

(V)

wherein $R^6$ is the same as above, and $R^7$ is a $C_{1-12}$ hydrocarbon group.

24. The coating composition according to claim 18, wherein the blocked polyisocyanate compound (B1) is a blocked polyisocyanate compound (B1') having a hydrophilic group.

25. The coating composition according to claim 18, wherein the constituent monomers of the acrylic resin component of the acrylic urethane resin composite particles (C) comprise at least one alkyl or cycloalkyl (meth)acrylate having a $C_{4-22}$ alkyl group as the polymerizable unsaturated monomer (c-1).

26. The coating composition according to claim 18, wherein the amount of polymerizable unsaturated monomer (c-1) is from 1 to 30 mass %, based on the total amount of the polymerizable unsaturated monomer (c-1) and polymerizable unsaturated monomer (c-2).

27. The coating composition according to claim 18, wherein the acrylic urethane resin composite particles (C) have a core/shell type multilayer structure.

28. The coating composition according to claim 18, wherein the acrylic urethane resin composite particles (C) have an average particle size of 10 to 5,000 nm.

29. A method for forming a multilayer coating film comprising the steps of:
   (1) applying the coating composition according to claim 18 as an aqueous first colored coating composition (X) to a substrate to form a first colored coating film thereon;
   (2) applying an aqueous second colored coating composition (Y) to the uncured first colored coating film to form a second colored coating film thereon;
   (3) applying a clear coating composition (Z) to the uncured second colored coating film to form a clear coating film thereon; and
   (4) heating to simultaneously cure the uncured first colored coating film, uncured second colored coating film, and uncured clear coating film.

30. The method according to claim 29, wherein the substrate is a vehicle body having an undercoating film formed thereon by using an electrodeposition coating composition.

31. An article produced by the method according to claim 29.

* * * * *